(12) United States Patent
Kitora et al.

(10) Patent No.: US 7,593,120 B2
(45) Date of Patent: Sep. 22, 2009

(54) IMAGE PROCESSING APPARATUS, CONTROL METHOD THEREFOR, AND PROGRAM

(75) Inventors: Masakazu Kitora, Kawasaki (JP); Yushi Matsukubo, Yokohama (JP); Hiroyuki Yaguchi, Yokohama (JP); Eiichi Nishikawa, Kawasaki (JP); Hiroyuki Tsuji, Yokohama (JP); Shinichi Kato, Kawasaki (JP); Kenzuo Sekiguchi, Tokyo (JP); Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 920 days.

(21) Appl. No.: 11/149,341

(22) Filed: Jun. 10, 2005

(65) Prior Publication Data

US 2005/0276519 A1 Dec. 15, 2005

(30) Foreign Application Priority Data

Jun. 10, 2004 (JP) ............................. 2004-173003
Jun. 10, 2004 (JP) ............................. 2004-173004
Jun. 10, 2004 (JP) ............................. 2004-173006

(51) Int. Cl.
*G06F 15/00* (2006.01)
*G06F 21/00* (2006.01)

(52) U.S. Cl. .................. 358/1.13; 358/1.2; 358/1.9; 358/1.16; 705/51; 705/52

(58) Field of Classification Search ................ 358/1.2, 358/1.9, 1.13, 1.16; 705/51, 52
See application file for complete search history.

(56) References Cited

U.S. PATENT DOCUMENTS

| 5,604,578 | A | 2/1997 | Shibuya |
| 5,966,468 | A | 10/1999 | Fujimoto |
| 6,043,823 | A | 3/2000 | Kodaira et al. |
| 7,054,029 | B1* | 5/2006 | Ohta et al. ................. 358/1.18 |
| 7,154,616 | B2 | 12/2006 | Watanabe et al. |
| 7,164,493 | B1* | 1/2007 | Matsumoto et al. .......... 358/1.9 |
| 7,194,433 | B1 | 3/2007 | Hyakutake |
| 7,313,386 | B2 | 12/2007 | Kondo et al. |
| 2002/0051145 | A1 | 5/2002 | Watanabe et al. |
| 2002/0051164 | A1 | 5/2002 | Watanabe |
| 2002/0073035 | A1* | 6/2002 | Saito ............................ 705/52 |

(Continued)

FOREIGN PATENT DOCUMENTS

EP 1 278 362 1/2003

(Continued)

OTHER PUBLICATIONS

Japanese Office Action dated Dec. 1, 2008 issued during prosecution of related Japanese application No. 2004-173004.

(Continued)

*Primary Examiner*—Chan S Park
(74) *Attorney, Agent, or Firm*—Fitzpatrick, Cella, Harper & Scinto

(57) ABSTRACT

Input raster image data is divided into objects of each attribute. The division results, and charge information representing a consideration accrued from a vectorized process for the division results are displayed. It is designated whether to execute the vectorized process for the displayed division results. The vectorized process of converting the raster image data into vector data is executed on the basis of the contents of the designation.

12 Claims, 43 Drawing Sheets

U.S. PATENT DOCUMENTS

| | | |
|---|---|---|
| 2003/0095809 A1 | 5/2003 | Butikofer |
| 2004/0046972 A1 | 3/2004 | Shibao |

FOREIGN PATENT DOCUMENTS

| | | |
|---|---|---|
| GB | 2 307 144 | 5/1997 |
| GB | 2 377 841 | 1/2003 |
| JP | 5-159062 | 6/1993 |
| JP | 06-162299 | 6/1994 |
| JP | 9-91450 | 4/1997 |
| JP | 9-160452 | 6/1997 |
| JP | 9-204525 | 8/1997 |
| JP | 10-224593 | 8/1998 |
| JP | 11-84963 | 3/1999 |
| JP | 11-134058 | 5/1999 |
| JP | 11-196212 | 7/1999 |
| JP | 2000-47540 | 2/2000 |
| JP | 2000-306103 | 11/2000 |
| JP | 2001-76095 | 3/2001 |
| JP | 2001-344098 | 12/2001 |
| JP | 2002-123622 | 4/2002 |
| JP | 2003-101790 | 4/2003 |
| JP | 2003-345920 | 12/2003 |
| JP | 2002-361982 | 2/2009 |

OTHER PUBLICATIONS

Japanese Office Action dated Dec. 1, 2008 issued during prosecution of related Japanese application No. 2004-173006.

Japanese Office Action dated May 15, 2009 issued during prosecution of related Japanese application No. 2004-173004.

* cited by examiner

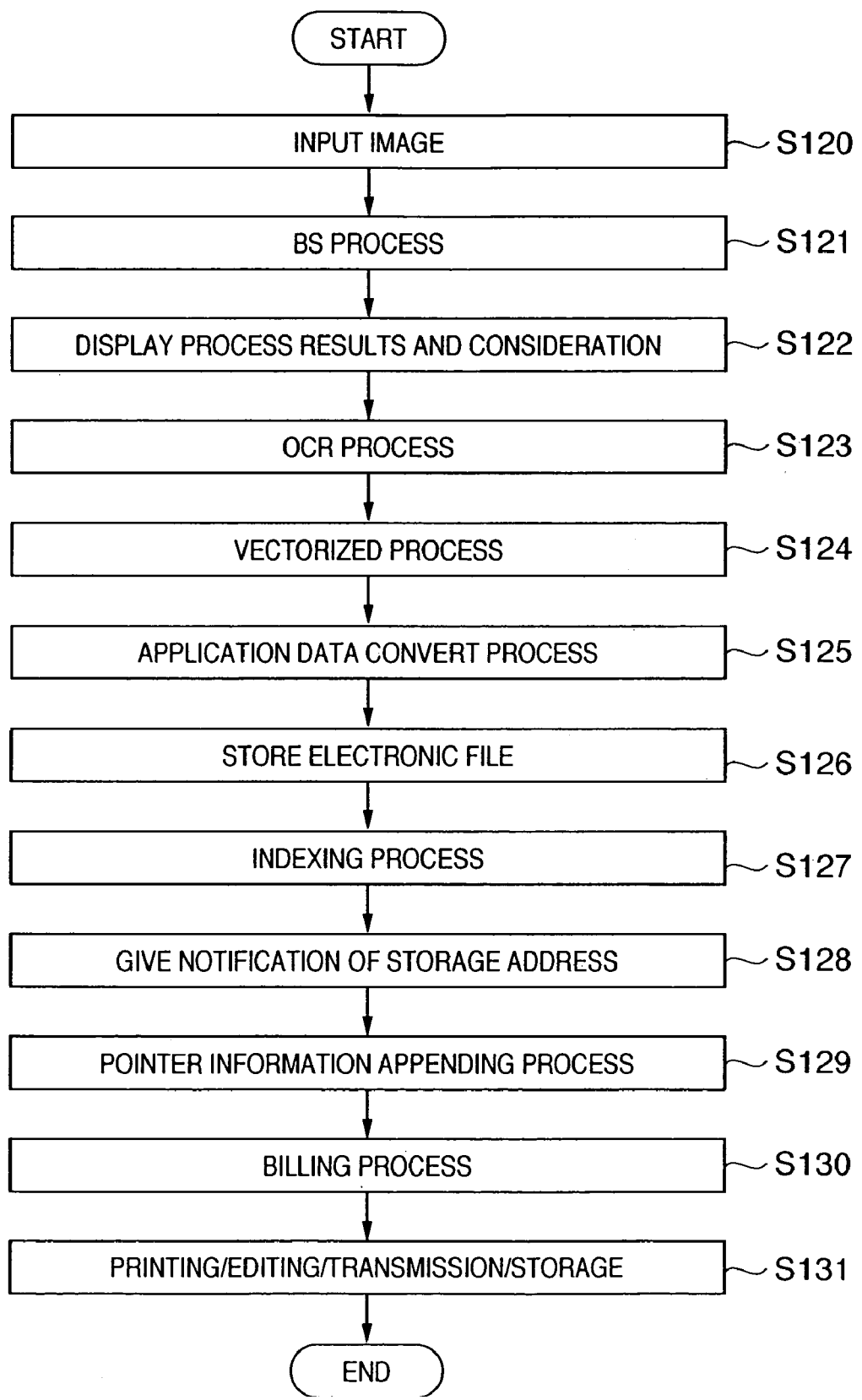

FIG. 5

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

*PROPERTY 1 : text  2 : picture  3 : table  4 : line  5 : photo

INPUT FILE INFORMATION

| TOTAL NUMBER OF BLOCKS | N(=6) |
|---|---|

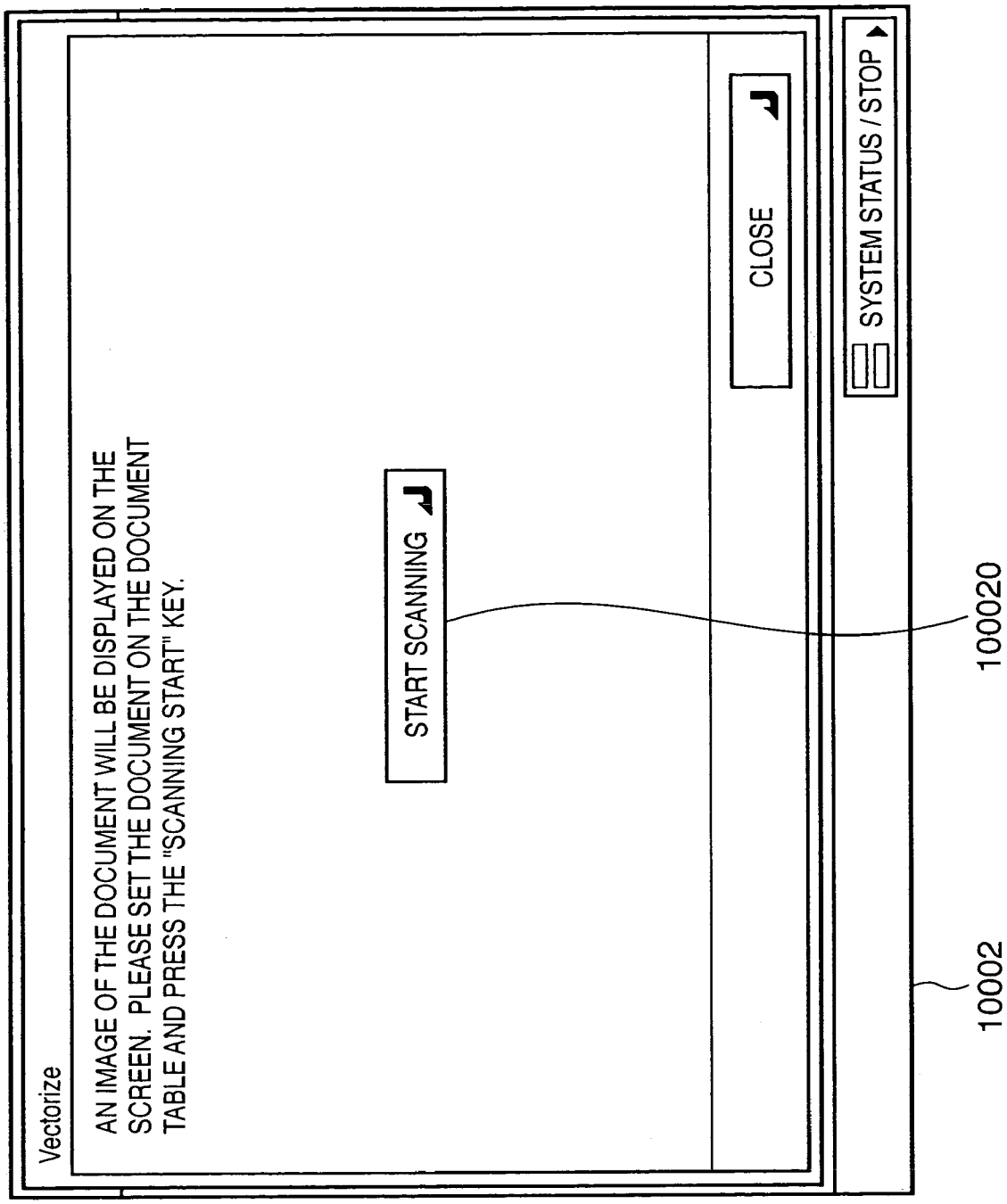

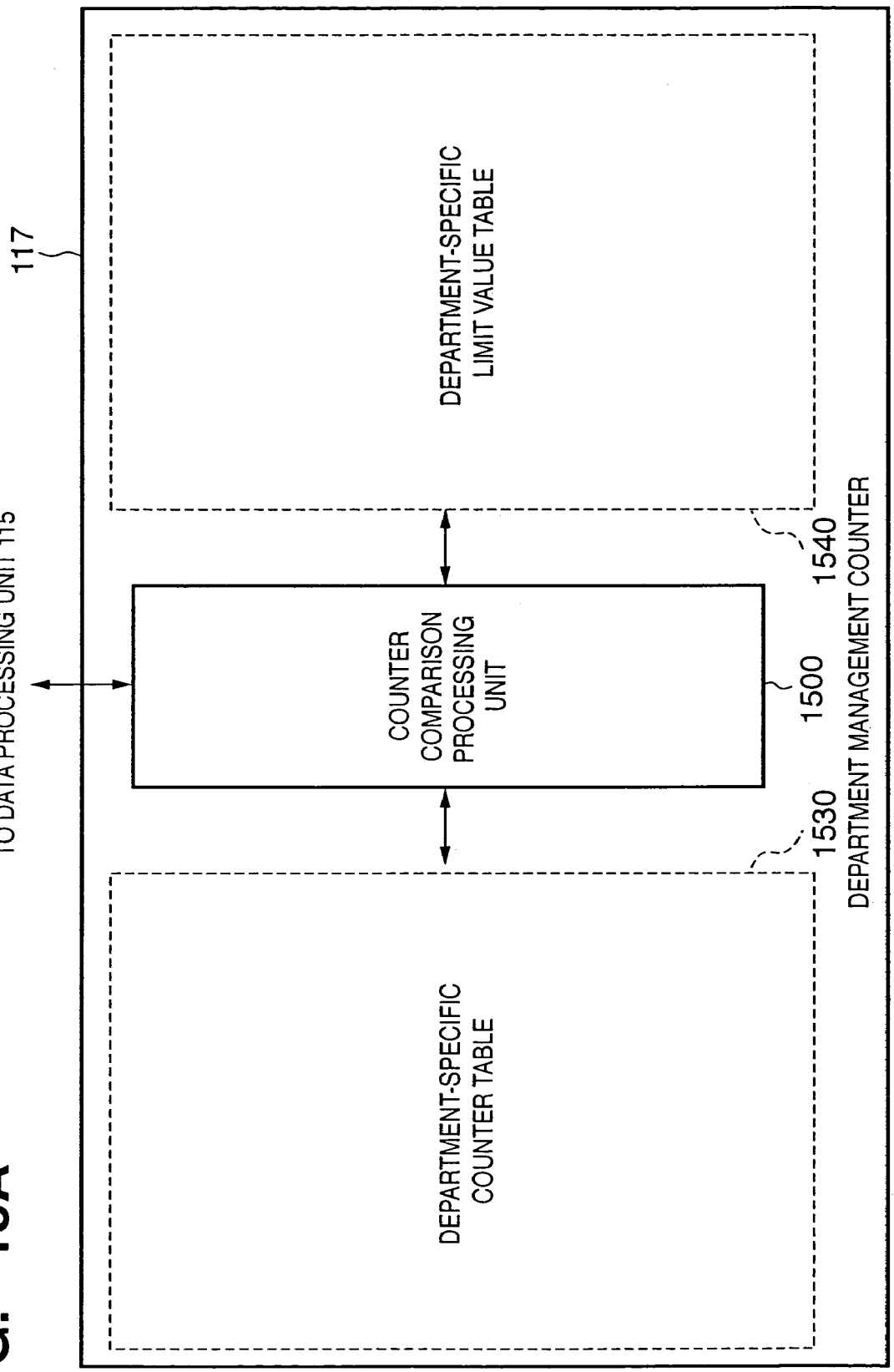

FIG. 16A

RASTER DEPARTMENT-SPECIFIC
COPYING COUNTER TABLE     1512

| ID | MONOCHROME | COLOR |
|---|---|---|
| A | 499 | 821 |
| B | 500 | 500 |
| C | 300 | 234 |

VECTOR DEPARTMENT-SPECIFIC
COPYING COUNTER TABLE     1513

| ID | MONOCHROME | COLOR |
|---|---|---|
| A | 891 | 998 |
| B | 500 | 500 |
| C | 300 | 789 |

FIG. 16B

RASTER DEPARTMENT-SPECIFIC
COPYING LIMIT VALUE TABLE     1522

| ID | MONOCHROME | COLOR |
|---|---|---|
| A | 1000 | 1000 |
| B | 500 | 500 |
| C | 300 | 1000 |

VECTOR DEPARTMENT-SPECIFIC
COPYING LIMIT VALUE TABLE     1523

| ID | MONOCHROME | COLOR |
|---|---|---|
| A | 1000 | 1000 |
| B | 500 | 500 |
| C | 300 | 1000 |

| OBJECTIFICATION TABLE | | | | |
|---|---|---|---|---|
| ID | Text | Graphic | Table | Image |
| A | 2003 | 1286 | 234 | 1987 |
| B | 2732 | 0 | 0 | 2945 |
| C | 0 | 0 | 0 | 334 |

| OBJECTIFICATION LIMIT VALUE TABLE | | | | |
|---|---|---|---|---|
| ID | Text | Graphic | Table | Image |
| A | 3000 | 3000 | 3000 | 3000 |
| B | 3000 | 0 | 0 | 3000 |
| C | 0 | 0 | 0 | 3000 |

VECTOR DEPARTMENT-SPECIFIC TRANSMISSION COUNTER TABLE

| ID | Text/Graphic/Table/Image | Text/Graphic/Image | Text/Image | Text | Image |
|---|---|---|---|---|---|
| A | 1234 | 245 | 12 | 4 | 0 |
| B | 0 | 0 | 0 | 0 | 0 |
| C | 0 | 0 | 1562 | 334 | 53 |

1527

VECTOR DEPARTMENT-SPECIFIC TRANSMISSION LIMIT VALUE TABLE

| ID | Text/Graphic/Table/Image | Text/Graphic/Image | Text/Image | Text | Image |
|---|---|---|---|---|---|
| A | 2000 | 2000 | 2000 | 2000 | 2000 |
| B | 0 | 0 | 0 | 0 | 0 |
| C | 0 | 0 | 2000 | 2000 | 2000 |

FIG. 21B

VECTOR DEPARTMENT-SPECIFIC TRANSMISSION COUNTER TABLE 1517

| ID | Text | Graphic | Table | Image |
|----|------|---------|-------|-------|
| A  | 2003 | 1286    | 234   | 1987  |
| B  | 2732 | 0       | 0     | 2945  |
| C  | 0    | 0       | 0     | 334   |

VECTOR DEPARTMENT-SPECIFIC TRANSMISSION LIMITVALUE TABLE 1527

| ID | Text | Graphic | Table | Image |
|----|------|---------|-------|-------|
| A  | 3000 | 3000    | 3000  | 3000  |
| B  | 3000 | 0       | 0     | 3000  |
| C  | 0    | 0       | 0     | 3000  |

FIG. 34

| DEVELOPMENT DEPARTMENT A | | TEXT (TEXT COUNT) | PICTURE COUNT | TABLE COUNT | LINE COUNT | PHOTO COUNT |
|---|---|---|---|---|---|---|
| MONOCHROME SCAN | UPPER LIMIT | 100000 | 10000 | 10000 | 10000 | 10000 |
| | AMOUNT USED | 400 | 30 | 100 | 100 | 200 |
| | ON/OFF | ON | ON | ON | ON | ON |
| COLOR SCAN | UPPER LIMIT | 200000 | 10000 | 10000 | 10000 | 5000 |
| | AMOUNT USED | 10000 | 400 | 1000 | 1000 | 2000 |
| | ON/OFF | ON | ON | ON | ON | ON |

SCAN RESTRICTION SETTING (DEVELOPMENT DEPARTMENT A) — 2201

COLOR SCAN RESTRICTION

PLANE COUNT RESTRICTION: [ON] [OFF]  [5000]

OBJECT RESTRICTION: [ON] [OFF]

| | 2501 | 2502 |
|---|---|---|
| Text | ☐ | 0.100 |
| Picture | ☐ | 0.300 |
| Table | ☐ | 0.200 |
| Line | ☐ | 0.100 |
| Photo | ☐ | 1.000 |
| Total | ☐ | 50000 |

— 2503

MONOCHROME SCAN RESTRICTION

PLANE COUNT RESTRICTION: [ON] [OFF]  [5000]

OBJECT RESTRICTION: [ON] [OFF]

| | | |
|---|---|---|
| Text | ☐ | 0.050 |
| Picture | ☐ | 0.300 |
| Table | ☐ | 0.200 |
| Line | ☐ | 0.100 |
| Photo | ☐ | 1.000 |
| Total | ☐ | 50000 |

— 2504

IMAGE PROCESSING APPARATUS, CONTROL METHOD THEREFOR, AND PROGRAM

FIELD OF THE INVENTION

The present invention relates to an image processing apparatus, control method therefor, and program.

BACKGROUND OF THE INVENTION

In recent years, amid calls for environmental issues, there has been a rapid progression toward paperless offices. As a technique for promoting paperless operation, there is proposed a document management system which scans paper documents stored in binders and the like with a scanner or the like, converts them into image files such as portable document format (to be referred to as PDF hereinafter), and stores and manages them in an image storage.

In a multifunction peripheral with enhanced functions, in storing and managing an image file corresponding to a paper document, pointer information indicating the location of the image file in an image storage can be recorded on the cover sheet or in the information of the paper document as additional information. In reusing (e.g., copying) the paper document, the storage location of the original electronic file (image file) corresponding to the paper document is detected from the pointer information, and the original electronic file is directly reused. This makes it possible to reduce the total amount of paper documents held and obtain a print with high image quality.

There is also proposed an arrangement in which a read image is divided into objects of respective attributes (e.g., text, photo, graphic, table, and background image) to generate an electronic file of the vector data format so as to reuse it on a terminal such as a personal computer even if no original electronic file corresponding to pointer information is found or no pointer information is detected.

Some multifunction peripherals (MFPs) comprise a print counter and scan counter in order to independently count the number of printing operations and that of scan operations (see, e.g., Japanese Patent Laid-Open No. 11-196212).

Some conventional apparatuses such as a copying machine comprise a password mode in which copying is permitted only when an input password coincides with a password registered in advance. In this case, the number of actual copies is counted for each input password. The number of copies by a user of the password can be grasped on the basis of the count, and the count can be utilized for usage management when the copying fee is shared.

The copying machine can also set a function of putting restrictions (e.g., inhibiting copying) when each copying machine exceeds a predetermined limit of copies even if a password agrees with a correct one.

In addition to the copying function, recent copying machines comprise a scan function of holding a read document as bitmap image data. In this case, the copying machine is equipped with a scan counter which counts the number of scanned documents. Some of copying machines having a printout function comprise a print counter which counts the number of printed image data. Such a copying machine can independently count the number of copies, that of scanned data, and that of prints (see, e.g., Japanese Patent Laid-Open No. 11-196212).

Scan by a copying machine having the scan function is so-called raster scan. Read image data is converted into JPEG data or data of a portable document format (to be referred to as PDF hereinafter), stored and held in an image storage, and accumulated in a database, thereby constructing a document management system.

In generating an electronic file by the above-mentioned multifunction peripheral, an arrangement is implemented in which a user is billed for the contents of document scan operation executed to generate an electronic file. As a billing method, it is more practical to bill a user not for each document but for each object (e.g., a text, photo, or graphic object) present in a document.

As the usage management form (including billing) of the apparatus, there is proposed an arrangement in which the usage count (read count) of the apparatus is restricted for each of departments in a given organization (see, e.g., Japanese Patent Laid-Open No. 06-162299).

The present applicant has examined a multifunction peripheral in which a paper document is read by a scanner, the read image data is converted into vector data, and vector data is stored in an image storage so as to reuse it on a computer application.

Since vectorization of scan data can reconstruct a document into a reusable state, vectorization should be managed not simply as conventional scanning but separately from it. That is, if vectorization is regarded as a high-value-added service, demands arise for a mechanism of providing the service by changing the charge and billing structure.

Conceivable requirements for this mechanism are as follows.

To change the billing amount depending on the type of object

To change the billing amount depending on the number of object data in a document To meet these requirements, the system needs to provide a more preferable vectorization service within an amount of money desired by the user.

A copying machine having a conventional scan function can save a raster-scanned document as an PDF file or compressed JPEG file of a compact information amount, can also manage the number of scanned documents, but suffers the following problems.

A file itself generated after rater scan is image information, and an arbitrary object in the document cannot be reused.

For example, if the user wants to use characters in a document by copying them as a text into a text application, the characters cannot be reused because they are formed as a bitmap image by raster scan. To use such characters, the user must cut out the text part, separately save it in a file format such as TIFF, and perform automatic character recognition by a dedicated OCR application or the like.

Even when the user tries to cut out an illustration made up of thin lines, convert it into a different color, and enlarge and reuse it, the illustration cannot be reused in the bitmap data format while maintaining its image quality. This is because the color runs around the thin lines, the thin lines become blurred upon enlargement, or jaggies are generated.

However, such a document can be reconstructed into a reusable state when the copying machine is equipped with a vector scan function which solves the above problems in raster scan and vectorizes each object in a read document to generate image data of a reusable format. This vector scan function should be managed not simply as conventional scanning but separately from it.

A situation in which company logos and copyrighted materials are unnecessarily vectorized is not desirable, and a mechanism of permitting/inhibiting the vectorized process for each department is needed. When vectorization is considered as a high-value-added service, the service may be provided by changing the consideration and billing structure.

However, current department management can manage only the number of scanned documents, and cannot manage raster scan and vector scan or cannot manage objects generated upon vector scan.

Basically, read documents are managed one by one, and no usage management is realized for each object in a document or for each department in an organization when the read document is used in the organization. Hence, usage of each object by each department cannot be managed.

In today's business environment, a finer, practical usage management form of an apparatus is required to realize usage management for each object and each department for the purpose of cost reduction and inhibition of unauthorized use by the user.

SUMMARY OF THE INVENTION

The present invention has been made to overcome the conventional drawbacks, and has as its object to provide an image processing apparatus, control method therefor, and program which can provide a billing method optimal for vectorization in a device capable of vectorization.

It is another object of the present invention to provide an image processing apparatus, information processing apparatus, control method therefor, and program which can properly, efficiently implement usage management in an environment where both the raster scan function and vector scan function can be utilized.

It is still another object of the present invention to provide an image processing apparatus, control method therefor, and program which can implement finer, practical usage management of an image processing apparatus having a plurality of types of functions.

According to the present invention, the foregoing object is attained by providing an image processing apparatus which executes, on the basis of a process performed for an image, a process associated with billing of the process, comprising:

input means for inputting raster image data;

dividing means for dividing the raster image data input by the input means into objects of respective attributes;

display means for displaying division results of the dividing means and charge information representing a consideration accrued from a vectorized process for the division results;

instructing means for instructing whether to execute the vectorized process for the division results displayed on the display means; and executing means for executing, on the basis of an instruction content of the instructing means, the vectorized process of converting the raster image data into vector data.

In a preferred embodiment, the input means inputs as the raster image data an image read by an image reading unit which reads a document.

In a preferred embodiment, the display means displays total charge information representing a consideration accrued from the vectorized process for all objects in the raster image data that are obtained as the division results, and object-specific charge information representing a consideration accrued from the vectorized process for objects of each attribute in the raster image data.

In a preferred embodiment, the apparatus further comprises calculating means for calculating the charge information, the calculating means calculating the charge information on the basis of a unit charge set for each attribute type of objects in the raster image data that are obtained as the division results.

In a preferred embodiment, the apparatus further comprises calculating means for calculating the charge information, the calculating means calculating the charge information on the basis of a unit charge set on the basis of an area of objects in the raster image data that are obtained as the division results.

In a preferred embodiment, the apparatus further comprises calculating means for calculating the charge information, in a case in which the raster image data is not divided into objects by the dividing means, the calculating means calculating the charge information on the basis of a unit charge set for the case.

In a preferred embodiment, when the charge information exceeds a predetermined value, the display means displays warning information representing that the charge information exceeds the predetermined value.

In a preferred embodiment, the instructing means can instruct whether to execute the vectorized process for each attribute of objects which are obtained as the division results displayed by the display means.

In a preferred embodiment, the display means updates the charge information on the basis of the instruction content of the instructing means.

In a preferred embodiment, the dividing means divides the raster image data into objects of respective attributes so as not to exceed a predetermined value.

In a preferred embodiment, the apparatus further comprises setting means for setting priority of attributes of objects divided by the dividing means.

According to the present invention, the foregoing object is attained by providing an image processing apparatus having a plurality of types of functions which can be used for an image, comprising:

input means for inputting raster image data;

converting means for converting the raster image data input by the input means into vector image data; and managing means for managing usage management information of a function selected from the plurality of types of functions, separately between usage of the selected function for the raster image data and usage of the selected function for the vector image data.

According to the present invention, the foregoing object is attained by providing an information processing apparatus which is connected via a network to an image processing apparatus having an input unit for inputting raster image data, and can control the image processing apparatus, comprising:

selecting means for selecting via the network a desired function used for an image from a plurality of types of functions of the image processing apparatus;

receiving means for receiving raster image data to be processed from the image processing apparatus via the network on the basis of selection operation of the selecting means;

converting means for converting the raster image data into vector image data; and managing means for managing usage management information of the function selected by the selecting means, separately between usage of the selected function for the raster image data and usage of the selected function for the vector image data.

According to the present invention, the foregoing object is attained by providing an image processing apparatus which can execute a plurality of types of functions for a document image obtained by reading a document, comprising:

reading means for reading a document;

dividing means for dividing a document image read by the reading means into a plurality of objects for each attribute;

converting means for converting the document image into vector data for each object divided by the dividing means;

holding means for holding a management table in which an upper limit value of the number of objects converted by the converting means is managed for each of a plurality of types of management units and each of types of attributes dividable by the dividing means;

determining means for determining whether the cumulative number of objects of each attribute that are converted by the converting means has reached the upper limit value managed by the management table; and restricting means for restricting execution of the converting means on the basis of a determination result of the determining means.

According to the present invention, the foregoing, object is attained by providing an image processing apparatus which can execute a plurality of types of functions for a document image obtained by reading a document, comprising:

reading means for reading a document;

dividing means for dividing a document image read by the reading means into a plurality of objects for each attribute;

converting means for converting the document image into vector data for each object divided by the dividing means;

holding means for holding a billing management table in which an upper limit of a total amount for restricting execution of the converting means, a unit cost a user is billed for when objects are converted for each attribute by the converting means, and a cumulative billing amount calculated on the basis of the unit cost upon execution of the converting means are managed for each of a plurality of types of management units;

determining means for determining whether the cumulative billing amount calculated upon execution of the converting means has reached the upper limit of the total amount managed by the management table; and restricting means for restricting execution of the converting means on the basis of a determination result of the determining means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart showing the outline of an overall process executed by the image processing system according to the first embodiment of the present invention;

FIG. 5 is a table showing an example of block information according to the first embodiment of the present invention;

FIG. 14C is a view showing an example of an operation window according to the first embodiment of the present invention;

FIG. 15A is a block diagram showing an example of the arrangement of the department management counter of the MFP according to the first embodiment of the present invention;

FIG. 16A is a table showing an example of a department-specific function counter table according to the first embodiment of the present invention;

FIG. 16B is a table showing an example of a department-specific function limit value table according to the first embodiment of the present invention;

FIG. 17A is a table showing an example of an objectification counter table according to the first embodiment of the present invention;

FIG. 17B is a table showing an example of an objectification limit value table according to the first embodiment of the present invention;

FIG. 21A is a table showing an example of a department-specific function counter table and department-specific limit value table in vector scan according to the fifth embodiment of the present invention;

FIG. 21B is a table showing another example of the department-specific function counter table and department-specific limit value table in vector scan according to the fifth embodiment of the present invention;

FIG. 34 is a table showing an example of a setting value management table according to the 12th embodiment of the present invention;

FIG. 36 is a view showing an example of a billing management window according to the 13th embodiment of the present invention.

DETAILED DESCRIPTION OF THE PREFERRED EMBODIMENTS

Preferred embodiments of the present invention will be described in detail in accordance with the accompanying drawings.

First Embodiment

Figure 1:
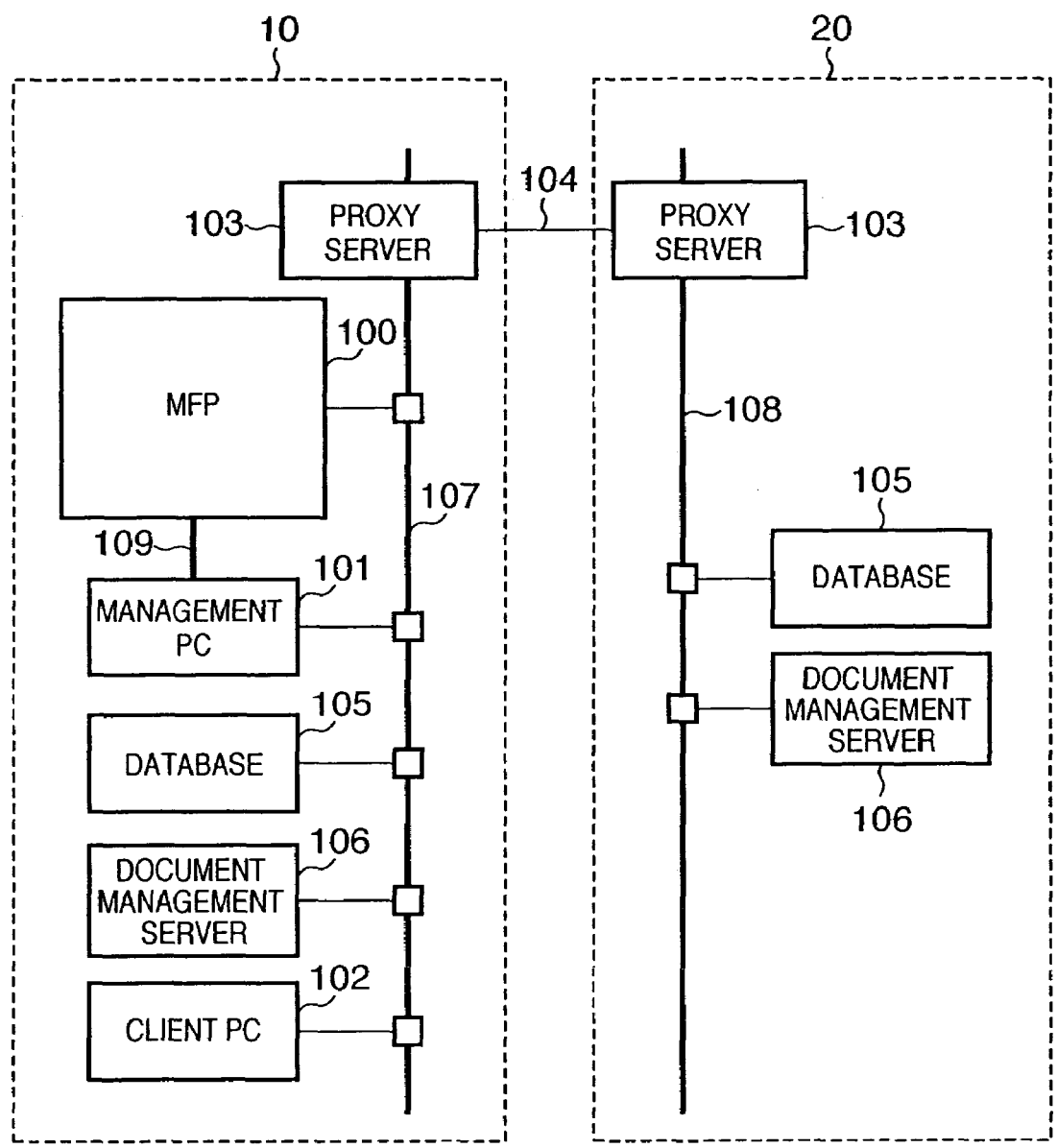
FIG. 1 is a block diagram showing the arrangement of an image processing system according to the first embodiment of the present invention.

FIG. 1 is a block diagram showing the arrangement of an image processing system according to the first embodiment of the present invention.

The image processing system is implemented in an environment where offices 10 and 20 are connected by a network 104 such as the Internet.

A LAN 107 constructed in the office 10 is connected to an MFP (Multi Function Peripheral) 100 which realizes a plurality of types of functions (copying function, printing function, transmitting function, and the like), a management PC 101 which controls the MFP 100, a client PC 102 which utilizes the MFP 100, a document management server 106, a database 105 for the server 106, and a proxy server 103.

A LAN 108 constructed in the office 20 is connected to the proxy server 103, the document management server 106, and the database 105 for the server 106.

The LAN 107 in the office 10 and the LAN 108 in the office 20 are connected to the network 104 via the proxy servers 103 of the two offices.

The MFP 100 comprises an image reading unit which electronically reads particularly a paper document, and an image processing unit which executes an image process for an image signal obtained from the image reading unit. The image signal can be transmitted to the management PC 101 via a LAN 109.

The management PC 101 is a general PC (personal computer), and incorporates various components such as an image storage unit, image processing unit, display unit, and input unit. Some of the components are integrated into the MFP 100.

Note that the arrangement in FIG. 1 is merely an example. The office 20 with the document management server 106 may be omitted, a plurality of offices 20 may be provided, or the offices 10 and 20 may be connected to each other on the single LAN.

The network 104 is a so-called communication network which is typically realized by one or a combination of the Internet, LAN, WAN, telephone line, dedicated digital circuit, ATM, frame relay line, communication satellite channel, cable television line, data broadcasting radio channel, and the like as far as the network enables data exchange.

Various terminals such as the management PC 101, client PC 102, and document management server 106 each have components (e.g., a CPU, RAM, ROM, hard disk, external storage, network interface, display, keyboard, and mouse) which are standard equipment for a general-purpose computer.

The detailed arrangement of the MFP 100 will be explained with reference to FIG. 2.

Figure 2:
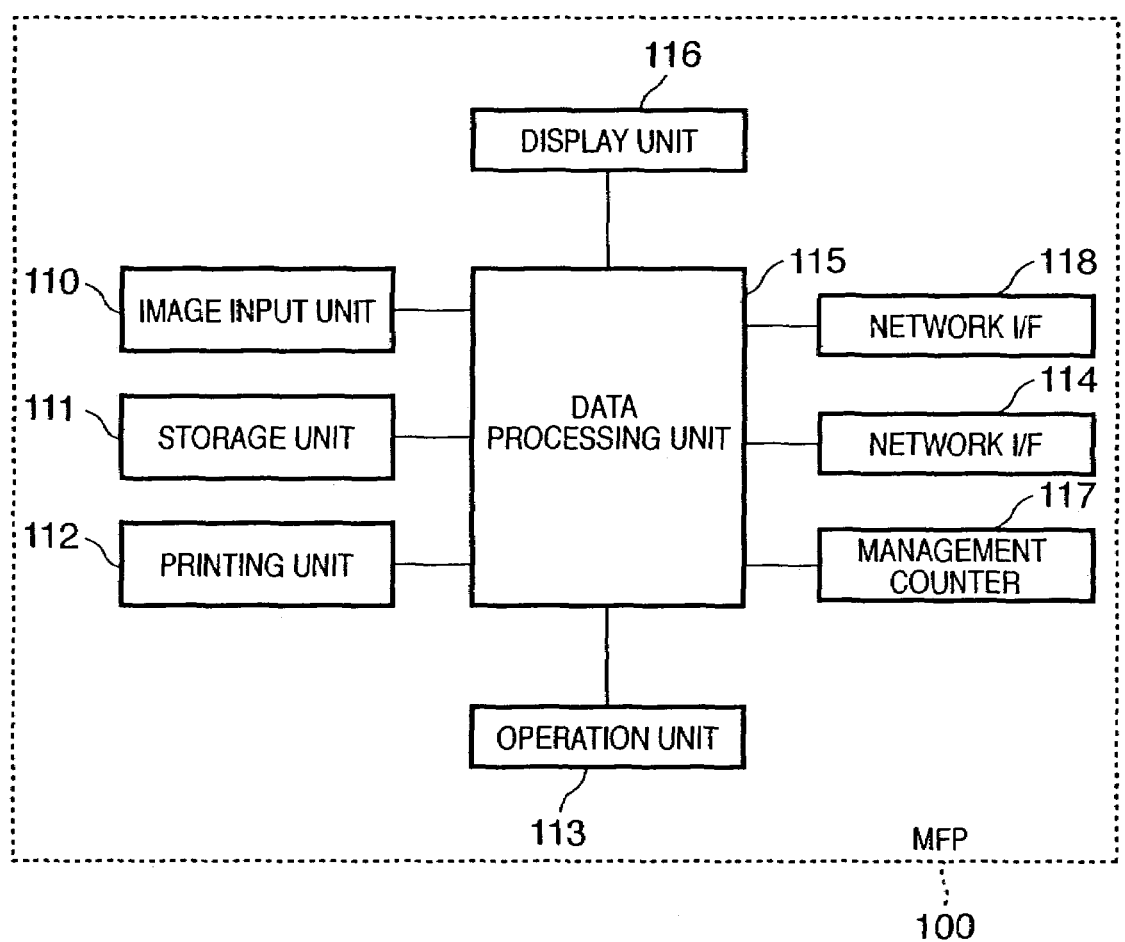
FIG. 2 is a block diagram showing the detailed arrangement of an MFP according to the first embodiment of the present invention.

FIG. 2 is a block diagram showing the detailed arrangement of the MFP according to the first embodiment of the present invention.

In FIG. 2, an image input unit 110 is an image reading unit made up of, e.g., a scanner and reader. Particularly when the image input unit 110 is formed from a scanner and reader, it further comprises an auto document feeder (ADF). The image input unit 110 irradiates a bundle or one of document images with a light source (not shown), forms a reflected document image on a solid-state image sensing element via a lens, and obtains raster-scanned image data from the solid-state image sensing element as a raster image at a predetermined density (600 dpi or the like).

The image input unit 110 can be implemented by any device other than the scanner and reader, such as an image sensing apparatus (e.g., a digital camera or digital video apparatus), an information processing apparatus having a CPU (e.g., a PC or PDA), or a communication apparatus (e.g., a mobile portable communication terminal or FAX apparatus) as far as the apparatus can input raster image data.

The main functions of the MFP 100 will be explained.

[Copying Function]

The MFP 100 has a copying function of printing an image corresponding to scanned image data on a printing medium by a printing unit 112. To form a copy of a document image, a data processing unit 115 (formed from a CPU, RAM, ROM, and the like) executes an image process including various correction processes for the scanned image data and generates printing data, and the printing unit 112 prints the printing data on a printing medium. To form copies of a document image, printing data of one page is temporarily stored and held in a storage unit 111, and sequentially output to the printing unit 112 to print the data on printing media.

Also, the data processing unit 115 can perform an image process including various correction processes for scanned image data and generate printing data, and the printing unit 112 can directly print the printing data on a printing medium without holding the printing data in the storage unit 111.

[Saving Function]

The MFP 100 saves scanned image data from the image input unit 110 or scanned image data having undergone an image process in the storage unit 111.

[Transmitting Function]

With the transmitting function via a network I/F 114, scanned image data obtained by the image input unit 110 or scanned image data saved in the storage unit 111 by the saving function is converted into an image file of a compressed image file format (e.g., TIFF or JPEG) or a vector data file format (e.g., PDF), and the image file is output from the network I/F 114. The output image file is transmitted to the document management server 106 via the LAN 107 or further transferred to another document management server 106 via the network 104.

Although not shown, scanned image data can also be FAX-transmitted via a FAX I/F using a telephone line. Scanned image data can also be directly transmitted after undergoing various image processes associated with transmission by the data processing unit 115 without saving the data in the storage unit 111.

[Printing Function]

With the printing function of the printing unit 112, for example, printing data output from the client PC 102 is received by the data processing unit 115 via the network I/F 114. The data processing unit 115 converts the printing data into raster data printable by the printing unit 112, and the printing unit 112 forms the image on a printing medium.

[Vector Scan Function]

A function of executing a series of processes for the vectorized process (i.e., generating scanned image data by the above-mentioned copying function, saving function, transmitting function, and the like, converting the text region of the scanned image data into a Text code, and functionalizing and coding a thin-line region or graphic region) is defined as a vector scan function. In other words, a process of scanning a document and converting the obtained input image data into vector data is defined as vector scan in the first embodiment.

The vector scan function can easily generate scanned image data of a vector image.

As described above, the vector scan function converts the text part of scanned image data into a text code and outline, converts the lines and curves of a thin line, illustration, and the like into functions, and processes a table and the like as table data. Respective objects in a document can, therefore, be easily reused, unlike scanned image data of a general raster image.

For example, when the vector scan function is executed with the copying function, characters and thin lines can be reproduced at a higher image quality than in copying by raster scan.

In the use of the saving function, an image is compressed as raster data in raster scan (input from the image input unit 110), and the capacity becomes large. However, this file capacity can be greatly decreased by functionalizing and coding data by the vector scan function.

Also in the use of the transmitting function, the transmission time can be shortened by executing the vector scan function because the obtained data capacity is very small. Further, each object is vectorized, and can be reused as a component by an external terminal on the receiving client PC 102 or the like.

An instruction to execute various functions is input from the operator to the MFP 100 via an operation unit 113 which is formed from a keyboard and mouse connected to the management PC 101. The series of operations are controlled by a control unit (not shown) in the data processing unit 115. The state of an operation input and image data in process are displayed on a display unit 116.

The storage unit 111 is also controlled by the management PC 101, and the data exchange and control between the MFP 100 and the management PC 101 are done via a network I/F 118 and the LAN 109.

The storage unit 111 may ensure an original buffer which stores, as original vector data, vector data corresponding to a read document image obtained by a process (to be described later), and an image editing buffer which stores a copy of the original vector data as image editing data in performing image editing based on the original vector data.

If the LAN 109 is provided, the data exchange and control between the MFP 100 and the management PC 101 are realized by directly connecting the MFP 100 and management PC 101 via the network I/F 118. Otherwise, these functions are realized via the LAN 107 connected to the network I/F 114.

When the above-described functions (copying function, saving function, transmitting function, printing function, and vector scan function) are executed, a management counter 117 counts the number of operations of each function on the basis of its operation contents. This can realize usage management of various functions in the MFP 100.

[Outline of Process]

The outline of an overall process executed by the image processing system according to the first embodiment will be described with reference to FIG. 3.

FIG. 3 is a flowchart showing the outline of the overall process executed by the image processing system according to the first embodiment of the present invention.

In step S120, the image input unit 110 of the MFP 100 raster-scans and reads a document to obtain an 8-bit image signal of 600 dpi. The image signal undergoes a pre-process by the data processing unit 115 and is stored as image data (raster image data) for one page in the storage unit 111.

In step S121, the data processing unit 115 performs a block selection (BS) process (objectification process). For example, this process is executed under the control of the management PC 101.

More specifically, the CPU of the management PC 101 divides the image signal to be processed that is stored in the storage unit 111, into a text/line image part and halftone image part. The CPU further divides the text/line part into blocks of paragraphs, or tables or graphics formed by lines.

The CPU divides the halftone image part into independent objects (blocks) for so-called blocks (e.g., image parts and background parts of rectangular blocks).

In the first embodiment, examples of the attribute are text, graphic (thin line and graphic), table, image, and background. However, the types of attributes are not limited to them, other types of attributes can also be employed in accordance with the application purpose, and all the attributes need not be used.

For each of blocks generated by this BS process, block information, i.e., information that pertains to the block is generated, as will be described later in detail.

In step S122, the process results (objects) of the BS process in step S121 are displayed on the display unit 116. Also, a consideration (charge) accrued from the vectorized process for the process results is calculated by referring to the management counter 117 and a charge table, and the calculated consideration is also displayed on the display unit 116. Details of this process will be described in detail.

In step S123, each text block obtained by the BS process in step S122 undergoes character recognition by OCR.

In step S124, a vectorized process of converting raster image data (read document image input in step S120) into vector data is executed.

In the vectorized process, the size, style, and font of characters are further recognized for each text block having undergone the OCR process in step S123. The text block is converted into font data visually faithful to characters obtained by scanning the document. Table and graphic blocks formed from lines are converted into outline data. Image blocks are converted into separate JPEG files as image data.

The vectorized process for these various kinds of blocks is performed for each block on the basis of its block information. Also, the layout information of the block is stored.

In step S125, an application data convert process of converting vector data obtained in step S124 into application data of a predetermined format (e.g., an RTF format) which can be processed by a word processing application is executed. In step S126, the generated application data is stored as an electronic file corresponding to the raster image data input in step S120 in a storage destination such as the storage unit 111 or document management server 106.

In step S127, in order to allow a direct search for an electronic file corresponding to a read document image upon performing a similar process, an indexing process of generating index information for electronic file search is executed. Generated index information is appended to, e.g., a search index file managed by the storage unit 111.

In step S128, the display unit 116 is notified of the storage address of the electronic file stored in step S126.

In step S129, a pointer information appending process is performed to generate pointer information for a read document image and append the pointer information as image data to an electronic file corresponding to the read document image.

The electronic file to which the pointer information is appended is stored in, e.g., the hard disk in the client PC 102 in FIG. 1, the database 105, or the storage unit 111 of the MFP 100 itself.

In step S130, a billing process for the charge of a series of operations of the vectorized process is executed, details of which will be described later.

In step S131, an operation window is presented on the display unit 116 to perform various kinds of processes (e.g., edit/storage/transmission (FAX transmission, e-mail transmission, or file transmission)/printing) for the electronic file corresponding to the read document image. Various kinds of processes for the electronic file can be performed via the operation window.

In the case of printing (copying) out of these kinds of processes, the electronic file undergoes image processes such as a color process and spatial frequency correction suitable for each object and then is printed from the printing unit 112. In the case of storage, the electronic file is stored in the storage unit 111. In the case of transmission (file transmission), the electronic file is converted into a general file format reusable at a file destination such as RTF (Rich Text Format) or SVG (Scalable Vector Graphics) serving as vector data of an attribute-attached description language, and is sent to the file destination (e.g., the client PC 102) via the network I/F 114.

In this manner, the image processing system generally manages vector data as an original electronic file corresponding to a read document image, and can perform various kinds of processes using the vector data. Accordingly, the information amount of data to be processed can be reduced, and the storage efficiency can be increased. The transmission time can be shortened, and the original electronic file can be output as a high-quality image in outputting (display/printing).

A business model "vectorization service" can be provided by executing the billing process on the basis of the contents of vectorization when vectorizing a read document.

[Details of Each Process]

Details of each process will be explained.

[Block Selection Process]

Details of the BS process in step S121 will be described first.

Figure 4B:
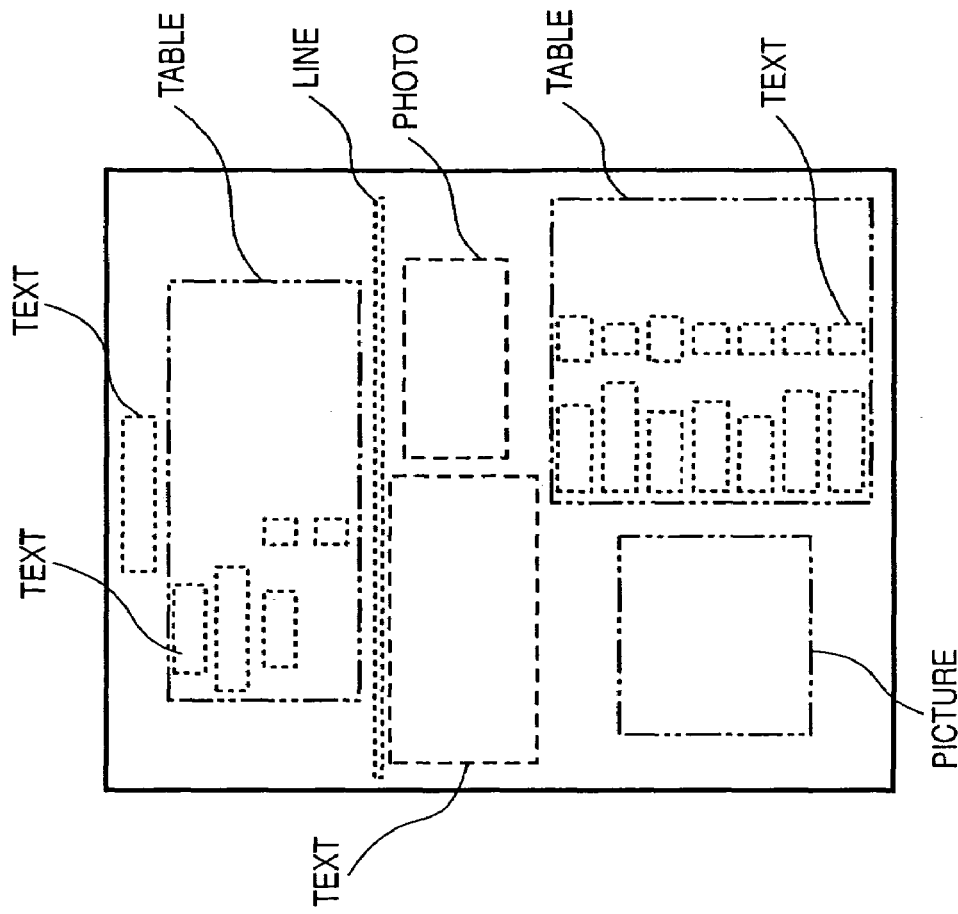
FIG. 4B is a view for explaining the concept of the block selection process according to the first embodiment of the present invention.
Figure 4A:
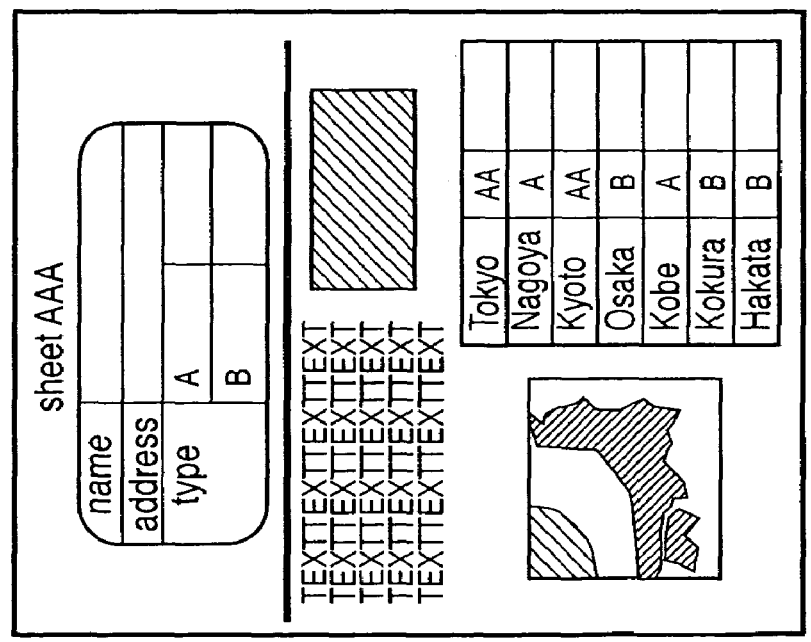
FIG. 4A is a view for explaining the concept of a block selection process according to the first embodiment of the present invention.

In the BS process, for example, a raster image in FIG. 4A is recognized as meaningful blocks, as shown in FIG. 4B. The attributes (e.g., text/picture/photo/line/table) of the blocks are determined, and the image is divided into blocks having different attributes.

An example of the BS process will be described below.

An input image is binarized into a monochrome image, and edge tracking is performed to extract a cluster of pixels surrounded by a black pixel edge. In a cluster of black pixels in a large area, edge tracking is also performed for internal white pixels to extract a cluster of white pixels. Further, a cluster of black pixels is recursively extracted from the cluster of white pixels with a predetermined area or more.

Obtained clusters of black pixels are classified by size and shape into blocks having different attributes. For example, a block having an aspect ratio of almost 1 and a size of a predetermined range is defined as a pixel cluster corresponding to a text. A part of adjacent characters which can be neatly grouped is defined as a text block. A plane pixel cluster is defined as a line block. A range of a black pixel cluster which neatly contains rectangular white pixel clusters with a predetermined size or more is defined as a table block. A region where indefinite pixel clusters scatter is defined as a photo block. A pixel cluster with another arbitrary shape is defined as a picture block.

In the BS process, a block ID which identifies each block is issued, and the attribute (image, text, or the like) of each block, the size, the position (coordinates) in the original document, and the block are associated and stored as block information in the storage unit 111. The block information is used in the vectorized process in step S124 and the indexing process in step S127 (to be described later in detail).

An example of block information will be described with reference to FIG. 5.

FIG. 5 is a table showing an example of block information according to the first embodiment of the present invention.

As shown in FIG. 5, the block information comprises a block attribute which indicates the attribute of each block (1: text; 2: picture; 3: table; 4: line; and 5: photo), block position coordinates (X,Y), a block width W, a block height H, and the presence/absence of block OCR information (text data).

The block position coordinates (X,Y) indicate, e.g., position coordinates using those of the upper left corner of a document image as a start point (0,0). Each of the width W and height H is represented by, e.g., the number of pixels. In the BS process, input file information indicating the number N of blocks present in a document image (input file) is generated in addition to the block information. In the example of FIG. 5, the input file information N becomes equal to 6.

[Vectorized Process]

The vectorized process in step S124 of FIG. 3 will be described in detail below.

In the vectorized process, characters in a text block undergo the character recognition process.

In the character recognition process, a character image extracted for each character from a text block is recognized using one of pattern matching methods to obtain a corresponding text code. In this character recognition process, an observation feature vector obtained by converting a feature acquired from a character image into a several-ten-dimensional numerical value string is compared with a dictionary feature vector obtained in advance for each character type, and a character type with a shortest distance is output as a recognition result.

Various known methods are available for feature vector extraction. For example, a method of dividing a character into a mesh pattern, and counting character lines in respective meshes as line elements depending on their directions to obtain a (mesh count)-dimensional vector as a feature is known.

When a text block undergoes the character recognition process, the writing direction (horizontal or vertical) is determined for that text block, character strings are extracted in the corresponding directions, and characters are then extracted from the character strings to obtain character images.

Upon determining the writing direction (horizontal or vertical), horizontal and vertical projections of pixel values in that text block are calculated, and if the variance of the horizontal projection is larger than that of the vertical projection, that text block can be determined as a horizontal writing block; otherwise, that block can be determined as a vertical writing block. Upon decomposition into character strings and characters, for a text block of horizontal writing, lines are extracted using the horizontal projection, and characters are extracted based on the vertical projection for the extracted line. For a text block of vertical writing, the relationship between the horizontal and vertical parameters may be exchanged.

Note that a character size can be detected with the character recognition process.

A plurality of sets of dictionary feature vectors for the number of character types used in the character recognition process are prepared in correspondence with character shape types, i.e., font types, and a font type is output together with a text code upon matching, thus recognizing the font of a character.

Using a text code and font information obtained by the character recognition process, and outline data prepared for each text code and font, information of a text part is converted into vector data. If a document image is a color image, the color of each character is extracted from the color image and is recorded together with vector data.

With the above-mentioned processes, image information which belongs to a text block can be converted into vector data with a nearly faithful shape, size, and color.

For picture, line, and table blocks other than a text block, outlines of pixel clusters extracted in each block are converted into vector data.

Figure 6:
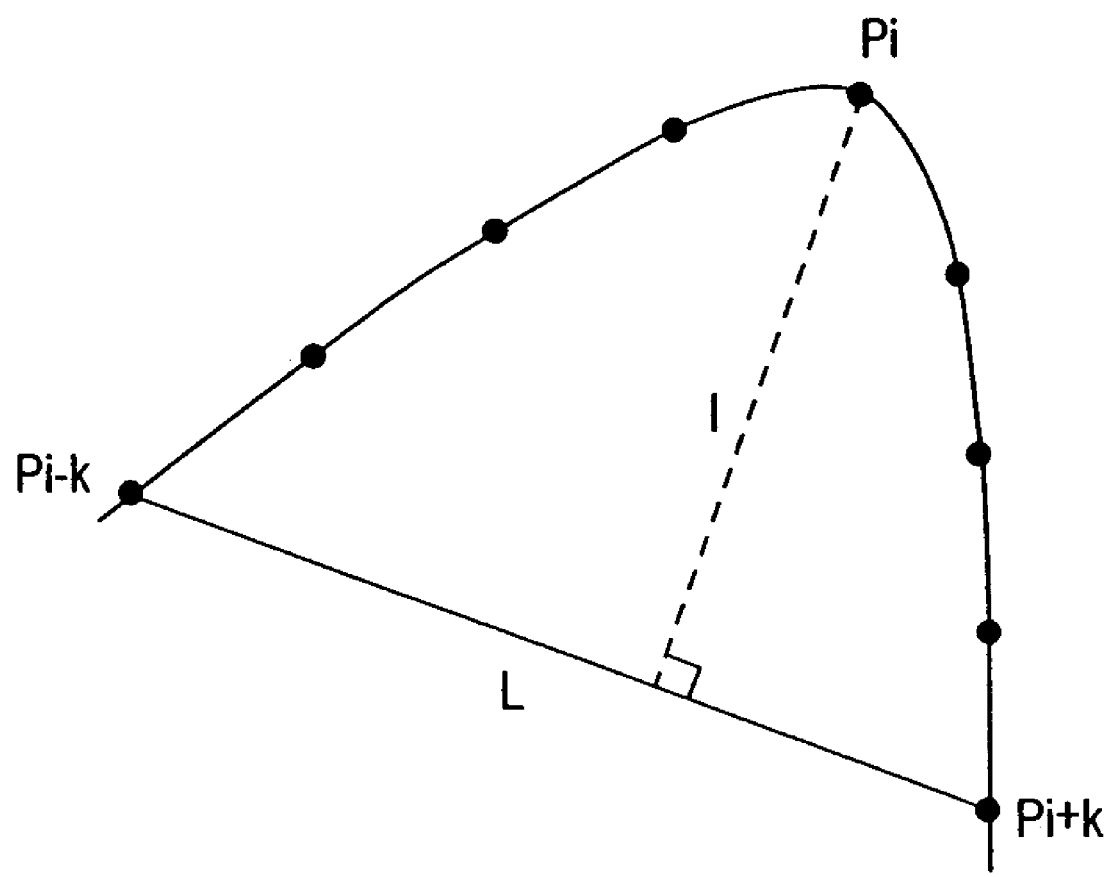
FIG. 6 is a view for explaining a vectorized process according to the first embodiment of the present invention.

More specifically, a point sequence of pixels which form an outline is divided into sections at a point which is considered as a corner, and each section is approximated by a partial line or curve. The corner means a point corresponding to a maximal curvature, and the point corresponding to the maximal curvature is obtained as a point where a distance between an arbitrary point Pi and a chord which is drawn between points Pi−k and Pi+k separated k points from the point Pi in the left and right directions becomes maximal, as shown in FIG. 6.

Furthermore, let R be (chord length/arc length between Pi−k and Pi+k). Then, a point where the value R is equal to or smaller than a threshold value can be considered as a corner. Sections obtained after division at each corner can be vectorized using a method of least squares or the like with respect to a point sequence for a line, and a ternary spline function or the like for a curve.

When an object has an inside outline, it is similarly approximated by a partial line or curve using a point sequence of a white pixel outline extracted in the BS process.

As described above, using partial line approximation, an outline of a graphic with an arbitrary shape can be vectorized. When a document image is a color image, the color of a graphic is extracted from the color image and is recorded together with vector data.

Figure 7:
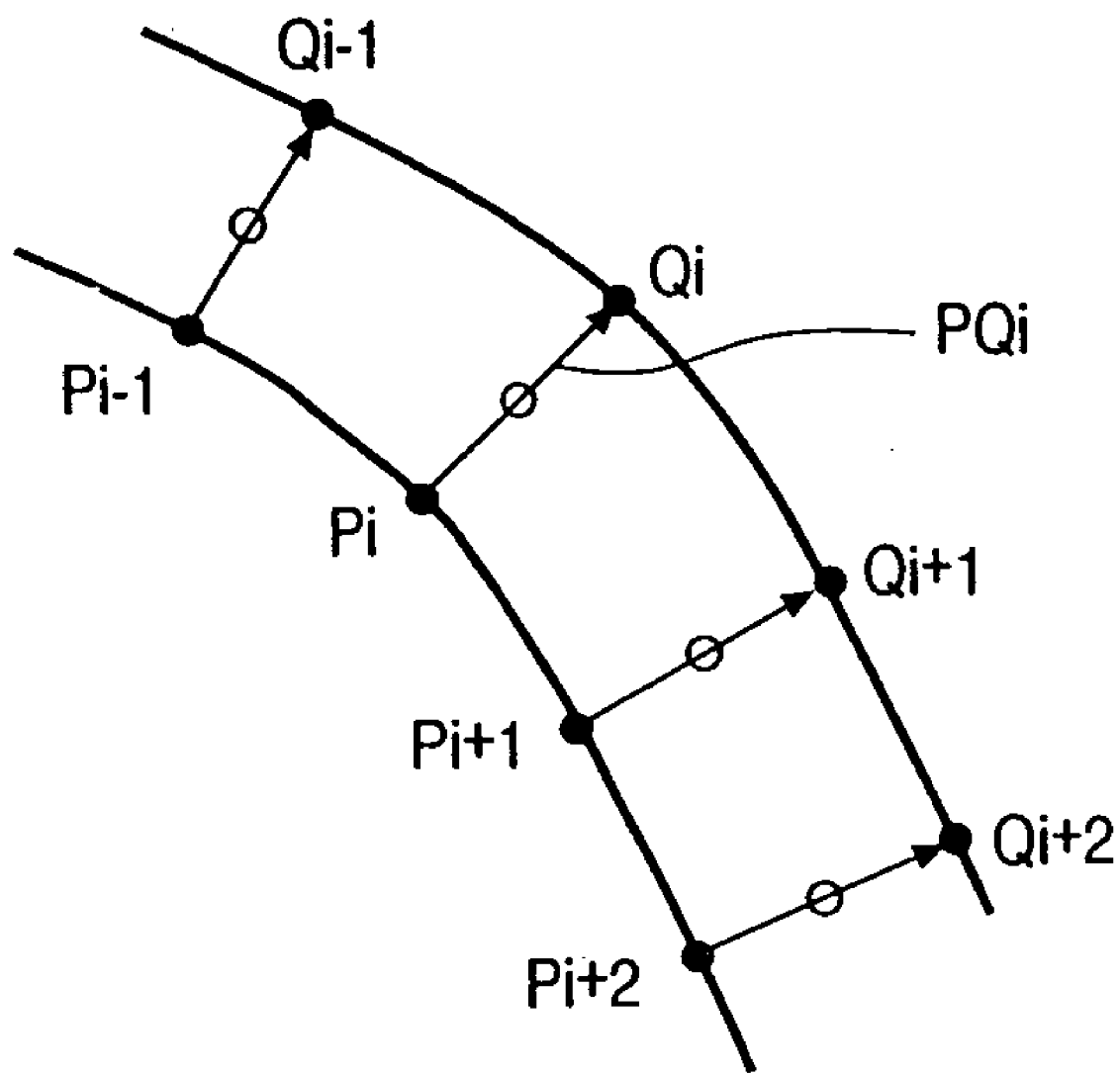
FIG. 7 is a view for explaining the vectorized process according to the first embodiment of the present invention.

Furthermore, when an outside outline is close to an inside outline or another outside outline in a given section, as shown in FIG. 7, two outlines may be combined to express a line with a given width.

More specifically, lines are drawn from respective points Pi on a given outline to points Qi on another outline, each of which has a shortest distance from the corresponding point. When the distances PQi maintain a constant value or less on the average, the section of interest is approximated by a line or curve using the middle points of the distances PQi as a point sequence, and the average value of the distances PQi is set as the width of that line or curve. A line or a table ruled line as a set of lines can be efficiently vectorized as a set of lines having a given width, as described above.

Note that vectorization using the character recognition process for a text block has been explained. A character which has the shortest distance from a dictionary as a result of the character recognition process is used as a recognition result. When this distance is equal to or larger than a predetermined value, the recognition result does not always match an original character, and a wrong character having a similar shape is often recognized.

Therefore, in the present invention, such a text block is handled in the same manner as a general line image, as described above, and is converted into outline data. That is, even a character that causes a recognition error in the conventional character recognition process can be prevented from being vectorized to a wrong character, but can be vectorized based on outline data which is visually faithful to image data.

Note that a photo block is not vectorized, and is output as image data.

A grouping process of grouping vector data obtained in the vectorized process for each graphic block will be described below with reference to FIG. 8.

Figure 8:
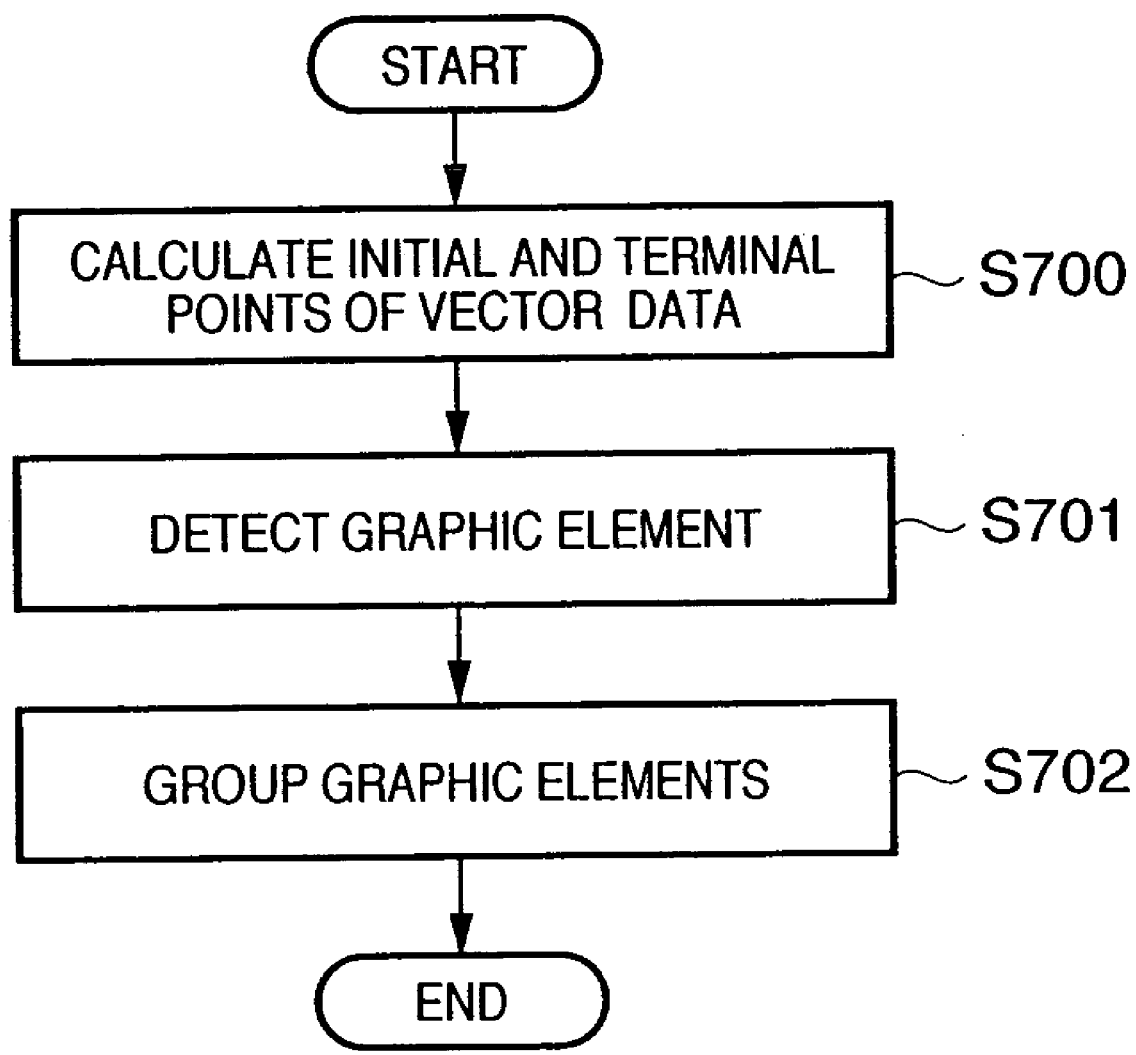
FIG. 8 is a flowchart showing a vector data grouping process according to the first embodiment of the present invention.

FIG. 8 is a flowchart showing the vector data grouping process according to the first embodiment of the present invention.

A process of grouping vector data for each graphic block will be described particularly with reference to FIG. 8.

In step S700, initial and terminal points of each vector data are calculated. In step S701, using the initial point information and terminal point information of respective vectors, a graphic element is detected.

Detecting a graphic element is to detect a closed graphic formed by partial lines. The detection is made by applying the principle that each vector which forms a closed shape has vectors coupled to its two ends.

In step S702, other graphic elements or partial lines present in the graphic element are grouped to set a single graphic object. If other graphic elements or partial lines are not present in the graphic element, that graphic element is set as a graphic object.

Details of the process in step S701 of FIG. 8 will be described with reference to FIG. 9.

Figure 9:
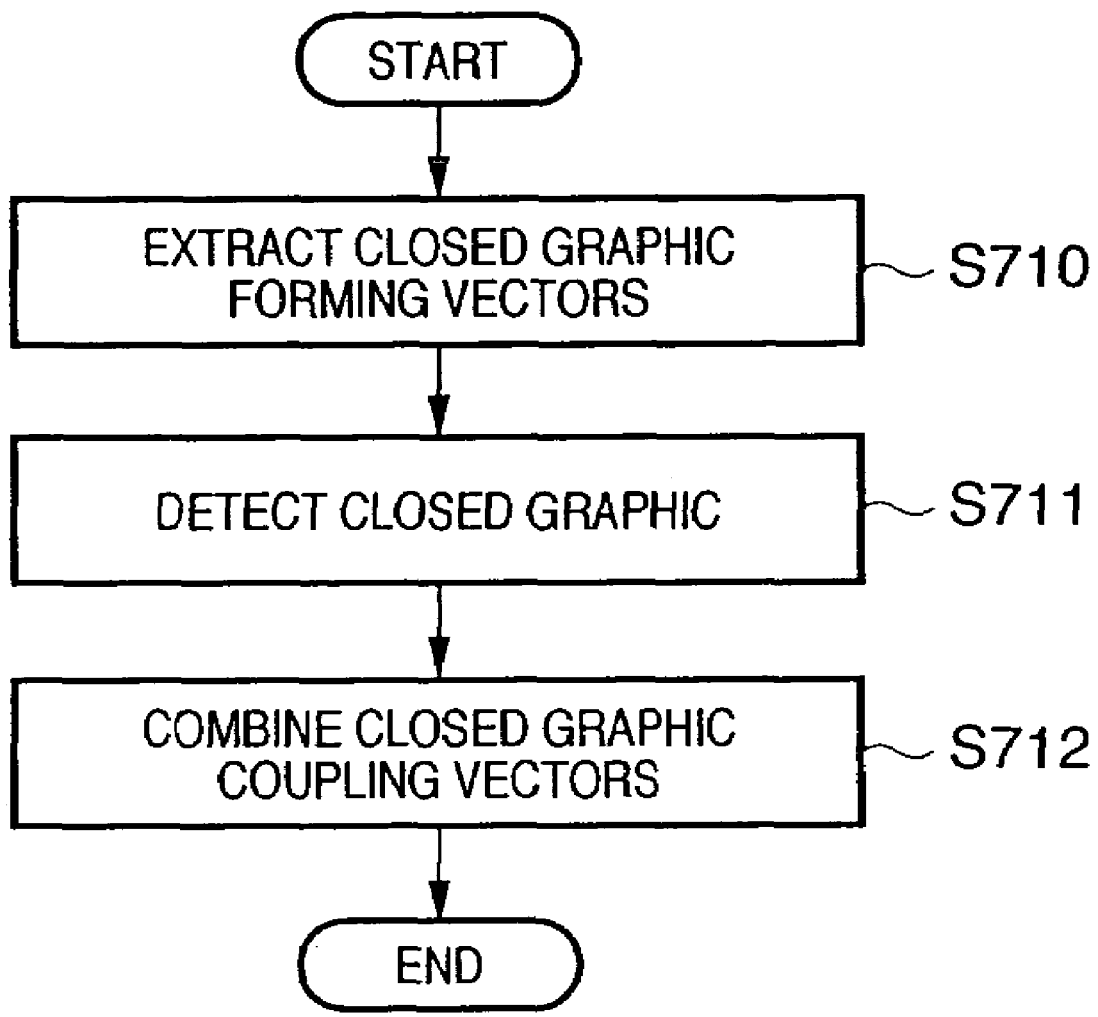
FIG. 9 is a flowchart showing details of a process in step S701 according to the first embodiment of the present invention.

FIG. 9 is a flowchart showing details of the process in step S701 according to the first embodiment of the present invention.

In step S710, closed graphic forming vectors are extracted from vector data by excluding unwanted vectors, two ends of which are not coupled to other vectors.

In step S711, an initial point of a vector of interest of the closed graphic forming vectors is set as a start point, and vectors are traced clockwise in turn. This process is made until the start point is reached, and all passing vectors are grouped as a closed graphic that forms one graphic element. Also, all closed graphic forming vectors present in the closed graphic are grouped. Furthermore, an initial point of a vector which is not grouped yet is set as a start point, and the same process is repeated.

Finally, in step S712, of the unwanted vectors excluded in step S710, those (closed-graphic-coupled vectors) which join the vectors grouped as the closed graphic in step S711 are detected and grouped as one graphic element.

With the above-mentioned process, a graphic block can be handled as an independently reusable graphic object.

[Application Data Convert Process]

The application data convert process in step S125 of FIG. 3 will be described in detail.

Figure 10:
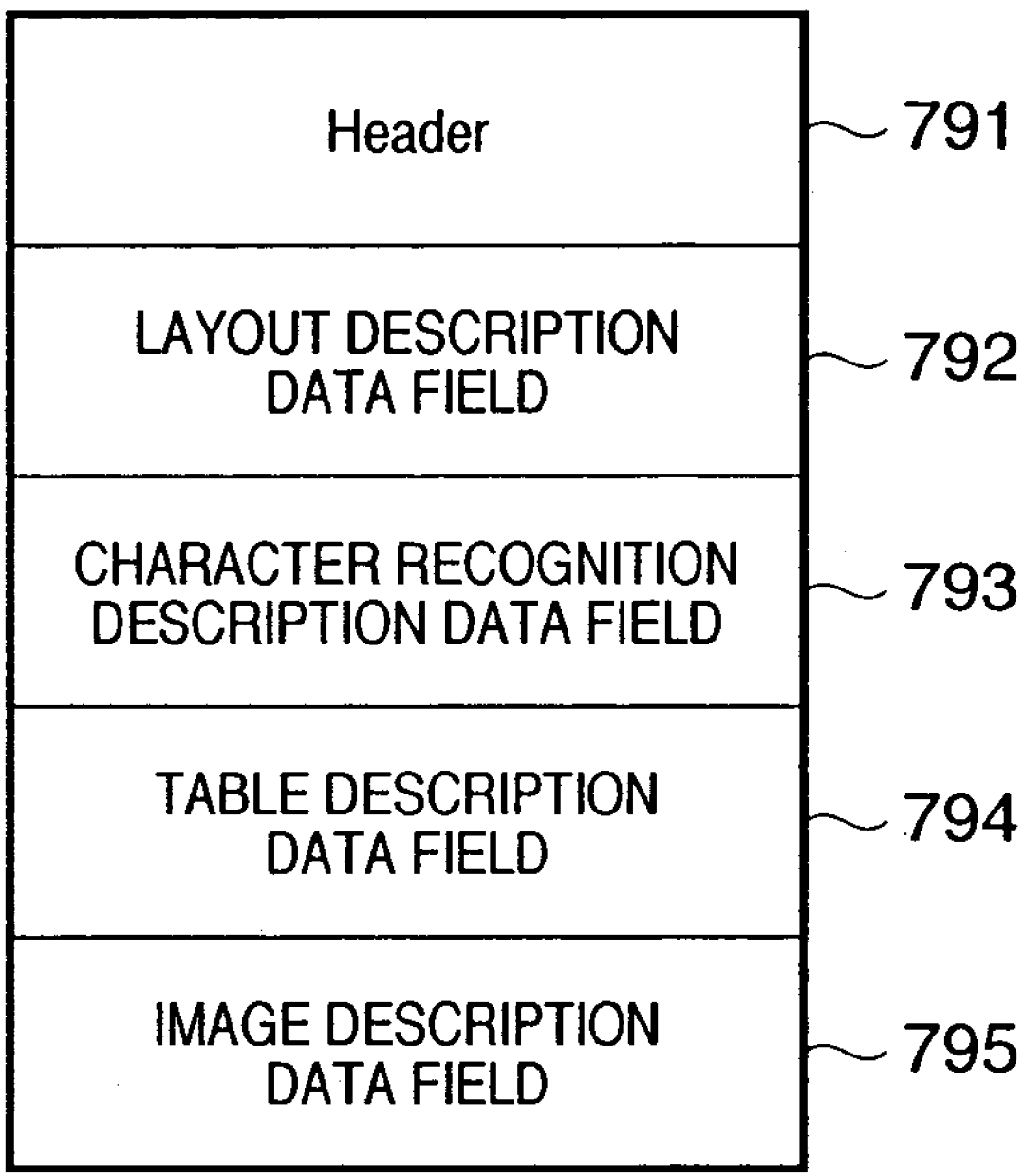
FIG. 10 is a view showing the data structure of a DAOF according to the first embodiment of the present invention.

The result of the BS process in step S121 of FIG. 3 and that of the vectorized process in step S124 are converted into a file of an intermediate data format, as shown in FIG. 10. This data format is called a document analysis output format (DAOF).

The data structure of the DAOF will be described with reference to FIG. 10.

FIG. 10 is a view showing the data structure of the DAOF according to the first embodiment of the present invention.

Referring to FIG. 10, a header 791 holds information associated with a document image to be processed. A layout description data field 792 holds attribute information and rectangle address information of respective blocks which are recognized for respective attributes such as TEXT (text), TITLE (title), CAPTION (caption), LINEART (line image), PICTURE (natural image), FRAME (frame), and TABLE (table).

A character recognition description data field 793 holds character recognition results obtained by performing character recognition of TEXT blocks such as TEXT, TITLE, and CAPTION.

A table description data field 794 stores details of the structure of TABLE blocks. An image description data field 795 stores image data of PICTURE blocks, LINEART blocks, and the like extracted from the document image data.

The DAOF itself is often stored as a file in place of intermediate data. However, in the state of a file, a general word processing application cannot reuse individual objects (blocks).

Hence, in the first embodiment, the application data convert process (step S125) of converting the DAOF into application data which can be used by a word processing application will be described in detail with reference to FIG. 11.

Figure 11:
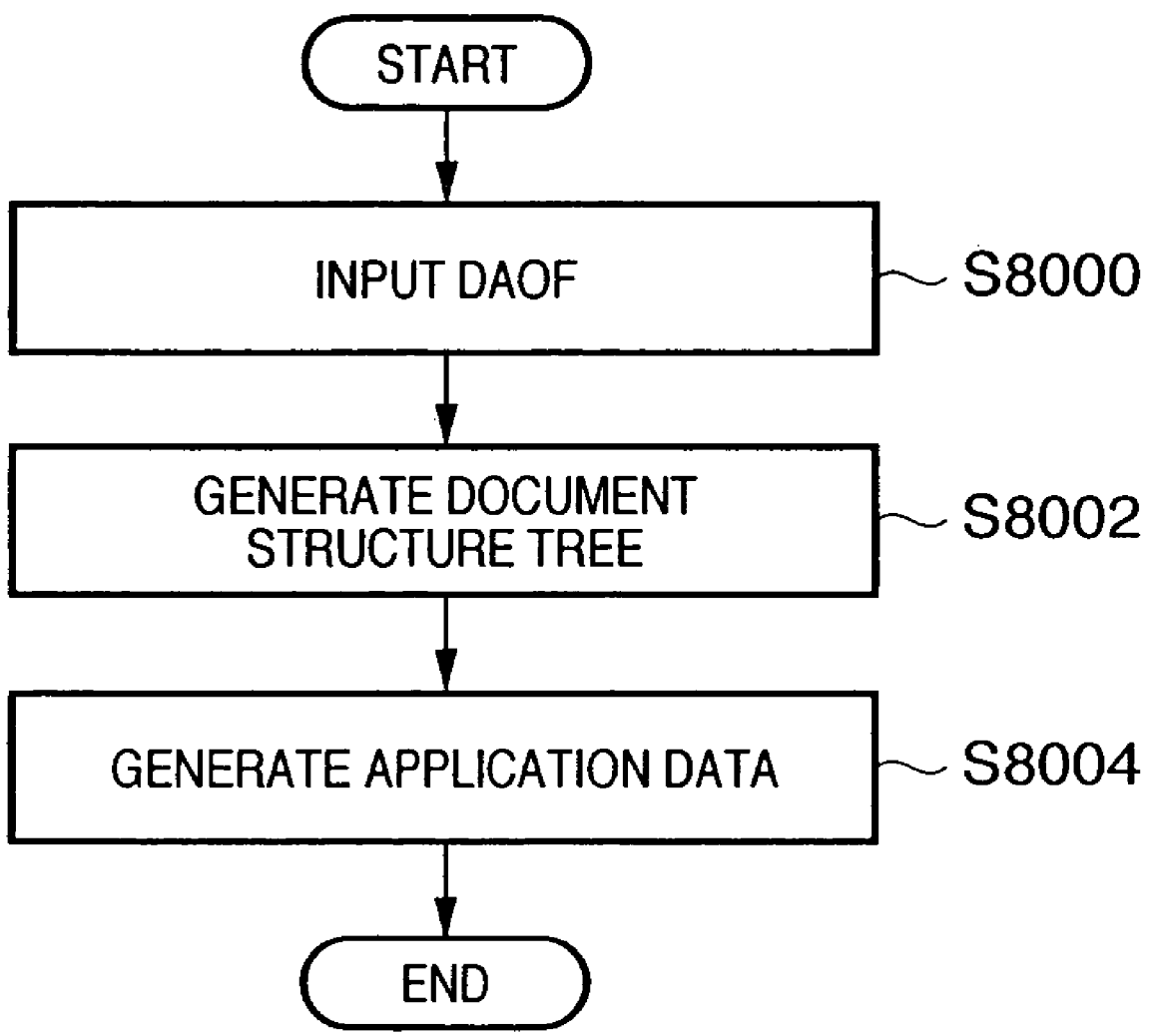
FIG. 11 is a flowchart showing details of a process in step S125 according to the first embodiment of the present invention.

FIG. 11 is a flowchart showing details of the process in step S125 according to the first embodiment of the present invention.

In step S8000, DAOF data is input. In step S8002, a document structure tree which serves as a basis of application data is generated. In step S8004, actual data in the DAOF are input based on the document structure tree, thus generating actual application data.

Details of the process in step S8002 of FIG. 11 will be described with. reference to FIG. 12.

Figure 12:
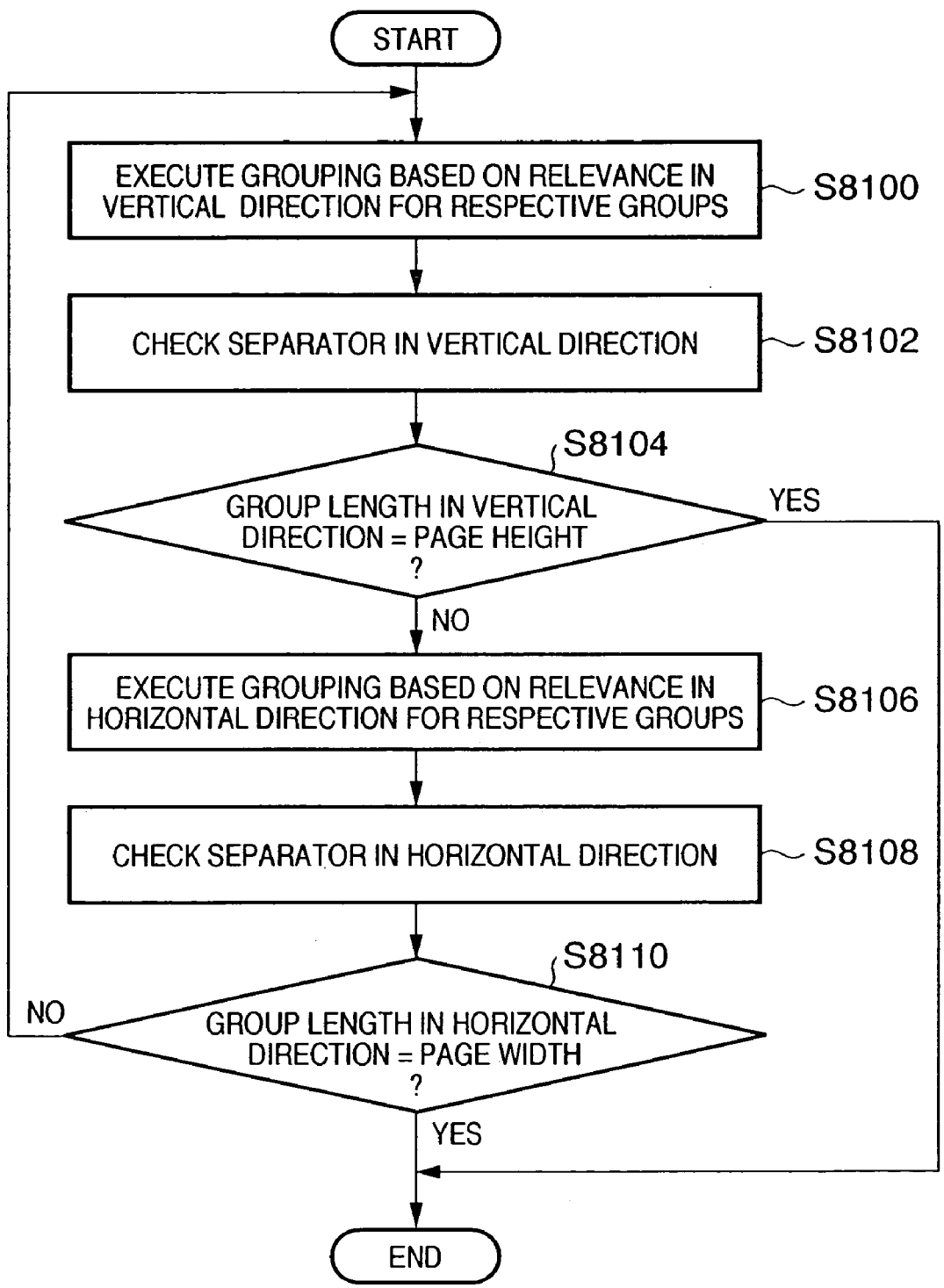
FIG. 12 is a flowchart showing details of a process in step S8002 according to the first embodiment of the present invention.
Figure 13A:
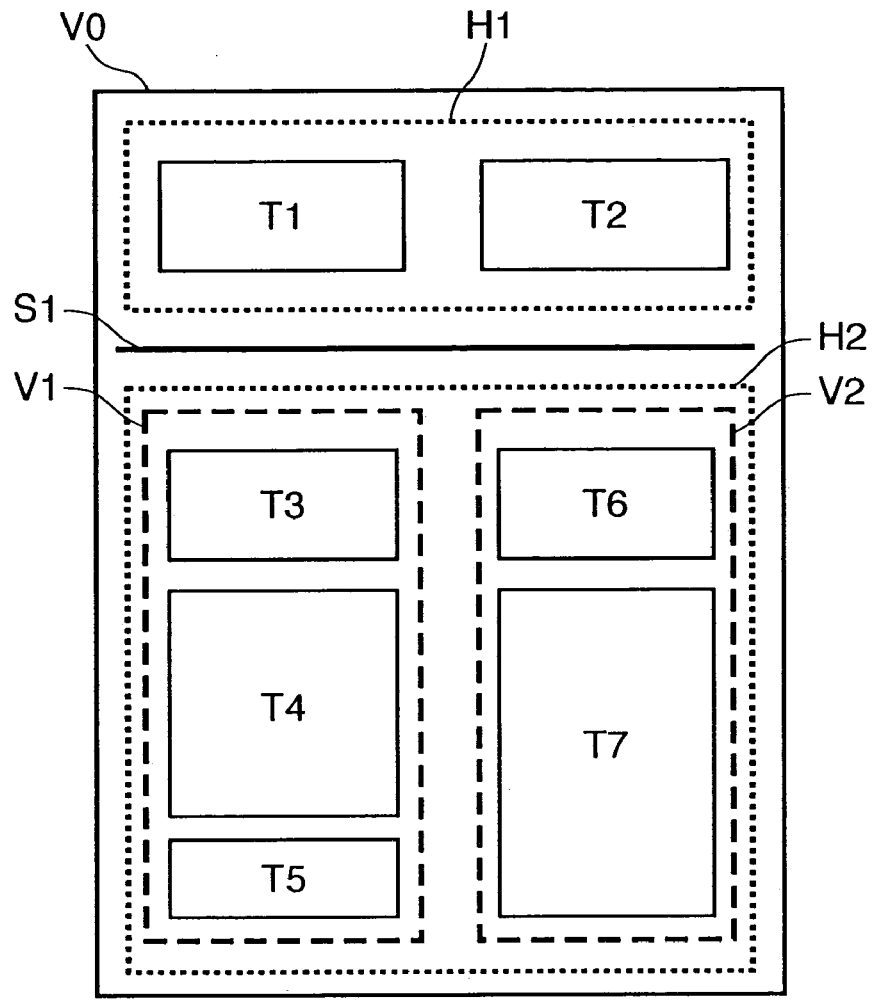
FIG. 13A is an explanatory view showing a document structure tree according to the first embodiment of the present invention.
Figure 13B:
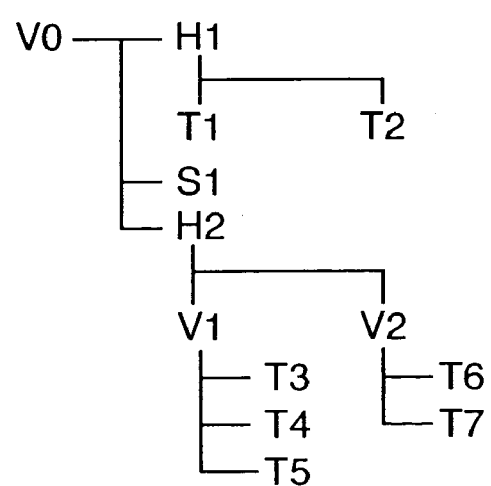
FIG. 13B is an explanatory view showing the document structure tree according to the first embodiment of the present invention.

FIG. 12 is a flowchart showing details of the process in step S8002 according to the first embodiment of the present invention. FIGS. 13A and 13B are explanatory views showing a document structure tree according to the first embodiment of the present invention.

In the process shown in FIG. 12, as a basic rule of the overall control, the flow of process transits from a microblock (single block) to a macroblock (a set of blocks).

In this case, a block indicates a microblock and macroblock.

In step S8100, re-grouping is done for respective blocks on the basis of relevance in the vertical direction. Immediately after the flow starts, determination is made for respective microblocks.

Note that relevance can be defined by determining whether the distance between neighboring blocks is small, blocks have nearly the same block widths (heights in the horizontal direction), and the like. Information of the distances, widths, heights, and the like can be extracted with reference to the DAOF.

FIG. 13A shows the page configuration of an actual document image, and FIG. 13B shows a document structure tree of that page. As a result of the process in step S8100, blocks T3, T4, and T5 are determined to form one group V1, blocks T6 and T7 are determined to form one group V2, and these groups are generated as those which belong to an identical layer.

In step S8102, the presence/absence of a vertical separator is determined. Physically, a separator is a block which has a line attribute in the DAOF. Logically, a separator is an element which explicitly divides blocks in a word processing application. Upon detection of a separator, a group is re-divided in the identical layer.

It is then determined in step S8104 using a group length if no more divisions are present. More specifically, it is determined whether the group length in the vertical direction agrees with a page height. If the group length in the vertical direction agrees with the page height (YES in step S8104), the process ends. On the other hand, if the group length in the vertical direction does not agree with the page height (NO in step S8104), the flow advances to step S8106.

The document image in FIG. 13A has no separator, and its group lengths do not agree with the page height. Hence, the flow advances to step S8106.

In step S8106, re-grouping is done for respective blocks on the basis of relevance in the horizontal direction. In this process as well, the first determination immediately after the start is done for respective microblocks. The definitions of relevance and its determination information are the same as those in the vertical direction.

In the document image of FIG. 13A, the blocks T1 and T2 generate a group H1, and the groups V1 and V2 generate a group H2. The groups H1 and H2 are generated as those which belong to an identical layer one level higher than the groups V1 and V2.

In step S8108, the presence/absence of a separator in the horizontal direction is determined. Since FIG. 13A includes a separator S1 in the horizontal direction, that separator is registered in a document structure tree, thus generating the layers H1, S1, and H2.

It is determined in step S8110 using a group length in the horizontal direction if no more divisions are present. More specifically, it is determined whether the group length in the horizontal direction agrees with a page width. When the group length in the horizontal direction agrees with the page width (YES in step S8110), the process ends. On the other hand, if the group length in the horizontal direction does not agree with the page width (NO in step S8110), the flow returns to step S8100 to repeat the processes from step S8100 in an upper layer by one level.

In the document image of FIG. 13A, since the group length in the horizontal direction agrees with the page width, the process ends in step S8110, and an uppermost layer V0 that represents the entire page is finally appended to the document structure tree.

After the document structure tree is completed, application data is generated based on the document structure tree in step S8004 of FIG. 11.

A practical example in FIG. 13A will be explained below.

That is, since the group H1 includes the two blocks T1 and T2 in the horizontal direction, it is output as two columns. After internal information of the block T1 (with reference to the DAOF, text as the character recognition result, image, and the like) is output, a new column is set, and internal information of the block T2 is output. After that, the separator S1 is output.

Since the group H2 includes the two blocks V1 and V2 in the horizontal direction, it is output as two columns. Internal information of the block V1 is output in the order of the blocks T3, T4, and T5, and a new column is set. Then, internal information of the block V2 is output in the order of the blocks T6 and T7.

In this manner, the convert process from DAOF into application data can be done.

[Pointer Information Appending Process]

Details of the pointer information appending process in step S129 of FIG. 3 will be described.

Pointer information can be appended into a two-dimensional barcode which is embedded in an image. So-called watermarking methods including a method of directly appending pointer information to an electronic file as a character string, a method of embedding information by modulating the spacings of a character string in an electronic file (especially, the spacings between neighboring characters), and a method of embedding information in a halftone image (thumbnail image) in an electronic file, can be applied in addition to the two-dimensional barcode.

Operation windows for executing various functions implemented by the MFP 100 will be explained.

[Description of Operation Unit 113 and Display Unit 116]

FIGS. 14A to 14D are views showing examples of operation windows according to the first embodiment of the present invention.

In particular, these operation windows are examples of ones each comprising the operation unit 113 and display unit 116.

An operation window 10000 is formed by integrating the operation unit 113 and display unit 116. The operation unit 113 and display unit 116 comprise an LCD and touch panel in this example, but the operation unit 113 may be independently formed from a hard key or mouse pointer, and the display unit 116 may be formed from a CRT or the like.

[Basic Operation Specifications]

Figure 14A:
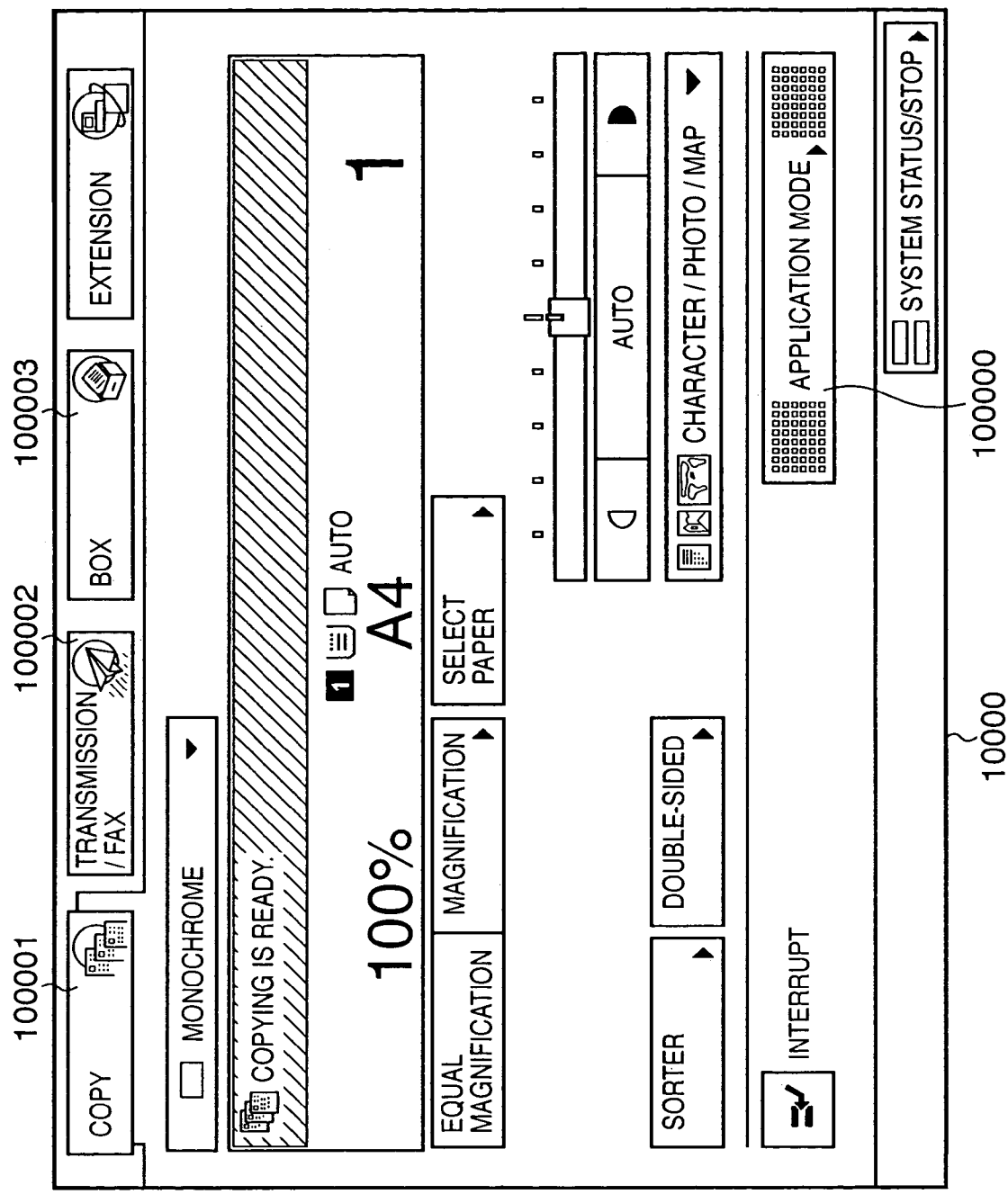
FIG. 14A is a view showing an example of an operation window according to the first embodiment of the present invention.

The operation window 10000 in FIG. 14A is the basic operation window of the MFP 100 according to the first embodiment. Various functions according to the first embodiment are selected via this basic operation window. FIG. 14A illustrates an operation window used to execute the copying function. The vector scan function described above is executed on the basis of an application mode key 100000 in the example of the operation window 10000.

Figure 14B:
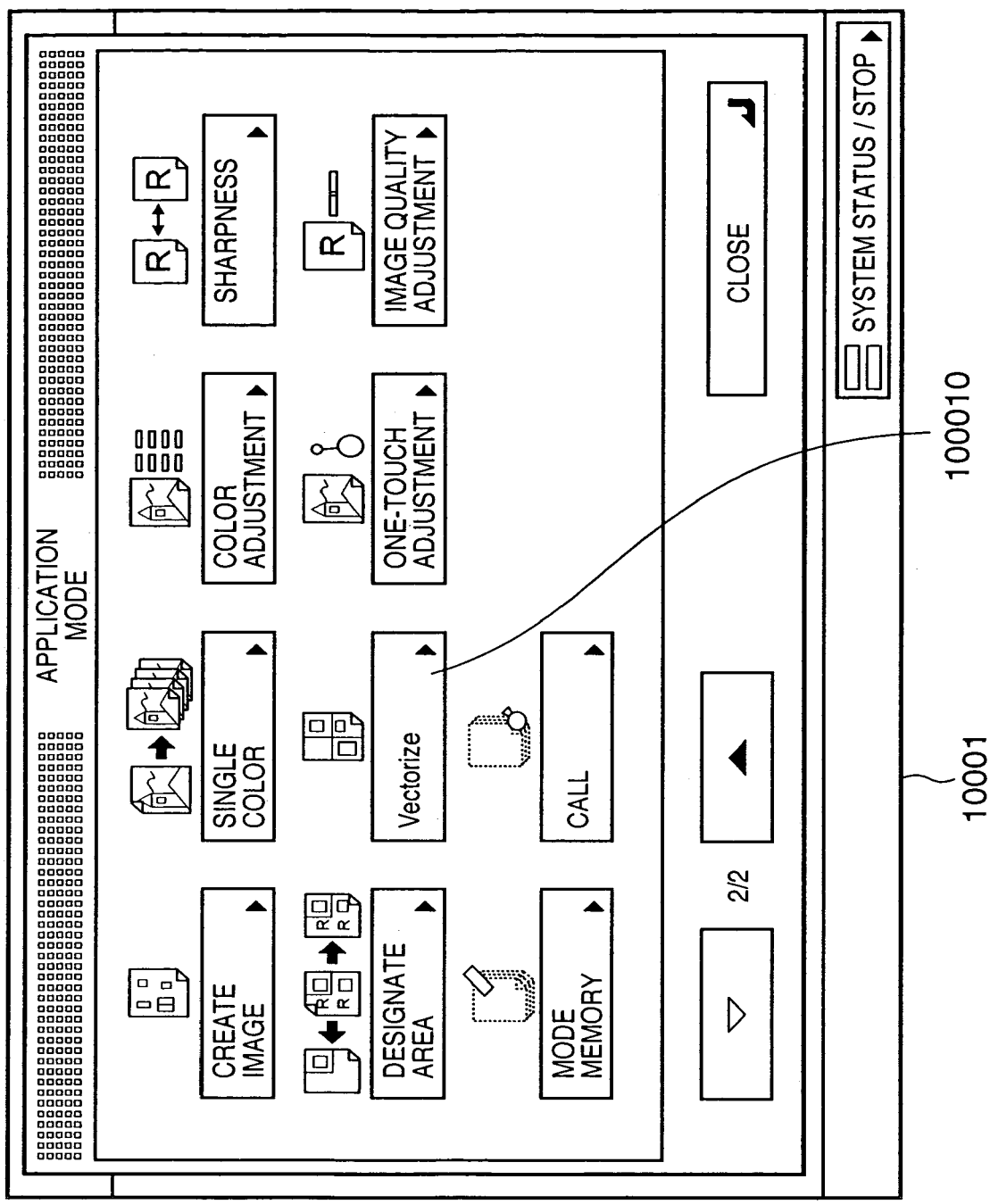
FIG. 14B is a view showing an example of an operation window according to the first-embodiment of the present invention.

When the application mode key 100000 is touched, the operation window 10000 is switched to an application mode window 10001 in FIG. 14B that is formed from various modes prepared as application modes by the MFP 100.

In the application mode window 10001 of FIG. 14B, a Vectorize key 100010 is a selection key which enables the above-mentioned vector scan function. When the Vectorize key 100010 is touched, an operation window 10002 in FIG. 14C is displayed.

In the operation window 10002 of FIG. 14C, a scanning start key 100020 is used to give an instruction to start scanning a document. When the key is touched, a document is read. After the end of reading the document, the display switches to an operation window 10003 in FIG. 14D.

In the first embodiment, processes up to the BS process in step S121 of FIG. 3 are executed for a read document image input in S120 of FIG. 3, and the process result (result of the objectification process) is temporarily stored in, e.g., the storage unit 111.

Figure 14D:
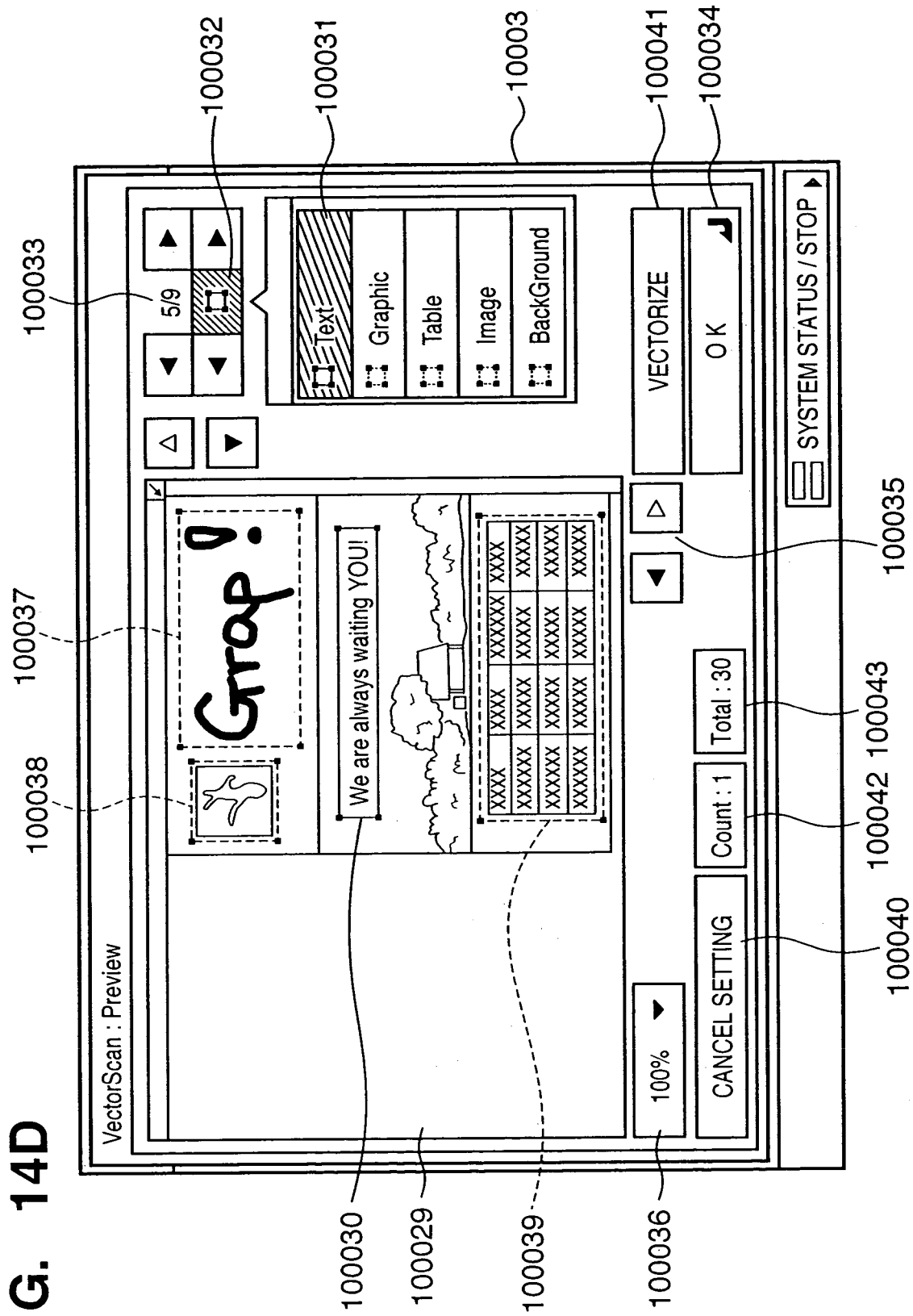
FIG. 14D is a view showing an example of an operation window according to the first embodiment of the present invention.

The operation window 10003 in FIG. 14D displays an image 100029 containing the process result, and objects which form the image 100029 are enclosed and displayed in rectangular frames by respective units (attributes).

The objects are represented with the rectangular frames of different colors which depend on their attributes automatically recognized in the block selection process in step S121 of FIG. 3.

For example, if rectangular frames enclosing respective objects are represented in different colors (e.g., red for TEXT (text) and yellow for IMAGE (photo)), the attribute-specific objects obtained in the block selection process can easily recognized. This improves the visibility of the operator. Instead of variations in color, rectangular frames may be differentiated from each other by variations in any other display style such as the width or shape (dotted frame). Alternatively, each object may be screened.

An image (platen image) obtained by reading the document with the image input unit 110 is displayed as the image 100029 in the initial state. The size of the image can be enlarged/reduced by using an enlargement/reduction key 100036, as needed. Assume that the display contents of the enlarged image 100029 exceed the display area in size, and the entire contents cannot be viewed. In this case, the invisible portion can be confirmed by scrolling across and down the image 100029 using scroll keys 100035.

FIG. 14D shows a state wherein a text object 100030 (character string "We are always waiting YOU!") at the center of the image 100029 is selected. In FIG. 14D, the object in a selected state is enclosed in a solid rectangular frame of a color indicating its attribute (in this case, red) while the remaining objects in an unselected state are enclosed in dashed rectangular frames of colors indicating their attributes. By differentiating between the display style of a rectangular frame in the selected state and that of a rectangular frame in the unselected state, the selected state/unselected state of each object can be confirmed with ease.

In this example, the text object 100030 is enclosed in a red solid rectangular frame; a graphic object 100037, a blue dashed rectangular frame; an image object 100038, a yellow dashed rectangular frame; and a table object 100039, a green dashed rectangular frame. The remaining object is a background object.

The background object is an image part left after extracting the objects constituting the image 100029 and is not enclosed in a rectangular frame. However, for background designation, the background image may be enclosed in a rectangular frame similarly to other objects. In this case, the visibility of the background object may be increased by hiding other objects.

As methods of selecting an object to be edited (e.g., editing of a character string in the case of a text object and color adjustment in the case of a graphic object), there are available a method of directly touching a region within, e.g., the text object 100030 and a method of designating the object using object selection keys 100032. By either method, the rectangular frame of a selected object becomes a solid one while the rectangular frames of the unselected objects become dashed ones.

At the same time, one of object attribute keys 100031 (Text is selected in this example, and others are Graphic, Table, Image, and Background) corresponding to the attribute of the selected object is selected. In this case, to show its selected state, the corresponding object attribute key is screened. Other display styles such as hatched display, blinking display, and the like can be adopted as far as they can represent the selected state/unselected state.

Assume that a document containing a plurality of pages is read using an ADF. In the initial state, the image of the first one of the plurality of pages is displayed in the operation window 10003. As for the subsequent pages, the image can be switched to the image of a desired page using page designation keys 100033.

Setting of whether the vectorized result of a selected object is OK (setting for determining (saving) vector data) is decided with a vectorize key 100041. When vectorization is permitted, the vectorize key 100041 is highlighted; otherwise, the vectorize key 100041 is displayed in a normal way.

FIG. 14D shows a state wherein vectorization of a selected object (text object 100030) is inhibited. If an OK key 100034 is touched in this state, the current settings are saved as vectorization control information in the storage unit 111. The vectorization control information contains charge information representing the charge of the vectorized process.

Reference numeral 100042 denotes an object-specific vectorized process charge display area which displays the charge of the vectorized process for a selected object. In this example, the charge of the vectorized process for a selected object is given by a corresponding object count, and the user is billed for a charge corresponding to the object count. In place of the object count, an actual charge may be displayed. Charge information can be displayed in any form as far as the charge of an object can be presented.

The charge of vectorization for each object may be changed depending on the area of a region obtained upon executing the BS process. The charge may be set high for an image object and low for a text object (or vise versa). By displaying a dedicated management window, the charge can be arbitrarily set by the administrator using the operation unit 113 and display unit 116. Since billing of the vectorized process can be controlled (changed) for each object, the billing process can be executed in accordance with the usage of the apparatus.

Reference numeral 100043 denotes a total object vectorized process charge display area which displays the charge of the vectorized process for all objects present in the image 100029. In this example, the charge of the vectorized process for all objects is given by a corresponding object count, and the user is billed for a charge corresponding to the object count. Instead of the object count, an actual charge may be displayed. Charge information can be displayed in any form as far as the charge of objects can be presented.

The charge display areas 100042 and 100043 allow the operator to easily confirm the charge from the vectorized process.

When the OK key 100034 is touched, a vectorized process corresponding to one or more objects selected from the displayed image 100029 is executed. When a setting cancel key 100040 is touched, various settings made in the operation window 10003 are discarded, and the operation window 10003 returns to the basic window 10000 of FIG. 14A.

[Billing Process]

Details of the billing process in step S130 of FIG. 3 will be explained.

After the pointer information appending process ends, the billing process for vector scan is executed. The billing process is based on a charge table by integrating the count value of the management counter 117.

The following description assumes that the management counter 117 is configured as a department management counter in order to execute the billing process for each department in an organization containing a plurality of departments.

Figure 15B:
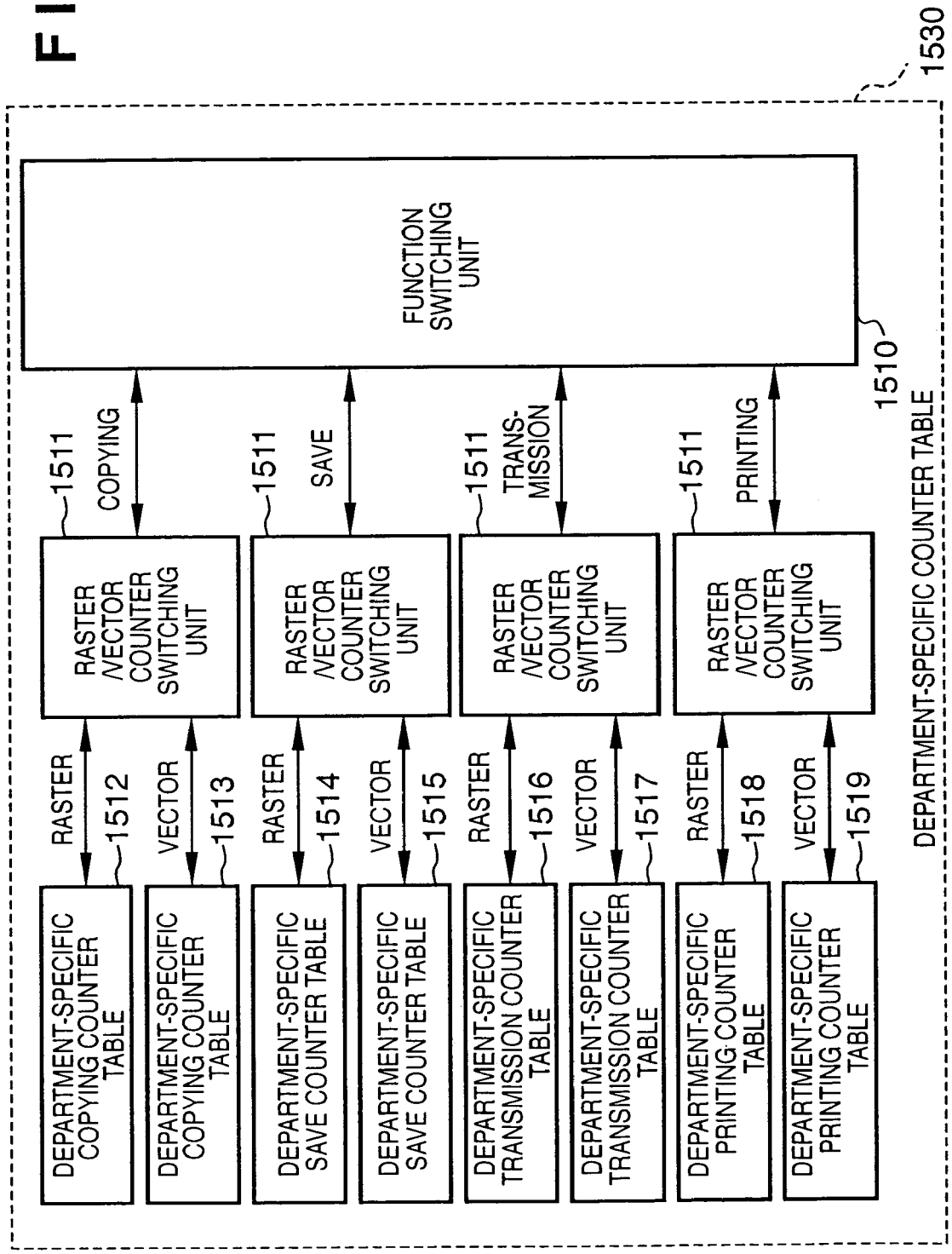
FIG. 15B is a block diagram showing an example of the arrangement of the department-specific counter table according to the first embodiment of the present invention.
Figure 15C:
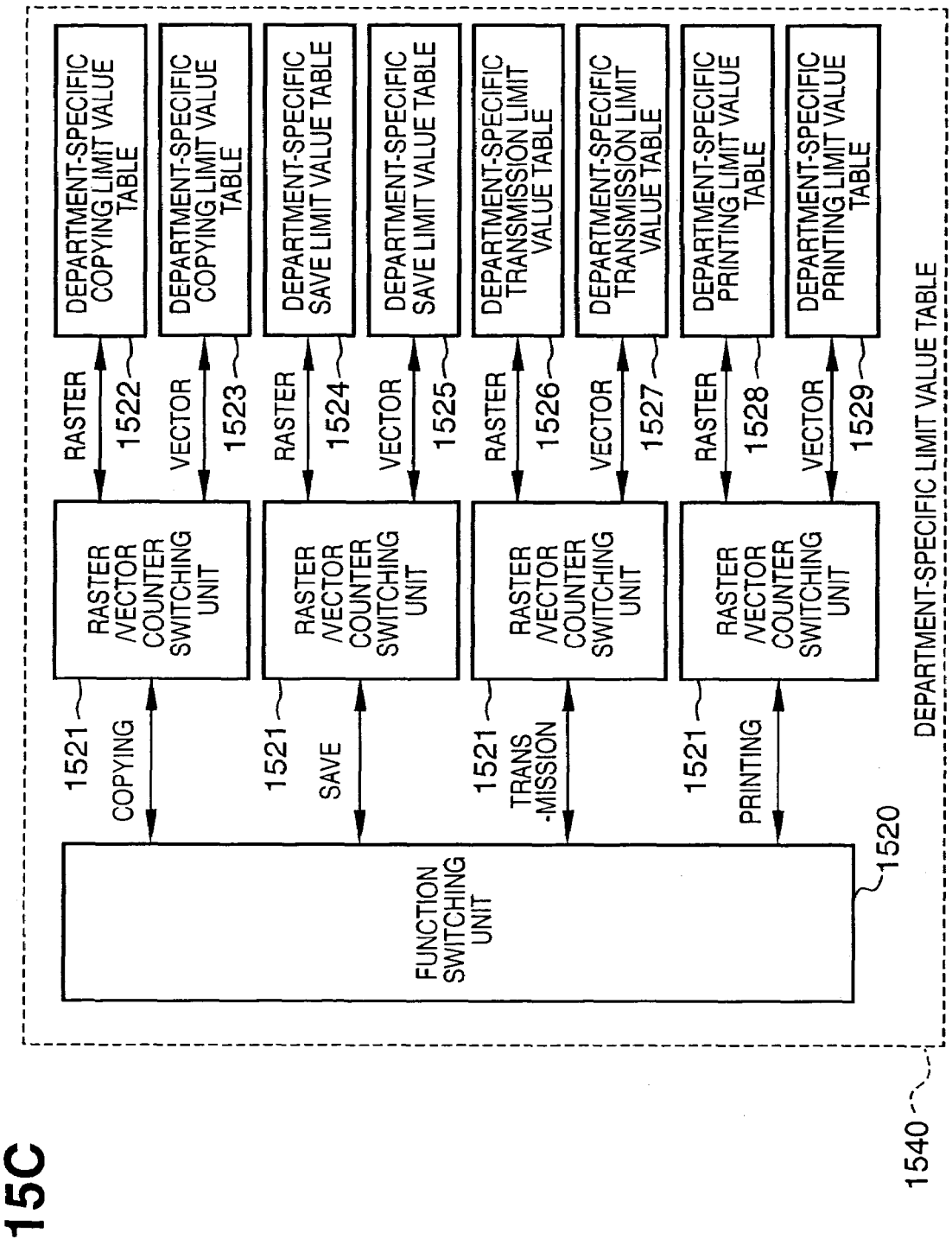
FIG. 15C is a block diagram showing an example of the arrangement of the department-specific limit value table according to the first embodiment of the present invention.

FIG. 15A is a block diagram showing an example of the arrangement of the department management counter of the MFP 100 according to the first embodiment of the present invention. FIG. 15B is a block diagram showing an example of the arrangement of the department-specific counter table according to the first embodiment of the present invention. FIG. 15C is a block diagram showing an example of the arrangement of the department-specific limit value table according to the first embodiment of the present invention.

Reference numeral 1500 denotes a counter comparing unit which compares a department-specific counter table 1530 and department-specific limit value table 1540. The counter comparing unit 1500 compares a value from the department-specific counter table 1530 and that from the department-specific limit value table 1540. If the value from the department-specific limit value table 1540 does not exceed that from the department-specific counter table 1530, the counter comparing unit 1500 transmits to the data processing unit 115 a control signal representing permission to operate a target function.

A function switching unit 1510 of the department-specific counter table 1530 switches between functions (e.g., copying function and saving function) and selects a counter table to be referred to upon reception of an operation instruction from the data processing unit 115 when a function is designated with the operation unit 113 or printing data from the client PC 102 is to be printed.

Depending on whether the contents of a process represent raster scan or vector scan, raster/vector counter switching units 1511 select counter tables to be referred to. Reference numerals 1512 to 1519 denote department-specific function counter tables for respective functions. Tables of raster scan and vector scan are prepared for each of the copying function, saving function, transmitting function, and printing function. For vector scan, a vectorization counter table is prepared in correspondence with each attribute of an object subjected to the vectorized process.

The department-specific function counter tables 1512 to 1519 are specialized in corresponding departments and functions so as to manage each function for each department, and are database readable/writable from the data processing unit 115.

An example of these tables will be described with reference to FIG. 16A.

FIG. 16A is a table showing an example of the department-specific function counter tables according to the first embodiment of the present invention.

The table 1512 is an example of a raster department-specific copying counter table which is a counter dedicated to the copying function in raster scan. In this example, currently registered IDs of respective departments and the counts of monochrome copying and color copying by each department in raster scan are registered.

At present, a department of an ID "A" has executed monochrome copying at a count "499" and color copying at a count "821" in raster scan.

Note that the number of IDs to be registered can be sequentially increased via the operation unit 113.

In FIG. 16A, IDs are registered from A to C. A department of an ID "B" has executed monochrome copying at a count "500" and color copying at a count "500". A department of an ID "C" has executed monochrome copying at a count "300" and color copying at a count "234".

Similarly, the table 1513 is an example of a vector department-specific copying counter table which is a counter dedicated to the copying function in vector scan. In this example, currently registered IDs of respective departments and the counts of monochrome copying and color copying by each department in vector scan are registered.

At present, the department of the ID "A" has executed monochrome copying at a count "891" and color copying at a count "998" in vector scan. The department of the ID "B" has executed monochrome copying at a count "500" and color copying at a count "500". The department of the ID "C" has executed monochrome copying at a count "300" and color copying at a count "789".

Although not shown in FIG. 16A, counter tables corresponding to respective functions other than the copying function also have the same configuration.

A function switching unit 1520 of the department-specific limit value table 1540 switches between functions (e.g., copying function and saving function) and selects a limit value table to be referred to upon reception of an operation instruction from the data processing unit 115 when a function is designated with the operation unit 113 or printing data from the client PC 102 is to be printed.

Depending on whether the contents of a process represent raster scan or vector scan, raster/vector counter switching units 1521 select limit value tables to be referred to. Reference numerals 1522 to 1529 denote department-specific function limit value tables for respective functions. Tables of raster scan and vector scan are prepared for each of the copying function, saving function, transmitting function, and printing function. For vector scan, a vectorization limit value table is prepared in correspondence with each attribute of an object subjected to the vectorized process.

The department-specific function limit value tables 1522 to 1529 are specialized in corresponding departments and functions so as to manage the limit value of the usage count of each function for each department, and are database readable/writable from the data processing unit 115.

An example of these tables will be described with reference to FIG. 16B.

FIG. 16B is a table showing an example of the department-specific function limit value tables according to the first embodiment of the present invention.

The table 1522 is an example of a raster department-specific copying limit value table representing the limit value of the copying function in raster scan. In this example, currently registered IDs of respective departments and limit values indicating the available counts of monochrome copying and color copying by each department in raster scan are registered.

At present, the department of the ID "A" can execute monochrome copying up to a count "1,000" and color copying up to a count "1,000" in raster scan.

Note that the number of IDs to be registered can be sequentially increased via the operation unit 113.

In FIG. 16B, IDs are registered from A to C. The department of the ID "B" can execute monochrome copying up to a count "500" and color copying up to a count "500". The department of the ID "C" can execute monochrome copying up to a count "300" and color copying up to a count "1,000".

Similarly, the table 1523 is an example of a vector department-specific copying limit value table representing the limit value of the copying function in vector scan. In this example, currently registered IDs of respective departments and limit values indicating the available counts of monochrome copying and color copying by each department in vector scan are registered.

At present, the department of the ID "A" can execute monochrome copying up to a count "1,000" and color copying up to a count "1,000" in vector scan. The department of the ID "B" can execute monochrome copying up to a count "500" and color copying up to a count "500". The department of the ID "C" can execute monochrome copying up to a count "300" and color copying up to a count "1,000".

Although not shown in FIG. 16B, counter tables corresponding to respective functions other than the copying function also have the same configuration.

Concrete operation of the department management counter will be explained.

Management of the copying function in vector scan and a counting process for the usage count of the copying function will be exemplified. The same operation also applies to raster scan and the transmitting function and printing function.

As described above, the department-specific copying counter table 1513 for vector scan is a database readable/writable from the data processing unit 115. Currently registered IDs of respective departments, the copying count of monochrome copying used by each department, and that of color copying used by each department are registered in the department-specific copying counter table 1513.

At the same time, the department-specific copying limit value table 1523 for vector scan is a database readable/writable from the data processing unit 115, as described above. Currently registered IDs of respective departments, the copying count of monochrome copying available by each department, and that of color copying available by each department are registered in the department-specific copying limit value table 1523.

When the operator uses the copying function in vector scan in utilizing the MFP 100, his ID must be registered in the department-specific copying counter table 1513 for vector scan. This also applies to the use of the copying function in raster scan and the remaining functions.

When the copying function in vector scan is to be performed, the MFP 100 does not accept any copying operation instruction unless any one of IDs registered in the department-specific copying counter table 1513 for vector scan is input from the operation unit 113. If an ID registered in the department-specific copying counter table 1513 for vector scan is input from the operation unit 113, the MFP 100 checks whether to allow an operator of the ID to perform the copying function in vector scan.

The operation is permitted and copying operation in vector scan can be accepted when the value of the department-specific copying counter table 1513 for vector scan and that of the department-specific limit value table 1523 for vector scan are compared and the value of the department-specific copying counter table 1513 for vector scan that corresponds to the input ID is smaller than that of the department-specific limit value table 1523 for vector scan.

In the examples of the department-specific copying counter table 1513 (FIG. 16A) and department-specific limit value table 1523 (FIG. 16B), both monochrome copying and color copying are permitted to the department of the ID "A", but is not permitted to the department of the ID "B". Monochrome copying is permitted to the department of the ID "C", but color copying is inhibited.

Upon reception of the operation permission, copying operation is performed to notify the data processing unit 115 of the number of sheets delivered from the printing unit 112. The data processing unit 115 updates the value of the department-specific copying counter table 1513 for vector scan.

When the operation is inhibited, the user is notified of this by displaying on the display unit 116 a message that the operation cannot be executed, or not accepting an operation via the operation unit 113.

An objectification counter table serving as a vectorization counter table which is configured as part of a vector scan counter table will be explained with reference to FIG. 17A. An objectification limit value table capable of managing the limit value of an available objectification count in the objectification counter table will be explained with reference to FIG. 17B.

FIG. 17A is a table showing an example of the objectification counter table according to the first embodiment of the present invention. FIG. 17B is a table showing an example of the objectification limit value table according to the first embodiment of the present invention.

In FIGS. 17A and 17B, an objectification counter table for objects obtained by executing vector scan in the use of the transmitting function will be exemplified. Similar objectification counter tables are configured for objects obtained by executing vector scan in the use of other functions (copying function, saving function, and the like).

The objectification counter table bills the user for even scanned image data obtained by, for example, scanning a blank document having no object or a document which cannot be divided into objects by the BS process.

As the management forms of an objectification counter table 2201 in FIG. 17A and an objectification limit value table 2202 in FIG. 17B, the number of objects generated by the above-mentioned BS process is counted and managed for each type of generated object (in this case, text attribute, graphic attribute, table attribute, or image attribute).

The objectification limit value table 2202 in FIG. 17B shows that the department "A" is permitted to perform objectification for all the attributes of objects generated after the vectorized process (arbitrary limit values other than 0 are set).

The objectification limit value table 2202 also shows that the department "B" is permitted to perform objectification for only the text and image attributes (limit value of 0 is set for the graphic and table attributes, i.e., objectification of these attributes is inhibited). This means that objects of the graphic and table attributes are not generated for the department "B" even upon vector scan, objects are processed as image ones, and no vector data is provided.

For the department "C", objects are generated as image data even upon vector scan without performing any vectorized process.

By managing whether to permit objectification in vector scan by each department, flexible operation management can be achieved so that a given department can perform vector scan for graphic objects when graphic vectorization has not reached its limit value even after text vectorization has reached its limit value, unlike management of vector scan one by one. Hence, flexible management can be achieved for each operator, department, and object.

Since generated objects can be managed by their attributes, the first embodiment can construct a system which can freely cope with the billing structure even when the charge is collected by differentiating the charge of vectorization of the high-value-added graphic attribute and the charge of objectification of the low-value-added image attribute.

The limit values of various limit value tables can be appropriately registered in advance by the administrator via the operation unit 113. Charge tables for calculating a billing amount are formed in correspondence with, e.g., various counter tables, and unit charge information representing a unit charge to be collected every time each function is used once is set for each function. Also, unit charge information corresponding to the type of attribute or the size of an object is set for each object.

As described above, the first embodiment can provide an image processing system which can process any paper document as a reusable electronic file without losing information of the paper document by providing the MFP 100 with vector scan of vectorizing each object and generating image data of a reusable format upon reading a document.

Since raster scan and vector scan can be managed for each function, the first embodiment can construct a flexible billing system which meets the application purpose of a usage environment when the limit values of the usage counts of raster scan and vector scan are changed and managed for each department or billings of raster scan and vector scan are changed to collect their charges.

The vectorization charge can be set and displayed via the operation unit 113 and display unit 116. The user (operator) can confirm a charge accrued from vectorization and determine whether to vectorize objects of respective attributes in a document.

In the first embodiment, various functions are executed from the operation unit 113 and display unit 116. These functions can also be executed from an external terminal such as the client PC 102 via the network 104 and LAN 107. The security may be further enhanced by performing authentication based on an ID and password in registering various tables, and searching and browsing registered contents.

The first embodiment can provide a system capable of freely managing a "reuse" value-added vectorized process by configuring a management form in vector scan independently of that in raster scan and managing object attributes specific to vector scan.

Second Embodiment

The charge of objectification (vectorization) is displayed in vector scan in the first embodiment, but the number of objects generated from one document may become enormous depending on the contents of a document to be processed. If all objects obtained from such a document are accidentally vectorized, they may accrue a high charge.

The second embodiment will describe an arrangement which prevents erroneous billing of a high charge by setting the upper limit of a charge to objectify one document, in addition to the arrangement of the first embodiment.

The system configuration (hardware configuration and functional configuration) in the second embodiment can be the same as that in the first embodiment, and details thereof will be omitted.

The outline of an overall process executed by an image processing system according to the second embodiment will be described with reference to FIG. 18.

Figure 18:
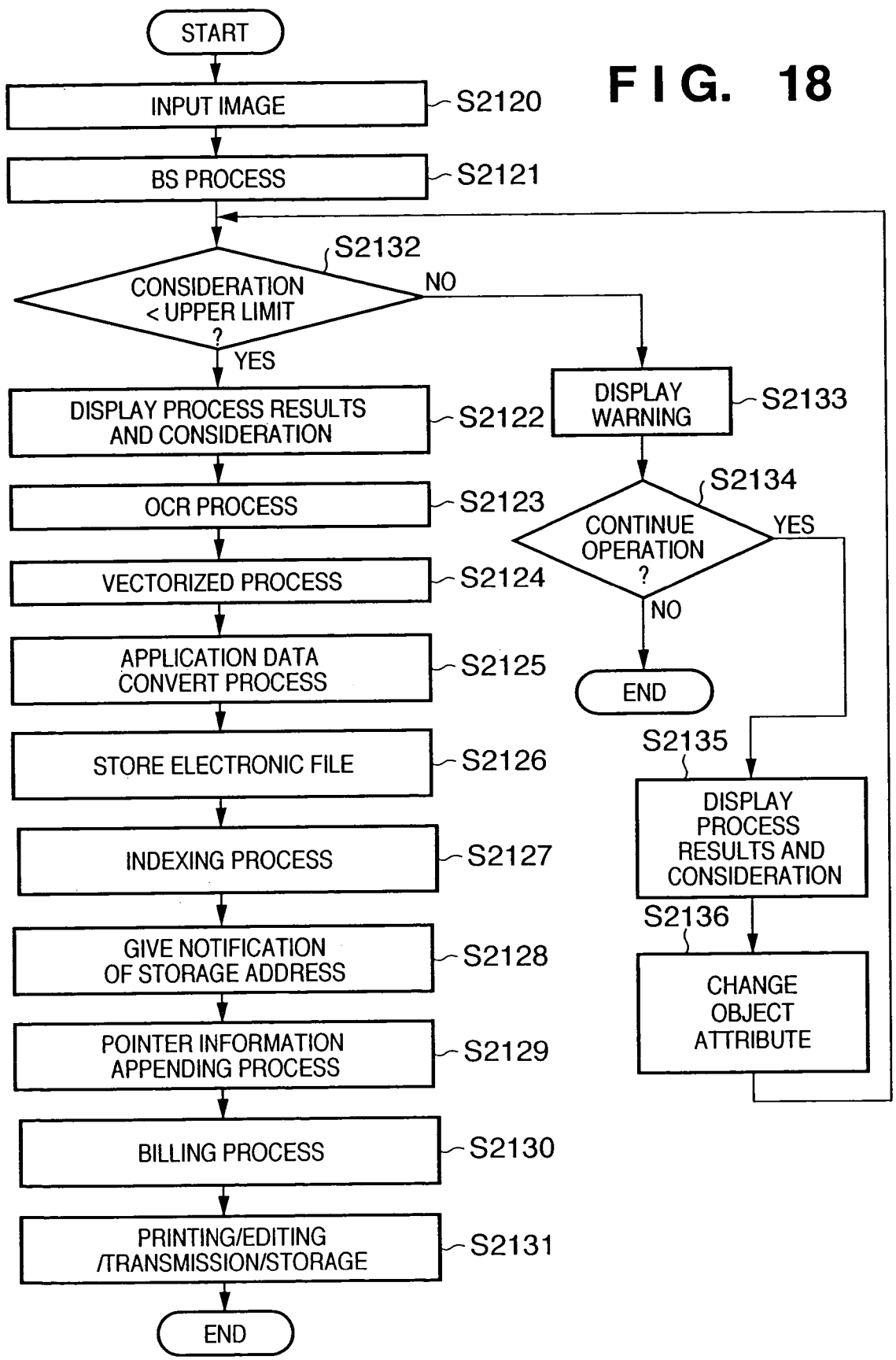
FIG. 18 is a flowchart showing the outline of an overall process executed by an image processing system according to the second embodiment of the present invention.

FIG. 18 is a flowchart showing the outline of the overall process executed by the image processing system according to the second embodiment of the present invention.

In FIG. 18, steps S2120 to S2131 correspond to steps S120 to S131 in FIG. 3 according to the first embodiment, and details thereof will be omitted.

In step S2132, a consideration accrued from the vectorized process for the process result of step S2121 is calculated with reference to a management counter 117, and it is determined whether the calculated consideration exceeds a predetermined value (upper limit value). If the calculated consideration does not exceed the predetermined value (YES in step S2132), processes from step S2122 are executed; if the calculated consideration exceeds the predetermined value (NO in step S2132), the process advances to step S2133.

Note that the predetermined value (upper limit value) can be properly registered as part of various limit value tables described in the first embodiment by the administrator in advance via an operation unit 113.

In step S2133, a warning (warning display) that the consideration has exceeded the upper limit value is displayed on a display unit 116. Instead of displaying the warning on the display unit 116, an alarm sound may be output from an audio output unit (not shown). Then, in step S2134, it is determined whether an instruction to continue the operation has been issued. If no operation continuation instruction has been issued (NO in step S2134), the process ends; if an operation continuation instruction has been issued (YES in step S2134), advances to step S2135.

In step S2135, an operation window 10003 in FIG. 14D is displayed on the display unit 116. In step S2136, a change of the attribute (selection/non-selection of the attribute) of an object to be processed is accepted on the basis of an operation by the user (operator) to an object attribute key 10031 in the operation window 10003.

The process returns to step S2132, a consideration accrued from the vectorized process for an object of the selected attribute is calculated by referring to the management counter 117, and it is determined whether the calculated consideration exceeds the predetermined value (upper limit value). Processes from step S2122 or processes from step S2133 are executed on the basis of the determination result.

As described above, according to the second embodiment, when a consideration accrued from the vectorized process for an object in a document exceeds an upper limit value, a warning is displayed, and the operator is given a chance to designate whether to execute the vectorized process for an object of each attribute. This can prevent large billing owing to the contents of a document, and can provide a vector scan environment intended by the user.

Third Embodiment

In the second embodiment, the upper limit value of a consideration accrued from the vectorized process for an object in a document is set, and if the consideration exceeds its upper limit value, a warning is displayed. However, the present invention is not limited to this, and for example, the number of objects to be vectorized may be adjusted automatically so as not to exceed the upper limit value when the vectorized process is executed.

It is also possible to prepare an adjustment mode in which a warning is output and the operator can arbitrarily adjust objects to be vectorized, and an automatic adjustment mode in which the apparatus automatically adjusts objects to be vectorized. These modes may be arbitrarily switched by the operator.

In the automatic adjustment mode, the attributes of objects to be vectorized may be prioritized to automatically adjust the objects on the basis of the priority. For example, when the operator wants to vectorize characters as much as possible, the highest priority is given to the text attribute to preferentially vectorize objects of the text attribute.

Fourth Embodiment

The forth embodiment is directed to an image processing system which properly, efficiently implements usage management of the raster scan function and vector scan function in an environment where these functions can be exploited in the image processing systems of the first to third embodiments.

[Outline of Process]

The outline of an overall process executed by the image processing system according to the fourth embodiment will be described with reference to FIG. 19.

Figure 19:
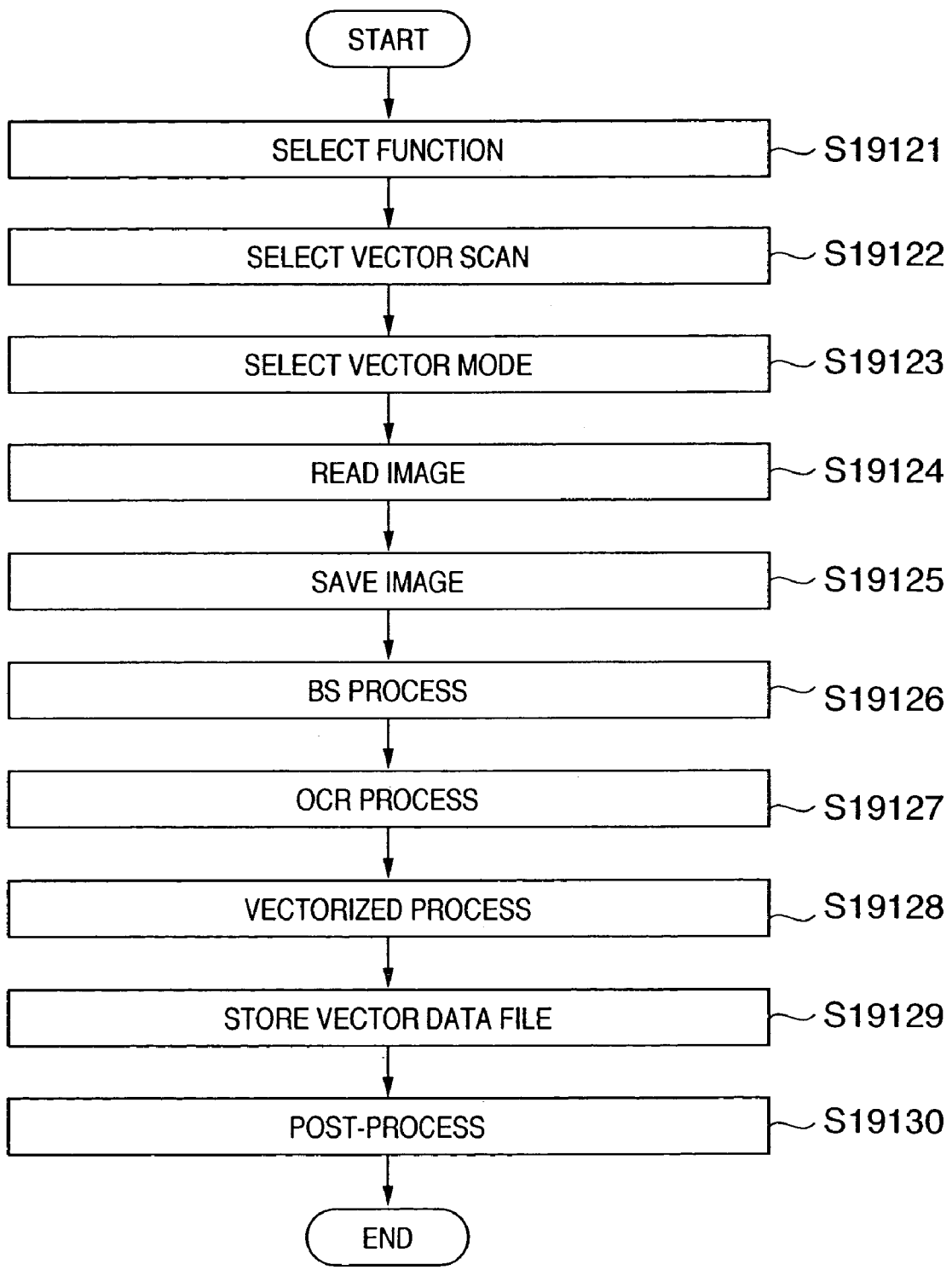
FIG. 19 is a flowchart showing the outline of an overall process executed by an image processing system according to the fourth embodiment of the present invention.

FIG. 19 is a flowchart showing the outline of the overall process executed by the image processing system according to the fourth embodiment of the present invention.

In step S19121, a document is set on an image input unit 110 of an MFP 100, and selection of a desired function among various functions (e.g., copying function, saving function, and transmitting function) is accepted with the function selection key of an operation unit 113.

In step S19122, vector scan is selected on the basis of an operation with the vector scan selection key of the operation unit 113.

As described above, vector scan means a series of processes for the vectorized process (i.e., converting the text region of input image data (raster image data) of a read document image into a Text code, and functionalizing and coding a thin-line region or graphic region). That is, a process of scanning a document and converting the obtained input image data into vector data is defined as vector scan. Details of the vectorized process executed by vector scan have been described with reference to FIGS. 4A, 4B, and 5 in the first embodiment.

In step S19123, a desired vector mode is selected with a vector mode selection key on the basis of an operation via the operation unit 113.

Operation associated with vector scan by the operation unit 113 will be explained in detail with reference to FIGS. 14A and 14B described above and FIG. 20 to be described later.

When a start key to activate vector scan is operated, the document image set on the image input unit 110 is read to execute vector scan in the designated vector mode in step S19124.

In vector scan, one document is raster-scanned and read to obtain, e.g., an 8-bit image signal of 600 dpi. In step S19125, the image signal undergoes a pre-process by a data processing unit 115, and is saved as image data of one page in a storage unit 111.

The CPU of the data processing unit 115 executes pre-processes of the vectorized process in steps S19126 and S19127 for the image data saved in the storage unit 111, and performs the vectorized process in step S19128.

In step S19126, the data processing unit 115 performs a block selection (BS) process.

The BS process in step S19126 is basically the same as that in step S121 of the first embodiment. Especially in step S19126, the attribute types of objects to be divided are determined in accordance with the vector mode selected in step S19123.

For example, when a text/graphic/table/image mode is designated as the vector mode, an image signal is divided into objects (blocks) of the text, graphic (thin line and graphic), table, image, and background attributes. When a text mode is designated as the vector mode, an image signal is divided into objects (blocks) of the text and background attributes.

BackGround is not presented in the notation of vector mode selection because a region except text objects serves as BackGround in, e.g., the text mode. The text mode may also be expressed as a text/background mode.

A concrete example of the vector mode will be explained.

1) Text/Graphic/Table/Image mode
→An image is divided into objects (blocks) of the text, graphic (thin line and graphic), table, image, and background attributes.

2) Text/Graphic/Image mode
→An image is divided into objects (blocks) of the text, graphic (thin line, graphic, and table), image, and background attributes.

3) Text/Image mode
→An image is divided into objects (blocks) of the text, image (thin line, graphic, table, and image), and background attributes.

4) Text mode
→An image is divided into objects (blocks) of the text and background (thin line, graphic, table, image, and background) attributes.

5) Image mode
→An image is divided into objects (blocks) of the image (text, thin line, graphic, table, and image) and background attributes.

In this fashion, the vector mode defines the attribute types of objects to be divided in the block selection process, and also defines the attribute types of objects to be vectorized in the vectorized process.

The fourth embodiment has exemplified the text, graphic (thin line and graphic), table, image, and background attributes. However, the types of attributes are not limited to them, other types of attributes can also be employed in accordance with the application purpose, and all the attributes need not be used.

The above-mentioned concrete examples of the vector mode are the five modes: text/graphic/table/image mode, text/graphic/image mode, text/image mode, text mode, and image mode. However, the types of modes are not limited to them, other types of vector modes can also be employed in accordance with the application purpose, and all the vector modes need not be used.

After objects (blocks) are divided for the respective attributes, the entire input image information undergoes the vectorized process to convert the image data into a vector data file.

In step S19127, the OCR process is performed for the text block obtained by the BS process of step S19126.

In step S19128, the size, style, and font of characters are further recognized for each text block having undergone the OCR process. The text block is converted into font data visually faithful to characters obtained by scanning the document. Table and graphic blocks formed from lines are converted into outline data and approximated by functions. Image blocks are converted into separate JPEG files as image data.

For example, when the text/graphic/table/image mode is designated in step S19123, a text object is converted into font data in step S19128. A graphic (thin line and graphic) object is vectorized as outline data/approximated function. Numerical information in a table serving as a table object is converted into font data, the table frame is vectorized as outline data/approximated function, and each numerical information is associated as cell information and coded as a table object.

An image object is saved after executing low compression (e.g., low JPEG compression) while keeping the reading resolution of the image input unit 110 at 600 dpi. A background object is saved after changing the reading resolution from 600 dpi to a low resolution (e.g., a resolution of 300 dpi) and then executing high compression (e.g., high JPEG compression).

Note that high compression and low compression are respectively defined as compression at a compression ratio higher than a predetermined compression ratio (e.g., 50%) and compression at a compression ratio lower than the predetermined compression ratio.

If the text mode is designated in step S19123, a text object is converted into font data in step S19128. The remaining graphic (thin line and graphic), table, and image objects are handled as background objects, converted into a resolution of 300 dpi, and then saved in the JPEG format upon high compression.

By changing (controlling) an attribute subjected to the vectorized process depending on a designated vector mode, the capacity and image quality of a vector data file to be generated and the like can be arbitrarily changed in accordance with the application purpose.

After the end of the vectorized process in step S19128, layout information of each object (block) is saved as a vector data file in the storage unit 111 in step S19129.

The vector data file saved in the storage unit 111 undergoes a post-process in accordance with the purpose of vector scan in step S19130.

As the post-process for the copying function, the vector data file undergoes an image process such as a color process and spatial frequency correction optimal for each object, and is printed by a printing unit 112. For the saving function, the vector data file is saved and held in the storage unit 111. For the transmitting function, the vector data file is converted into a general-purpose file format (e.g., RTF (Rich Text Format) format or SVG format) so as to reuse the file at a file transmitting destination, and is transmitted to a destination (e.g., the client PC 102) via a network I/F 114.

The vector data file obtained by the above processes contains all pieces of vector information visually almost identical to the read document image in an editable format, and these pieces of vector information can be directly processed, reused, stored, transmitted, or printed again.

Since the vector data file generated by these processes expresses characters, thin-lines, and the like by descriptor codes, the information amount is reduced in comparison with a case wherein image-data (raster bitmap data) is simply directly processed. The storage efficiency can be increased, the transmission time can be shortened, and high-quality data can be advantageously printed/displayed.

The arrangement in which the attribute type subjected to the vectorized process can be changed as the vector mode can attain the following advantages.

For example, if an image is vectorized by designating the text/graphic/table/image mode as the vector mode in order to vectorize and reuse only the text part in the image, a part other than the text part is also vectorized, which complicates work in extracting and using the text part. In this case, by designating the text mode as the vector mode, a vector data file in which only the text part is vectorized can be automatically generated, which facilitates extraction of only the text part and also facilitates the post-process.

If an image having undergone the vectorized process becomes greatly different from an original raster image, a vectorized process of dividing an image into objects of all identifiable attributes is generally executed when no vector mode is set (this corresponds to the text/graphic/table/image mode in the fourth embodiment). If this vectorized process greatly changes the shapes of graphic and table objects, they must be manually corrected after the vectorized process.

To solve this problem, the fourth embodiment prepares the text/image mode as the vector mode. When the text/image mode is designated, graphic and table objects are handled as image objects, and their raster images can be directly saved as JPEG data without executing any vectorized process. That is, if the difference between the shapes of vector data and raster data is conspicuous, as described above, the shape difference from the original raster image can be prevented by only designating the text/image mode as the vector mode. User-friendliness improves, and the image quality also improves in terms of matching with raster data.

By changing the vector mode, the vector attribute of optimal objects can be applied for each post-process in step S19130.

For example, copying can be executed by designating the text/image mode in which only characters are vectorized to improve the text quality while vectorization of the remaining objects is inhibited by attaching importance to faithfulness to a document. File transmission can be executed by designating the text/graphic/table/image mode in consideration of reuse of vectorized objects by the receiving client PC 102 or the like. In this way, an optimal vector mode can be selected in accordance with the application purpose of each post-process.

[Description of Operation Unit 113 and Display Unit 116]

Figure 20:
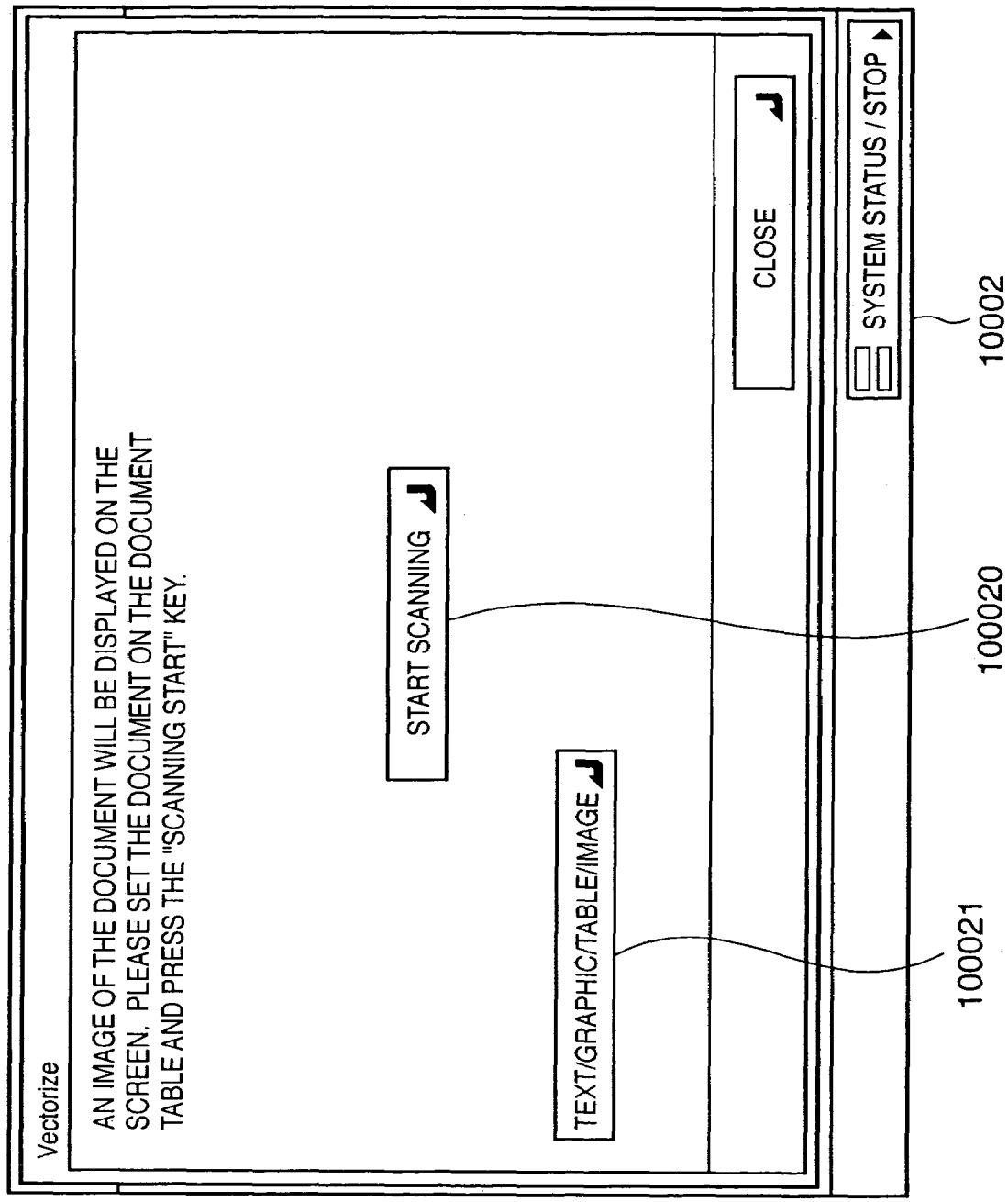
FIG. 20 is a view showing an example of an operation window according to the fourth embodiment of the present invention.

FIG. 20 is a view showing an example of an operation window according to the fourth embodiment of the present invention.

The operation window in FIG. 20 is an application of the window in FIG. 14C according to the first embodiment.

In the fourth embodiment, when a key 100001 to select the copying function, a key 100002 to select the transmitting function (transmitting/FAX function), or a key 100003 to select the saving function (box function) is touched in an operation window 10000 of FIG. 14A (step S19121 in FIG. 19), the operation window 10000 is switched to a window display corresponding to the selected function. In this example, the copying function is selected.

In an application mode window 10001 of FIG. 14B, a Vectorize key 100010 is a selection key which enables the above-mentioned vector scan function (step S19122 in FIG. 19). When the Vectorize key 100010 is touched, an operation window 10002 in FIG. 20 is displayed.

In the operation window 10002, a scanning start key 100020 is used to give an instruction to start scanning a document. When the key is touched, a document is read. A vector mode selection key 100021 is used to select the above-mentioned vector mode. After the vector mode is selected (step S19123 in FIG. 19), the scanning start key 100020 is touched to start scan operation.

The vector mode selection key 100021 switches its contents (vector mode) every time, for example, the vector mode selection key 100021 is touched. In this case, the vector mode selection key 100021 allows the operator to select any one of the five modes prepared in advance: text/graphic/table/image mode, text/graphic/image mode, text/image mode, text mode, and image mode. However, the mode selection method is not limited to this.

For example, check boxes capable of arbitrarily checking the four, text, graphic, table, and image attributes may be prepared to allow the operator to select a combination of arbitrary attributes on the check boxes. In this case, if the text and image attributes are checked, the same mode as the text/image mode is executed. Alternatively, a pull-down menu including various vector modes may be set to allow the operator to select a desired vector mode from the pull-down menu.

A usage management process for various functions of the MFP 100 that is executed as part of the post-process in step S19130 of FIG. 19 will be explained. In the usage management process, a counting process by a management counter 117 is executed in accordance with the operator or the usage contents of various functions of the MFP 100.

In the fourth embodiment as well as the first embodiment, the management counter 117 is configured as a department management counter in order to execute the usage management process for each department in an organization containing a plurality of departments. The department management counter in the fourth embodiment is identical to that described in the first embodiment with reference to FIGS. 15, 16A, and 16B.

As described above, the fourth embodiment can provide an image processing system which can process any paper document as a reusable electronic file without losing information of the paper document by providing the MFP 100 with-vector scan of vectorizing each object and generating image data of a reusable format upon reading a document.

Since raster scan and vector scan can be managed for each function, the fourth embodiment can construct a flexible billing system which meets the application purpose of a usage environment when the limit values of the usage counts of raster scan and vector scan are changed and managed for each department or billings of raster scan and vector scan are changed to collect their charges.

The fourth embodiment can easily construct a system which can control permission/inhibition of the vectorized process for each department by managing the vectorized process for each department, and when protection of confidential information of a document and vectorization are regarded as high-value-added services, controls the consideration and billing structure.

Fifth Embodiment

The fourth embodiment controls usage management on the basis of raster scan or vector scan by separately preparing counter tables and limit value tables dedicated to raster scan and vector scan, as shown in FIGS. 15, 16A, and 16B. The fifth embodiment is directed to another management form especially in vector scan.

FIGS. 21A and 21B show several examples of this management form in vector scan.

In FIGS. 21A and 21B, an objectification counter table for objects obtained by executing vector scan in the use of the transmitting function will be exemplified. Similar objectification counter tables are configured for objects obtained by executing vector scan in the use of other functions (copying function, saving function, and the like).

In FIG. 21A, reference numeral 1517 denotes an example of a vector department-specific transmission counter table which is a counter for vector scan. Reference numeral 1527 denotes an example of a vector department-specific transmission limit value table which represents the limit value of the vector scan function.

The vector department-specific transmission counter table 1517 and vector department-specific transmission limit value table 1527 in FIG. 21A represent a management form in which the number of generated objects is counted and managed for each type of vector mode selected with a vector mode selection key 100021 described above (i.e., text/graphic/table/image, text/graphic/image, text/image, text, or image).

The vector department-specific transmission limit value table 1527 in FIG. 21A represents that the department "A" is permitted to perform vector scan in the text/graphic/table/image mode.

The vector department-specific transmission limit value table 1527 also shows that the department "B" is permitted to perform vector scan in the image mode. This means that vectorization of scanned image data is inhibited even upon vector scan.

The vector department-specific transmission limit value table 1527 also exhibits that the department "C" is permitted to perform vector scan in the text/image mode. Thus, the department "C" is permitted to code characters by OCR.

In this manner, the level of the vectorized process (type of vector mode) can be controlled and managed for each department. This can prevent accidental conversion of a document such as a confidential document into a reusable state by the vectorized process.

Another example is shown in FIG. 21B.

FIG. 21B illustrates another example of the vector department-specific transmission counter table 1517 and vector department-specific transmission limit value table 1527.

The vector department-specific transmission counter table 1517 and vector department-specific transmission limit value table 1527 in FIG. 21B show a management form in which the number of objects generated by the block selection process described above is counted and managed for each type of generated object (i.e., each of the text, graphic, table, and image attributes).

The vector department-specific transmission limit value table 1527 in FIG. 21B represents that the department "A" is permitted to perform objectification for all the attributes of objects generated after the vectorized process (arbitrary limit values other than 0 are set).

The vector department-specific transmission limit value table 1527 also shows that the department "B" is permitted to perform objectification for only the text and image attributes (limit value of 0 is set for the graphic and table attributes, i.e., objectification of these attributes is inhibited). This means that objects of the graphic and table attributes are not generated for the department "B" even upon vector scan, objects are processed as image ones, and no vector data is provided.

For the department "C", objects are generated as image data even upon vector scan without performing any vectorized process.

By managing whether to permit objectification in vector scan by each department, flexible operation management can be achieved so that a given department can perform vector scan for graphic objects when graphic vectorization has not reached its limit value even after text vectorization has reached its limit value, unlike management of vector scan one by one. Flexible management can, therefore, be done for each operator, department, and object.

Since generated objects can be managed by their attributes, the fifth embodiment can construct a system which can freely cope with the billing structure even when the charge is collected by differentiating the charge of vectorization of the high-value-added graphic attribute and the charge of objectification of the low-value-added image attribute.

The above counter tables and limit value tables are merely an example, and tables of various management contents can be configured in accordance with the application purpose.

For example, the management contents of the table are as follows.

The usage counts of monochrome copying and color copying are managed for each object attribute.

As for a text object, the number of characters converted into text codes, the number of OCR-recognized characters, the kind of processing language, the character size, the font, and the like are managed as object information of the text object for each department.

As for a graphic object, the degree of complication of the shape is represented by the number of anchor points in functionalization, and managed as object information of the graphic object.

As for an image object, the resolution of a generated object is managed as object information of the image object.

The total area of generated objects and the total number of objects are managed as object information.

The capacity, date and time, and creator of a generated vector data file and the like are managed as vector image data information.

The type of management contents described above can be set and displayed by an operation unit 113 and display unit 116. A new type of management contents can also be registered. Various functions can be executed from an external terminal such as a client PC 102 via a network 104 and LAN 107. The security may be further enhanced by performing authentication based on an ID and password in registering various tables, and searching and browsing registered contents.

Also, several management forms may be held, and a necessary management form may be set by the management counter 117 case by case. Alternatively, all the management forms may be simultaneously held and managed.

The gist of the present invention is not limited to only the type of management contents described above. The present invention can provide a system capable of freely managing a "reuse" value-added vectorized process by configuring a management form in vector scan independently of that in raster scan and managing object attributes and vector modes which are specific to vector scan.

As described above, the fifth embodiment can implement usage management of an MFP 100 in a management form suitable for the application purpose, in addition to the effects described in the fourth embodiment.

Sixth Embodiment

In the fourth embodiment, the MFP 100 in FIG. 1 incorporates the vectorized process function of converting input raster image data into a vector data file, a vector mode for executing the vectorized process function is selected via the operation unit 113 and display unit 116 in the MFP 100, and a vector data file is generated for each attribute defined by the selected vector mode. However, the present invention is not limited to this arrangement, and the arrangement described in the fourth embodiment may be implemented by a management PC 101.

In this case, a vector mode is selected via the operation unit of the management PC 101, raster image data input from the MFP 100 is transferred to the management PC 101, and the vectorized process is done in the vector mode selected from the management PC 101.

[Outline of Process]

The outline of an overall process executed by an image processing system according to the sixth embodiment will be described with reference to FIG. 22.

Figure 22:
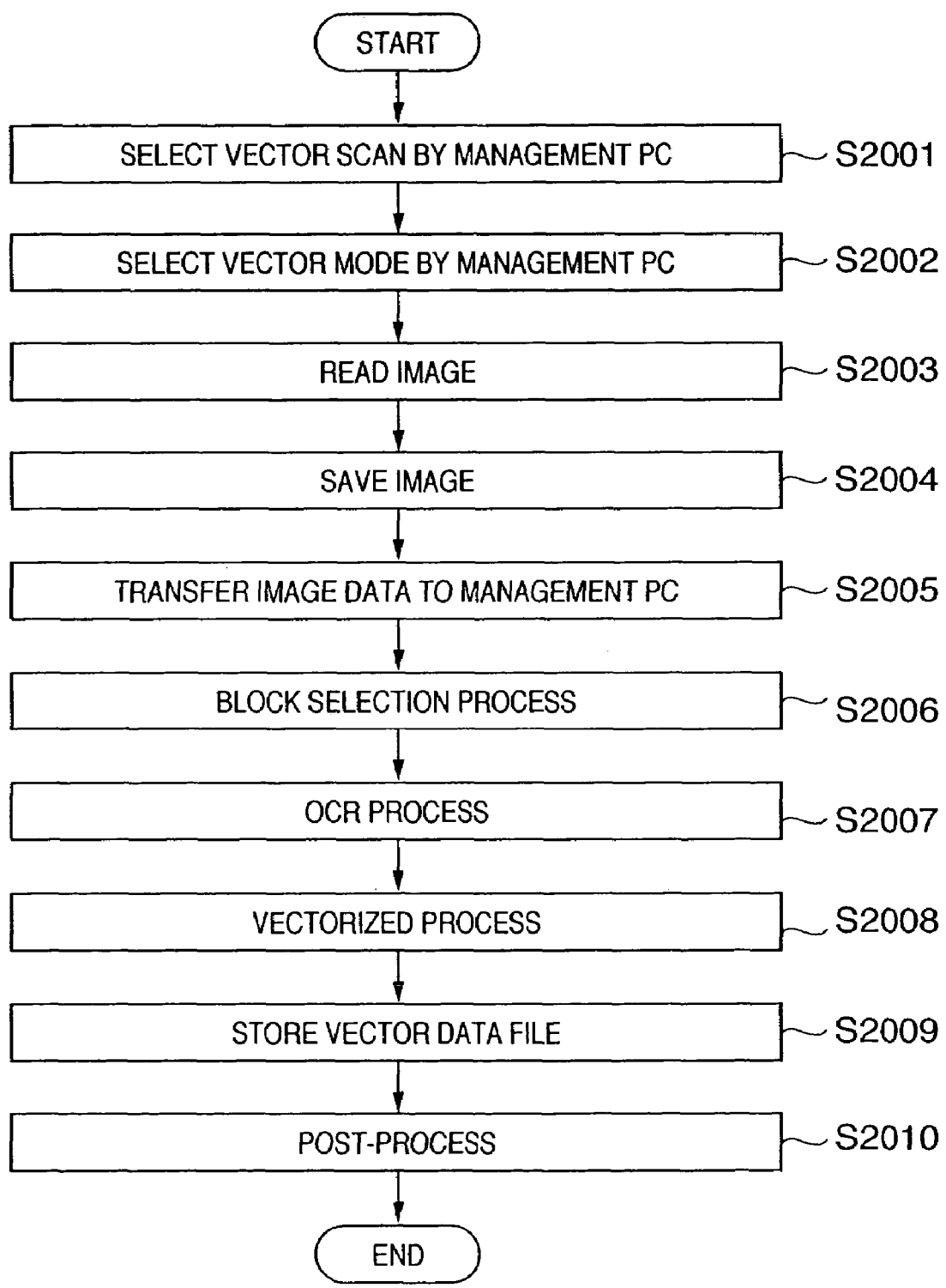
FIG. 22 is a flowchart showing the outline of an overall process executed by an image processing system according to the sixth embodiment of the present invention.

FIG. 22 is a flowchart showing the outline of the overall process executed by the image processing system according to the sixth embodiment of the present invention.

In step S2001, a document is set on an image input unit 110 of an MFP 100, and vector scan is selected on the basis of an operation with the vector scan selection key of the operation unit of the management PC 101.

In step S2002, a desired vector mode is selected with the vector mode selection key of the operation unit of the management PC 101.

The operation unit and display unit of the management PC 101 are so configured as to implement the same functions as those in FIGS. 14A, 14B, and 20.

Upon reception of the operation instruction from the management PC 101, the management counter 117 of the MFP 100 requests the management PC 101 to input an ID necessary to permit operation of each function.

When an ID necessary for each function is input from the management PC 101, the MFP 100 sends back to the management PC 101 an instruction to permit/inhibit operation of the function, and the management PC 101 determines in accordance with the result whether the operation by the management PC is, possible. If the operation is permitted, vector scan selection operation is done, and then a start key to activate vector scan is operated, as described above. In step S2003, the MFP 100 reads the document image set on the image input unit 110, and executes vector scan in the vector mode designated by the management PC 101.

In vector scan, one document is raster-scanned and read to obtain, e.g., an 8-bit image signal of 600 dpi. In step S2004, the image signal undergoes a pre-process by a data processing unit 115, and is saved as image data of one page in a storage unit 111.

In step S2005, the image data saved in the storage unit 111 is transferred to the management PC 101 via a LAN 107 or 108.

The management PC 101 activates a vectorized process application installed in the management PC 101, and executes processes in steps S2006 to S2008 corresponding to processes (block selection process, OCR process, and vectorized process) in steps S19126 to S19128 of FIG. 19.

After the end of the vectorized process in step S2008, layout information of each object (block) is saved as a vector data file in the storage unit of the management PC 101 in step S2009.

The vector data file saved in the storage unit of the management PC 101 undergoes a post-process in accordance with the purpose of vector scan in step S2010.

As described above, according to the sixth embodiment, various instructions associated with vector scan of the MFP 100 are issued via the operation unit and display unit of the management PC 101. Image data read by the MFP 100 is transferred to the management PC 101, and the management PC 101 performs a series of processes for the vectorized process. By connecting the management PC 101, the operator can execute vector scan with ease in a vector mode intended by him even if the MFP 100 does not have any vectorized process function and various settings (e.g., vector mode selection function) associated with vector scan.

In the sixth embodiment, the vectorized process is done by the management PC 101. Assuming that the vectorized process is executed in the MFP 100, management counters 117 may be adopted separately for a vectorized process in the MFP 100 and that in the management PC 101.

When the MFP 100 has neither vectorized process function nor vector mode selection function and is provided with these functions by connecting the management PC 101, a management counter 117 for vector scan (vector scan function and vector mode selection function) may be configured in the management PC 101 to implement usage management of vector scan by the management PC.

Seventh Embodiment

In the fourth to sixth embodiments, the process in FIG. 19 is executed for an image read by the MFP 100 as a target image. The process in FIG. 19 can also be executed for printing data received from a client PC 102 or image data (e.g., image data photographed by a digital camera) received via a network 104.

Eighth Embodiment

In the fourth to seventh embodiments, the image processing system is implemented in the office 10 of FIG. 1. The image processing system may also be implemented by an MFP in another office 20 on a network 104 or an MFP on the network 104.

Ninth Embodiment

The image processing system is implemented by an MFP and management PC, but may be implemented by any device as far as the device (e.g., digital camera or portable terminal (PDA, cell phone, or the like)) can process image data.

10th Embodiment

When an original image corresponding to input image data is already managed by the storage unit of an MFP 100 or a server on a network, the original image may undergo the process in FIG. 19.

11th Embodiment

The management counter 117 is configured in the MFP 100 or management PC 101 in the above-described example, but may be configured in another external device accessible via a network 104.

12th Embodiment

The 12th embodiment will describe an image processing system capable of more finely, practically realizing usage management of an image processing apparatus having a plurality of types of functions in the image processing systems according to the first to 11th embodiments.

[Outline of Process]

The outline of an overall process executed by the image processing system according to the 12th embodiment will be described with reference to FIG. 23.

Figure 23:
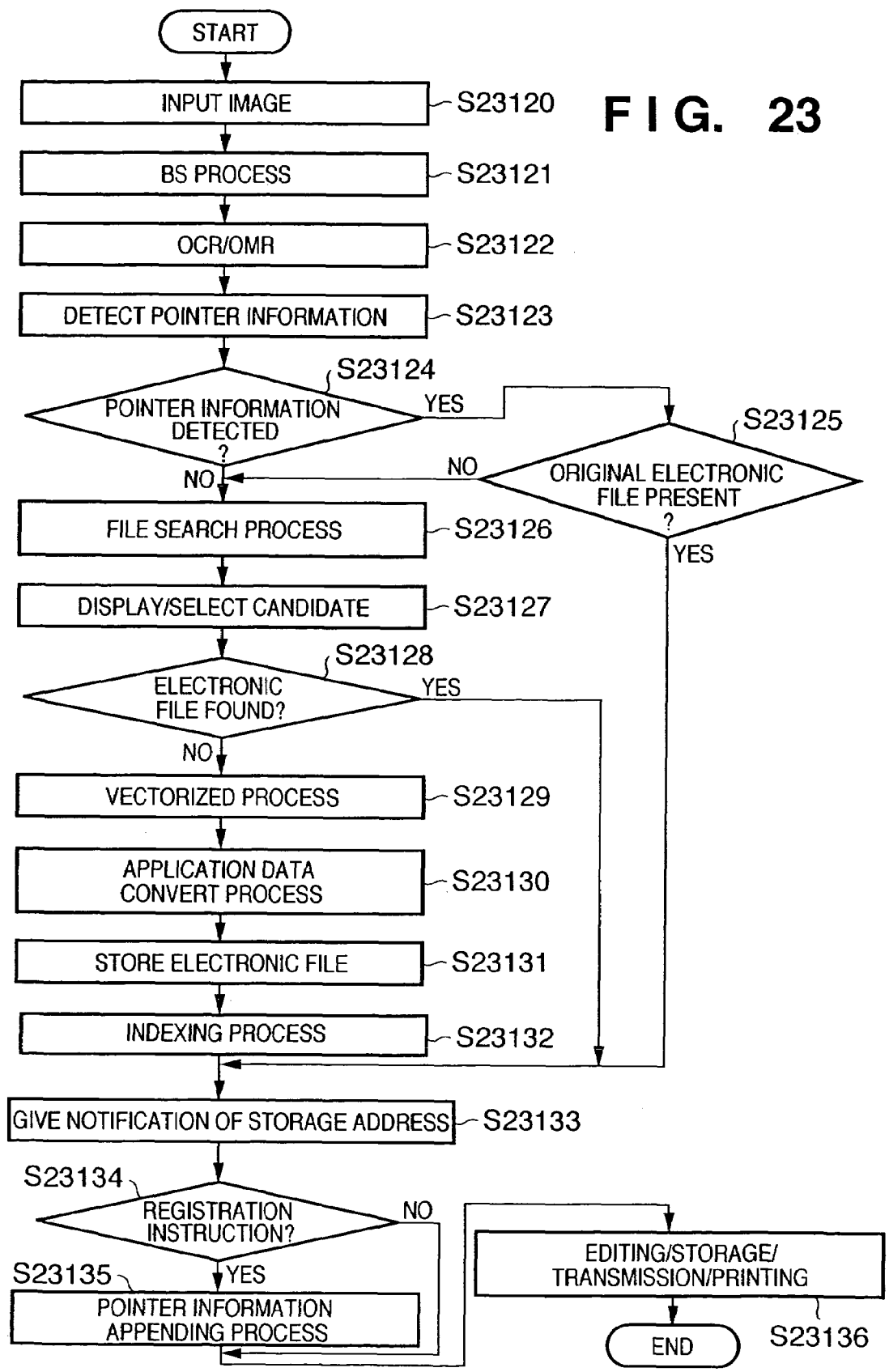
FIG. 23 is a flowchart showing the outline of an overall process executed by an image processing system according to the 12th embodiment of the present invention.

FIG. 23 is a flowchart showing the outline of the overall process executed by the image processing system according to the 12th embodiment of the present invention.

Step S23120 corresponds to step S120 in FIG. 3, and the next step S21121 corresponds to step S121 in FIG. 3. In step S23122, an object (block) corresponding to a two-dimensional barcode or URL (or URI (Uniform Resource Identifier)), which is recorded in the document image as additional information, is detected. If the additional information is a URL image, the URL image undergoes character recognition by OCR. On the other hand, if the additional information is a two-dimensional barcode image, the two-dimensional barcode image undergoes mark decoding by OMR (Optical Mark Recognition).

In step S23122, each text block obtained in the BS process in step S23121 undergoes character recognition by OCR.

In step S23123, pointer information indicating a storage destination where an original electronic file of the read document image is stored is detected on the basis of the process result of step S23122.

In step S23124, it is determined whether any pointer information is detected. If no pointer information is detected (NO in step S23124), the flow advances to step S23126. On the other hand, if pointer information is detected (YES in step S23124), the flow advances to step S23125 to determine whether the original electronic file is present at the storage destination indicated by the pointer information.

The original electronic file is stored in, e.g., a hard disk within a client PC 102 in FIG. 1, a database 105, or a storage unit 111 of an MFP 100 itself. The original electronic file is searched for in these storages in accordance with the pointer information detected in step S23123.

If no original electronic file is found in step S23125 (NO in step S23125), the flow advances to step S23126. On the other hand, if the original electronic file is found (YES in step S23125), the flow advances to step S23133.

Even if the original electronic file is found in step S23125, the flow advances to step S23126 when the original electronic file is image data typified by PDF or TIFF. On the other hand, if the found original electronic file is vector data previously generated in this process, the flow advances to step S23133.

In step S23126, a file search process of searching for an electronic file similar to the read document image input in step S23120 is performed on the basis of the read document image input in step S23120.

In the file search process, a full-text search is performed by extracting words from the result of the OCR process performed for the text blocks in step S23122 and searching for an electronic file containing the words. Alternatively, a layout search is performed by searching for an electronic file having a layout specified by the arrangement and attributes (image, text, or the like) of blocks in an image signal (or a similar layout).

In step S23127, electronic files obtained as the search result of the file search process are displayed on a display unit 116 as candidates for the electronic file (or its thumbnail image (representative image)) corresponding to the read document image to accept selection of an electronic file to be processed from the candidates.

If there is only one candidate, the flow automatically advances from step S23128 to step S23133.

In step S23128, it is determined whether one is selected from the electronic file candidates displayed on the display unit 116. If any electronic file is selected (YES in step S23128), the flow advances to step S23133. On the other hand, if no electronic file is selected (NO in step S23128), the flow advances to step S23129.

Even when any electronic file is selected in step S23128, the flow advances to step S23129 when the electronic file is image data typified by PDF or TIFF.

In step S23129, a vectorized process of converting image data (the electronic file of the read document image (image data) input in step S23120 or the electronic file of image data selected in step S23127) into vector data is executed.

This vectorized process is the same as that described in step S124 of FIG. 3 according to the first embodiment. The subsequent steps S23130 to S23132 respectively correspond to steps S125 to S127 of FIG. 3. In step S23133, the display unit 116 is notified of the storage address of the original electronic file found in step S23125, the storage address of the electronic file selected in step S23128, or the storage address of the electronic file stored in step S23131.

In step S23134, it is determined whether an operation instruction from an operation unit 113 is a read document image registration instruction. If it is not the read document image registration instruction (NO in step S23134), the flow advances to step S23136. On the other hand, if it is the read document image registration instruction (YES in step S23134), the flow advances to step S23135.

The process in step S23134 determines the presence/absence of an instruction to execute registration operation. The registration operation is performed when the user wants to register, as an original electronic file, image information/vector data/an electronic file selected in step S23128 of a read document image which contains no pointer information in order to reuse the read document image in the image processing system.

For this reason, if the read document image contains pointer information, the registration operation may not be performed. Even when the read document image contains pointer information, and an original electronic file corresponding to the read document image is already present, the user may want to register the read document image again depending on the application purpose. Thus, the registration operation is not limited to a read document image which contains no pointer information.

If an instruction for copying a read document image (printing apparatus) is issued instead of one for the registration operation, the original electronic file may be registered and at the same time may be copied (printed) as a print of the read document image.

In step S23135, a pointer information appending process is performed to generate pointer information for a read document image to be registered and append the pointer information as image data to an original electronic file corresponding to the read document image. The original electronic file to which the pointer information is appended is stored in, e.g., the hard disk in the client PC 102 in FIG. 1, the database 105, or the storage unit 111 of the MFP 100 itself. Simultaneously with the storage, the original electronic file may be printed from a printing unit 112.

In step S23136, an operation window is presented on the display unit 116 to perform various kinds of processes (e.g., edit/storage/transmission (FAX transmission, e-mail transmission, or file transmission)/printing) for the original electronic file corresponding to the read document image. The various kinds of processes for the original electronic file can be performed via the operation window.

[OCR/OMR Process (Pointer Information Detection Process)]

Details of the process in step S23122 of FIG. 23 will be described with reference to FIG. 24.

Figure 24:
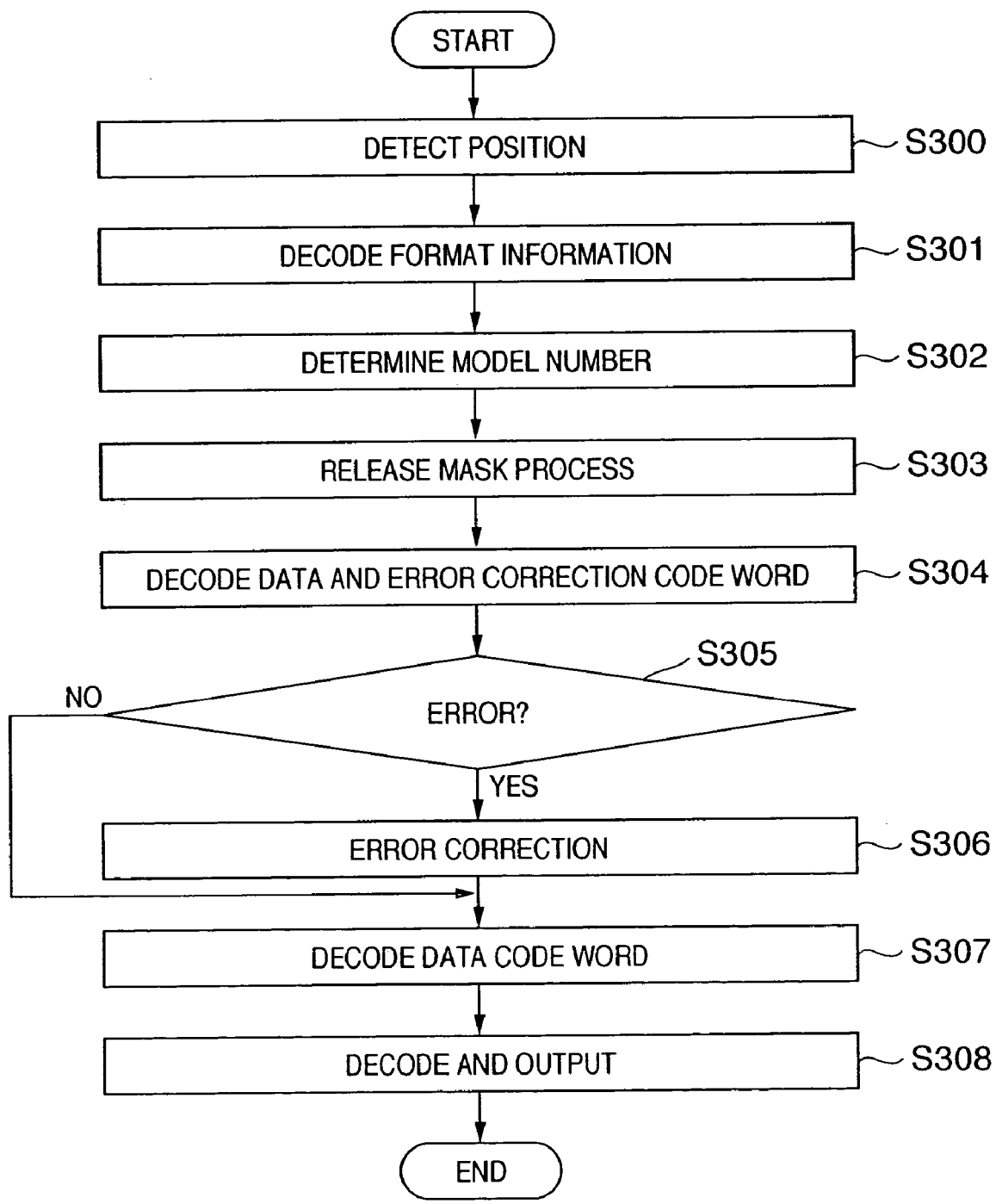
FIG. 24 is a flowchart showing details of a process in step S23122 according to the 12th embodiment of the present invention.

FIG. 24 is a flowchart showing details of the process in step S23122 according to the 12th embodiment of the present invention.

Figure 25:
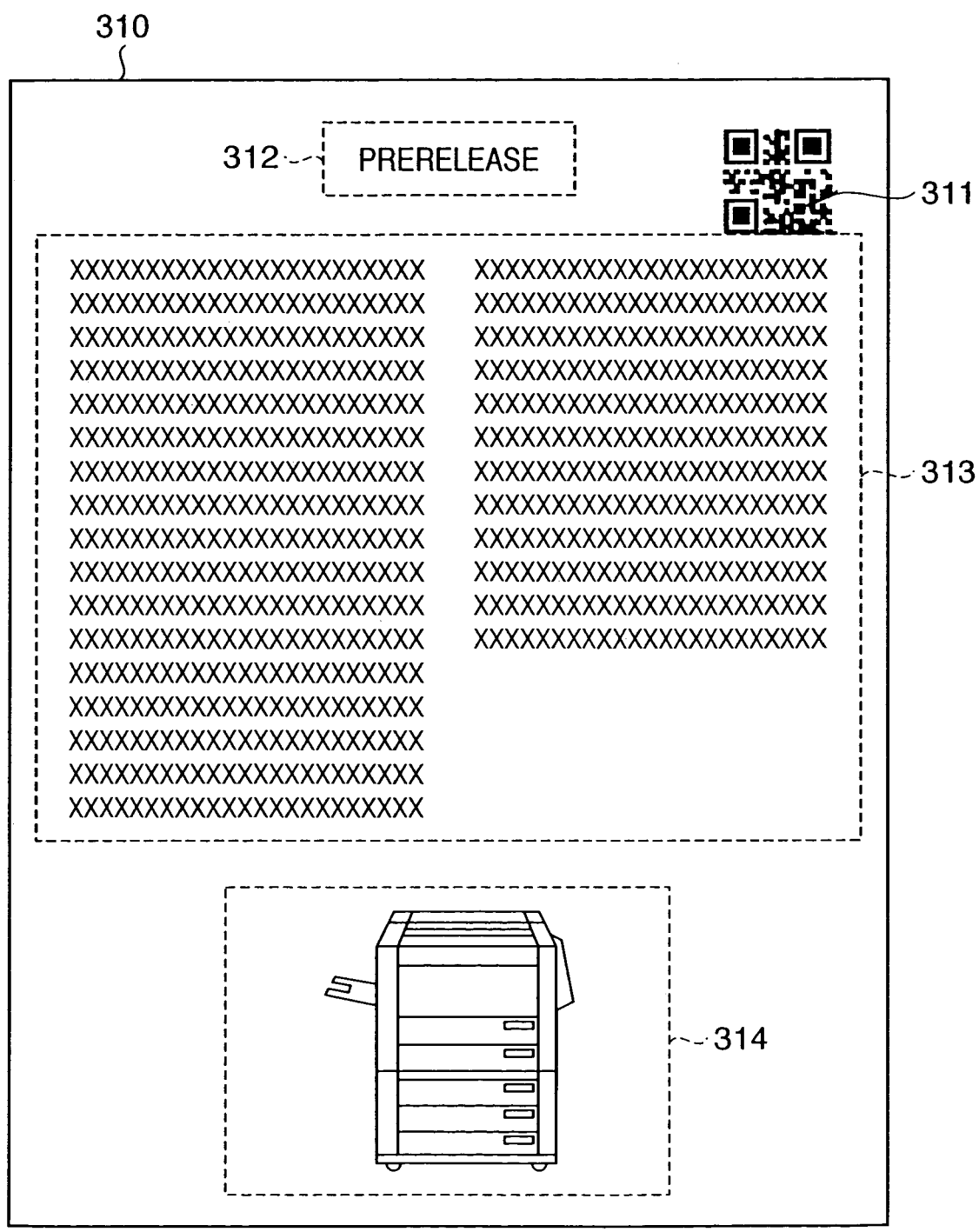
FIG. 25 is a view showing an example of a document image according to the 12th embodiment of the present invention.

Referring to FIG. 24, a process of decoding a two-dimensional barcode (e.g., a QR code symbol) 311 appended into a document image 310 as shown in FIG. 25 and outputting a data character string will be described.

In step S300, a CPU (not shown) scans an image that represents the document image 310 stored in a page memory in a data processing unit 115, and detects the position of the predetermined two-dimensional barcode symbol 311 (block) from the result of the above-mentioned BS process.

Particularly in the 12th embodiment, a position detection pattern of a QR code serving as the two-dimensional barcode symbol 311 comprises identical position detection element patterns, which are located at three out of four corners of the two-dimensional barcode symbol 311. For this purpose, in the 12th embodiment, the position of the two-dimensional barcode symbol 311 is detected by detecting the position detection pattern.

Next, in step S301, format information that neighbors the position detection pattern is decoded to obtain an error correction level and mask pattern applied to the symbol.

In step S302, a model number which specifies the two-dimensional barcode symbol 311 is determined. After that, in step S303, an encoded region bit pattern is XORed using the mask pattern obtained from the format information, thus releasing the mask process.

In step S304; a symbol character is read in accordance with the layout rule corresponding to the model so as to decode a data code word and error correction code word of the two-dimensional barcode symbol 311.

In step S305, it is determined whether the decoded error correction code word includes an error. If no error is detected (NO in step S305), the flow advances to step S307; otherwise (YES in step S305), the flow advances to step S306 to correct the error.

In step S307, the data code word is divided into segments on the basis of a mode indicator and character count indicator from the error-corrected data.

Finally, in step S308, data characters are decoded on the basis of a mode used, thus outputting the decoding result.

Note that information to be encoded in the two-dimensional barcode represents address information (pointer information) of the corresponding electronic file, which is URL (URI) or full path information indicating the storage destination of an electronic file formed from a server name, directory, and file name.

In the 12th embodiment, the document image 310 to which the pointer information is appended as the two-dimensional barcode has been described. Alternatively, the pointer information may be directly printed as a character string on the document image 310. In this case, a text block according to a predetermined rule is detected by the above BS process, and characters in the text image that indicates the pointer information undergo character recognition, thus directly obtaining the address information of the original electronic file.

Furthermore, the pointer information may be embedded in the document 310 by applying imperceptible modulation to, e.g., the spacings between neighboring characters in a text block 312 or 313 of the document image 310 shown in FIG. 25 and embedding information in the character spacings. In this case, when the character spacings are detected upon executing a character recognition process (to be described later), pointer information can be obtained. Also, the pointer information can be assigned as a digital watermark in a natural image 314.

[Search Process]

An original electronic file search process based on the pointer information in step S23125 of FIG. 23 will be described below using the flowchart of FIG. 26.

Figure 26:
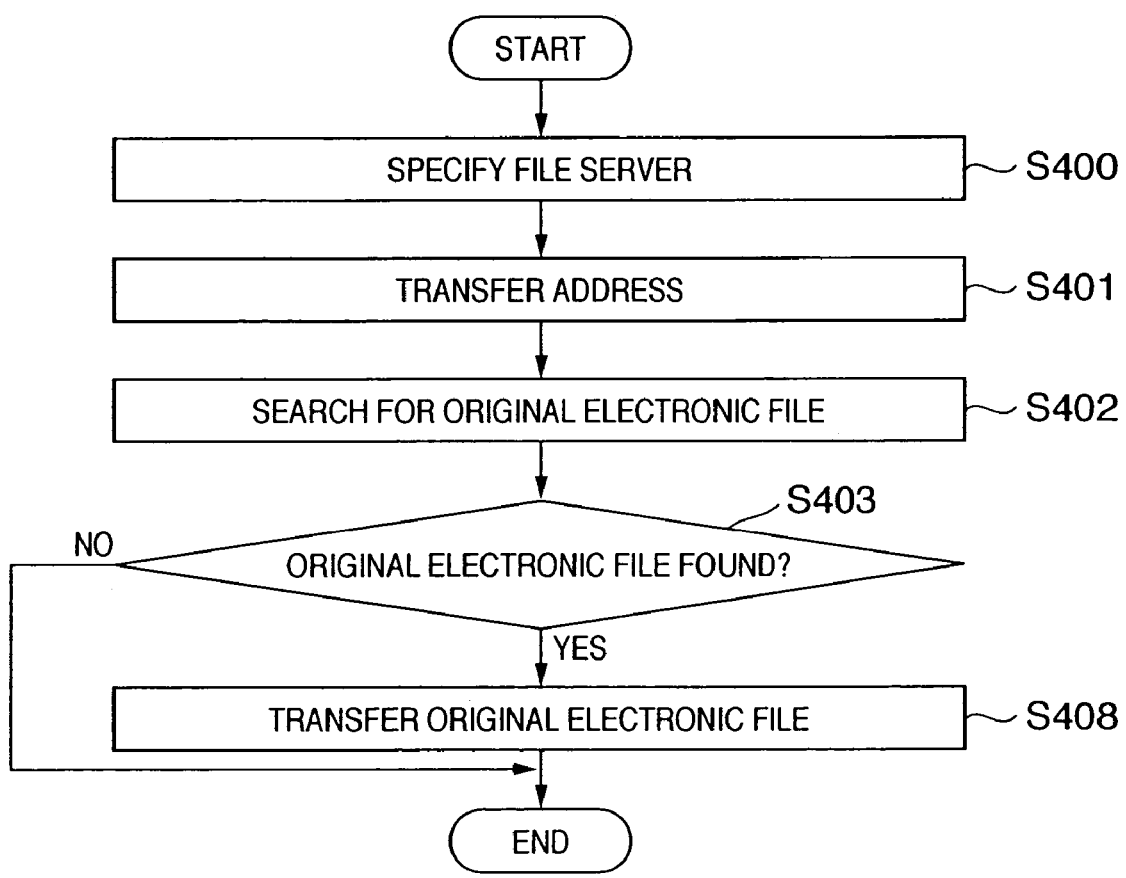
FIG. 26 is a flowchart showing an original electronic file search process according to the 12th embodiment of the present invention.

FIG. 26 is a flowchart showing the original electronic file search process according to the 12th embodiment of the present invention.

In step S400, the MFP 100 specifies a file server serving as the storage destination of an electronic file on the basis of the address information in the pointer information.

Note that the file server indicates the client PC 102, a document management server 106 that manages the database 105, or the MFP 100 itself that incorporates the storage unit 111.

In step S401, the MFP 100 transfers the address information to the specified file server.

In step S402, upon reception of the address information, the file server searches for the corresponding original electronic file. In step S403, it is determined whether the original electronic file exists. If the original electronic file is not found (NO in step S403), the file server sends a message that advises the absence of the file to the MFP 100.

On the other hand, if the original electronic file is found (YES in step S403), the flow advances to step S408. The file server notifies the MFP 100 of the address of the original electronic file and transfers the original electronic file to the MFP 100.

Figure 27:
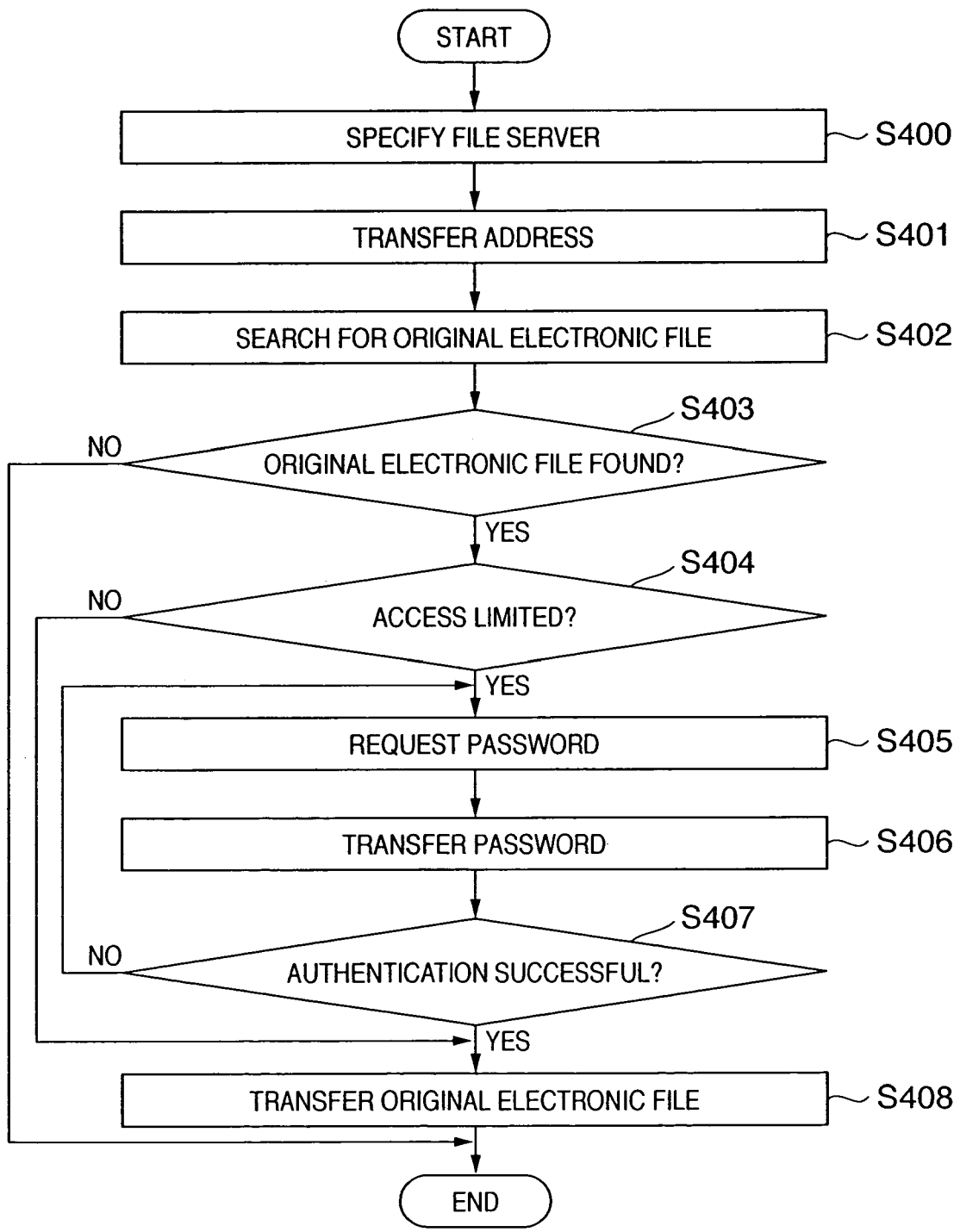
FIG. 27 is a flowchart showing an application of the original electronic file search process according to the 12th embodiment of the present invention.

To increase security in the process of FIG. 26, authentication of the user who requests the original electronic file may be performed as shown in FIG. 27. That is, reuse, by a third party, of some of original electronic files to be processed must often be limited. The process in FIG. 26 has been explained under the condition that all original electronic files stored in the file server can be freely accessed, and the entire file or some objects of the file are reusable.

A case will be described with reference to FIG. 27 wherein access to an original electronic file is limited differently for each user.

FIG. 27 is a flowchart showing an application of the original electronic file search process according to the 12th embodiment of the present invention.

In the process of FIG. 27, the same step numbers as those in the process of FIG. 26 denote the same processes, and a description thereof will be omitted.

Referring to FIG. 27, if the original electronic file is found in step S403, it is determined in step S404 whether the access to the original electronic file is limited. If the access is not limited (NO in step S404), the flow advances to step S408. If the access is limited (YES in step S404), the flow advances to step S405. In step S405, the MFP 100 presents a password input window on the display unit 116 and prompts the user operating the MFP 100 to input a password.

In step S406, when a password is input, the MFP 100 transfers the password to the file server. In step S407, it is determined whether the file server has made authentication successfully on the basis of the password. If the authentication has failed (NO in step S407), the flow returns to step S405. On the other hand, if the authentication has succeeded (YES in step S407), the flow advances to step S408.

If the authentication has failed in step S407, password input is requested again. However, if the number of times of authentication failures exceeds a predetermined value, the attempt at authentication may be determined as operation by an invalid user, and the process itself may be stopped.

The authentication method in step S407 is not limited to one using a password, and various other authentication methods such as popular biometric authentication (e.g., fingerprint authentication), and authentication using a card can be adopted.

This authentication can be applied to a file search process (to be described below).

The same authentication can be applied to a case wherein the original electronic file cannot be found in the file server, i.e., in the series of processes in steps S23129 to S23132 in FIG. 23. That is, if a limitation of the access right to a given read document image is detected, the processes from step S23129 are executed only when the access right is successfully authenticated, thus limiting processes executable by the image processing system for each user or each read document image with high secrecy.

[File Search Process]

Details of the process in step S23126 of FIG. 23 will be described with reference to FIGS. 5, 28A and 28B.

Figure 28A:
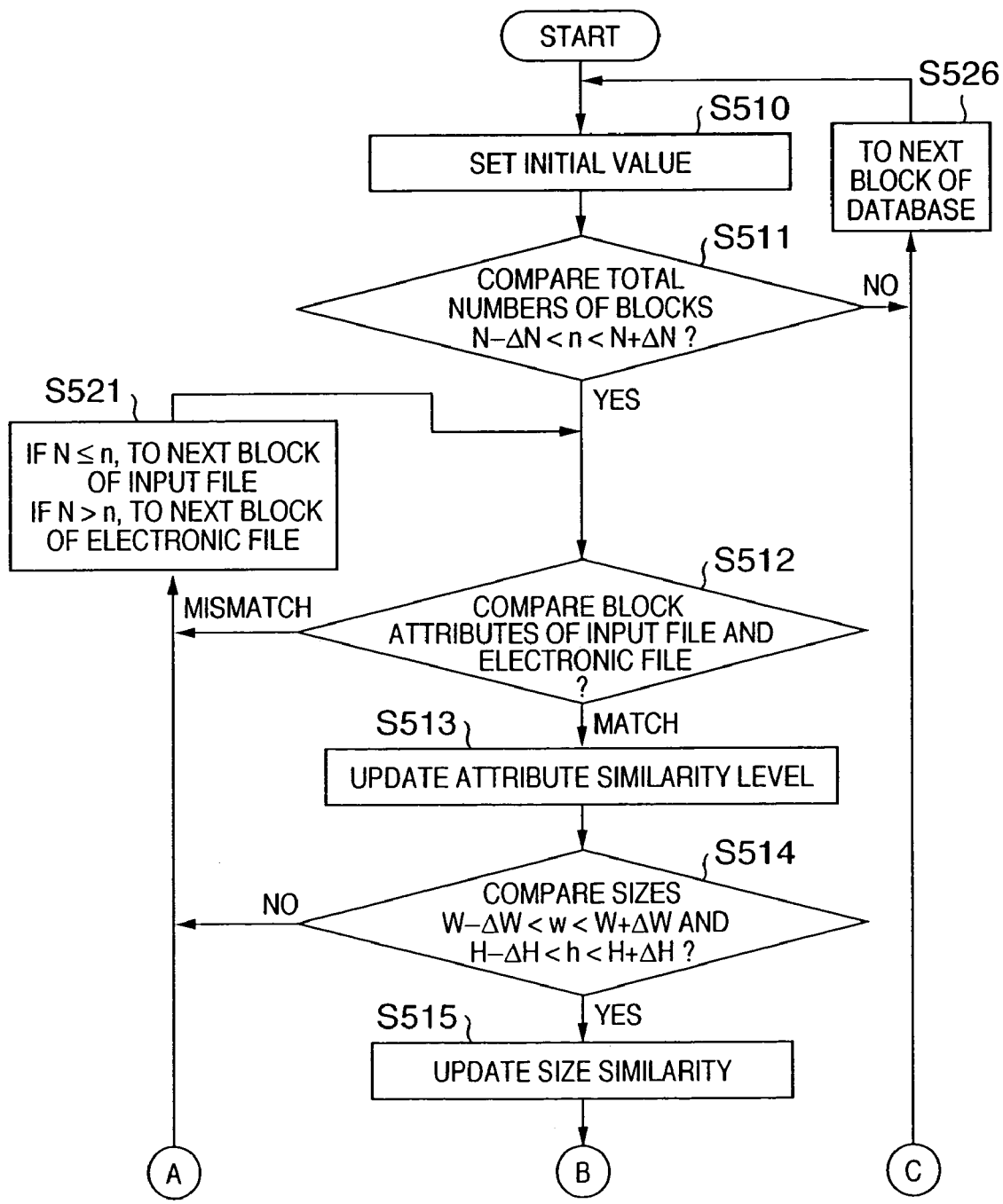
FIG. 28A is a flowchart showing details of a process in step S23126 according to the 12th embodiment of the present invention.
Figure 28B:
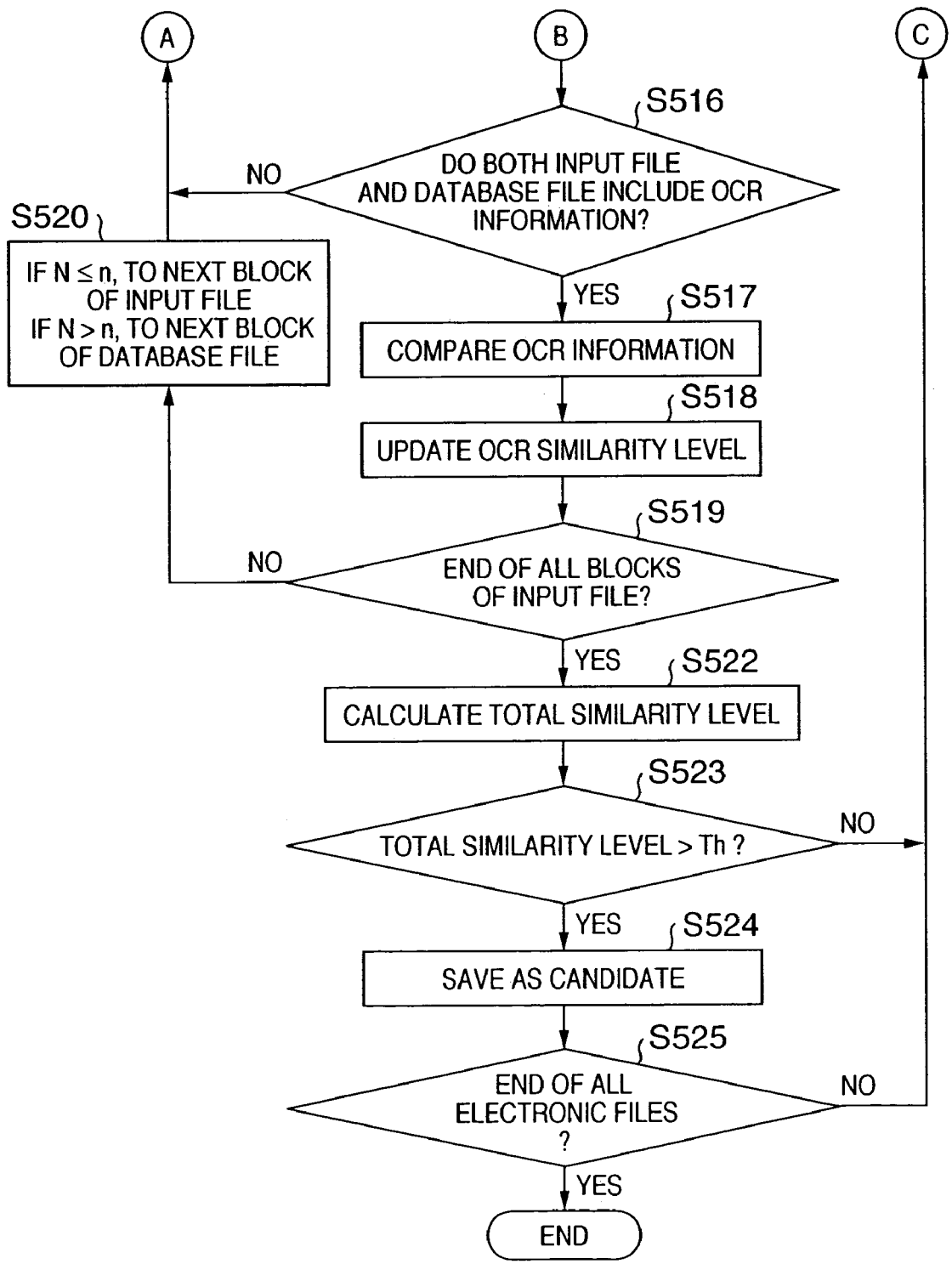
FIG. 28B is a flowchart showing details of a process in step S23126 according to the 12th embodiment of the present invention.

FIGS. 28A and 28B is a flowchart showing details of the process in step S23126 according to the 12th embodiment of the present invention.

The process in step S23126 is performed if a read document image (input file) has no pointer information in step S23124, if pointer information is available but no original electronic file is found, or if a found original electronic file is an image file.

Assume that the process in step S23126 uses block information and input file information obtained in the process in step S23122. As a specific example, the block information and input file information shown in FIG. 5 will be described. In the block information in FIG. 5, respective blocks are named and managed as blocks 1, 2, 3, 4, 5, and 6 in ascending order of coordinate X (i.e., $X1<X2<X3<X4<X5<X6$).

A process of searching (performing a layout search process) for an electronic file similar to an input file in the database managed by the file server using the block information and input file information will be described with reference to FIGS. 28A and 28B. Assume that electronic files managed by the database have the same kinds of block information and file information as those in FIG. 5. The layout search process is performed while sequentially comparing electronic files in the database with the input file.

In step S510, various kinds of initial values are set to calculate similarity levels and the like (to be described later). In step S511, the total numbers of blocks are compared. Let n be the total number of blocks of the input file; N, the total numbers of blocks to be compared in the database; and $\Delta N$, an error. In this comparison, it is determined whether the conditional expression $N-\Delta N<n<N+\Delta N$ is satisfied.

In step S511, if the conditional expression is not satisfied (NO in step S511), the flow advances to step S526. In step S526, an electronic file to be processed is set to the next electronic file, and the flow returns to step S510. On the other hand, if the conditional expression is satisfied (YES in step S511), comparison of the input file with the electronic file to be compared based on the block information is performed in the processes from step S512.

In step S512, the block attribute of a block to be processed of an electronic file to be compared is compared with that of a block to be processed of the input file on the basis of the block information. If the block attributes do not coincide with each other, the flow advances to step S521. In step S521, if the total number N of blocks of the electronic file to be compared $\geqq$ the number n of blocks of the input file, the next block of the input file is set as the block to be processed. On the other hand, if the total number N of blocks of the electronic file to be compared<the number n of blocks of the input file, the next block of the electronic file to be compared is set as the block to be processed.

If the block attributes coincide with each other in step S512, the flow advances to step S513. In step S513, the attribute similarity level is calculated, and its value is updated.

In step S514, the size (width and height) of the block to be processed of the electronic file to be compared is compared with that of the block to be processed of the input file on the basis of the block information. Let w be the width of the block to be processed in the input file; h, the height of the block; W, the width of the block to be processed in the electronic file to be compared; $\Delta W$, an error in the width W; H, the height of the block; and $\Delta H$, an error in the height H. In this comparison, it is determined whether the conditional expressions $W-\Delta W<w<W+\Delta W$ and $H-\Delta H<h<H+\Delta H$ are satisfied.

In addition to the conditional expressions, comparison may be performed on the basis of the block positions (X,Y).

If the conditional expressions are not satisfied in step S514 (NO in step S514), the flow advances to step S521. On the other hand, if the conditional expressions are satisfied (YES in step S514), the flow advances to step S515. In step S515, the size similarity level is calculated, and its value is updated.

In step S516, it is determined on the basis of the block information whether the block to be processed of the input file and that of the electronic file to be compared each have OCR information. If no OCR information is present (NO in step S516), the flow advances to step S521. On the other hand, if any OCR information is found (YES in step S516), the flow advances to step S517 to compare the OCR information with each other.

In step S518, the OCR similarity level is calculated, and its value is updated. In step S519, it is determined whether all blocks in the input file have undergone the comparison process. If the comparison process has not ended (NO in step S519), the flow advances to step S520. If the total number N of blocks of the electronic file to be compared$\leqq$the number n of blocks of the input file in step S520, the next block of the input file is set as the block to be processed. On the other hand, if the total number N of blocks of the electronic file to be compared>the number n of blocks of the input file, the next block of the electronic file to be compared is set as the block to be processed.

If the comparison process has ended in step S519 (YES in step S519), the flow advances to step S522.

In step S522, the total similarity level is calculated on the basis of the similarity levels calculated in steps S513, S515, and S518.

Since a method of calculating each similarity level in step S513, S515, or S518 can use a known technique, a detailed description thereof will be omitted.

In step S523, it is determined whether the total similarity level is higher than a predetermined threshold value Th. If the total similarity level is lower than the predetermined threshold value Th (NO in step S523), the flow advances to step S526. On the other hand, if the total similarity level is higher than the predetermined threshold value Th (YES in step S523), the flow advances to step S524, and the electronic file is stored as a similar candidate of the input file.

In step S525, it is determined whether the comparison process for all electronic files in the database has ended. If the comparison process has not ended (NO in step S525), the flow advances to step S526. On the other hand, if the comparison process has ended (YES in step S525), the process ends.

With the above-mentioned process, if there is an electronic file having the total similarity level higher than the threshold value Th, that file is determined as a candidate for an electronic file similar to the input file. By outputting the candidate for the electronic file in step S23127 of FIG. 23, the user can select the desired electronic file.

[Pointer Information Appending Process]

Details of the process in step S23135 of FIG. 23 will be described with reference to FIG. 29.

Figure 29:
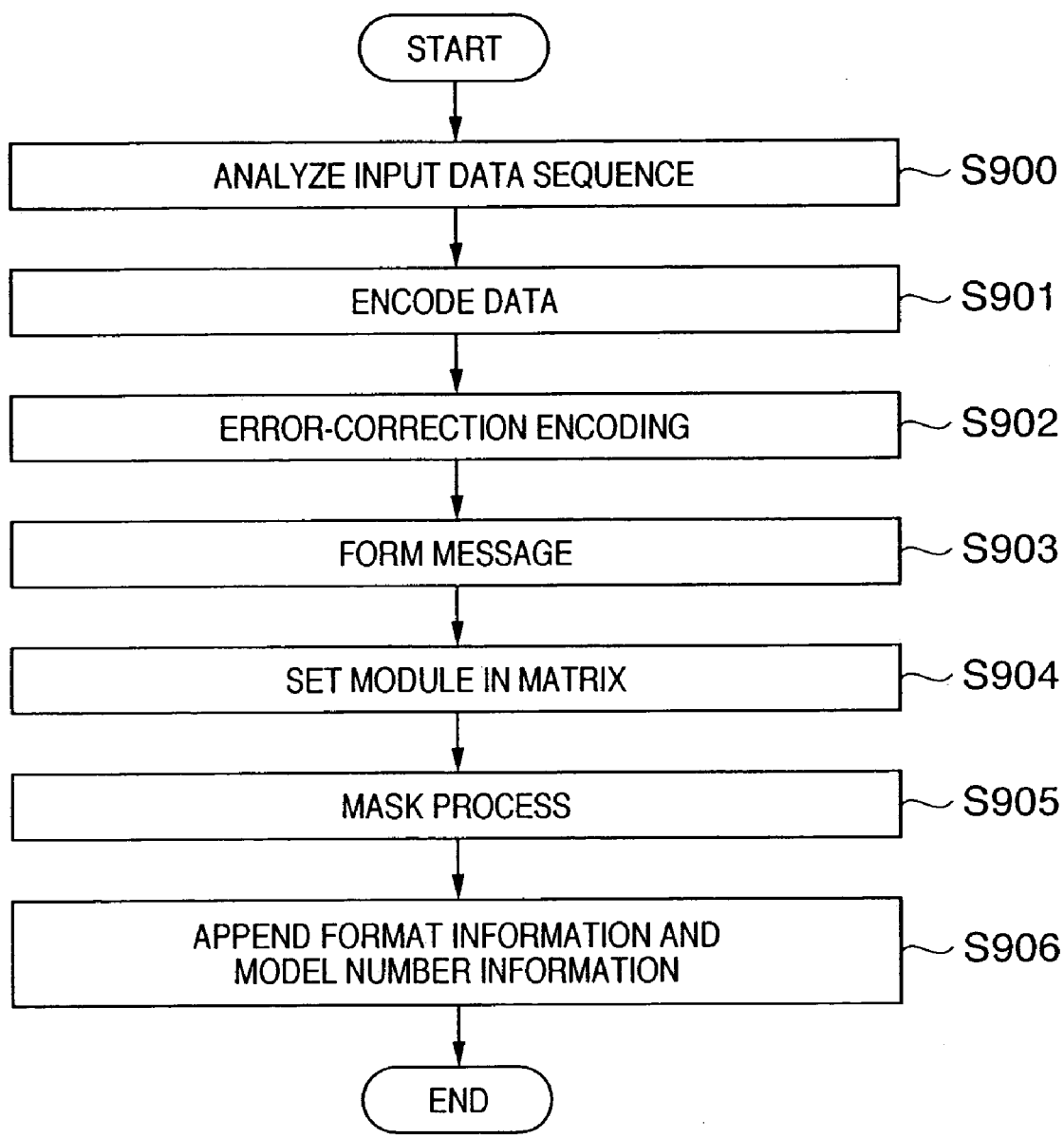
FIG. 29 is a flowchart showing details of a process in step S23135 according to the 12th embodiment of the present invention.

FIG. 29 is a flowchart showing details of the process in step S23135 according to the 12th embodiment of the present invention.

A process of encoding a data character string as pointer information by the two-dimensional barcode (QR code symbol: JIS X0510) 311 and appending the encoded data to an image will be described with reference to FIG. 29.

Data to be encoded in the two-dimensional barcode represents address information of the corresponding electronic file, which is formed from, e.g., path information including a file server name and file name. Or the address information may be formed from a URL (URI) to the corresponding electronic file, a file ID managed in the database 105 that stores the corresponding electronic file or in the storage unit 111 of the MFP 100 itself, or the like.

In step S900, in order to identify different types of characters to be encoded, an input data sequence is analyzed. Also, error detection and error correction levels are selected, and a minimum model number that can store input data is selected.

In step S901, the input data sequence is converted into a predetermined bit sequence, and an indicator indicating a data mode (numeric, alphanumeric, 8-bit byte, kanji, etc.) and an end pattern are appended as needed. Furthermore, the bit sequence is converted into predetermined bit code words.

At this time, for the purpose of error correction, in step S902, the code word sequence is divided into a predetermined number of blocks in accordance with the model number and error correction level, and error correction code words are generated for respective blocks and are appended after the data code word sequence.

In step S903, the data code words of respective blocks obtained in step S902 are connected, and the error correction code words of the blocks and if necessary, remainder code words are connected after the data code word sequence.

Next, in step S904, the code word module is set in a matrix together with a position detection pattern, separation pattern, timing pattern, alignment pattern, and the like.

In step S905, a mask pattern optimal for the symbol encoding region is selected to perform a mask process of converting the mask process pattern into the module obtained in step S904 by calculating XORs.

Finally, in step S906, type information and model number information are generated for the module obtained in step S905, thus completing a two-dimensional code symbol.

With the above-mentioned process, for example, when a corresponding electronic file from the client PC 102 is to be printed as printing data by the printing unit 112, the two-dimensional barcode that incorporates address information is converted into recordable raster data by the data processing unit 115, appended to a predetermined position on raster data of the electronic file, and printed. By reading printed matter (document) bearing the two-dimensional barcode (pointer information) by an image reading unit 110, the storage location of the original electronic file specified by the pointer information can be detected.

For the same purpose, so-called watermarking methods including a method of directly appending pointer information to an electronic file as a character string, a method of embedding information by modulating the spacings of a character string in an electronic file (especially, the spacings between neighboring characters), and a method of embedding information in a halftone image (thumbnail image) in an electronic file, can be applied in addition to the two-dimensional barcode.

[Application for Electronic File Search]

In the 12th embodiment, a search for an original electronic file (electronic file) corresponding to a read document image is made on the basis of pointer information in the read document image or object information (attribute information, layout, OCR information, and the like) of each object in the read document image. To more accurately search for the original electronic file, the search may be made based on both the pointer information and object information.

More specifically, even when the original electronic file is found using the pointer information in the read document image, a search based on the object information in the read document image (e.g., a layout search using the layout or a full-text search using the OCR information) is made for the original electronic file found using the pointer information. If the original electronic file is found to have high similarity level, the original electronic file is specified as a formal original electronic file.

Assume that the detection precision of the pointer information is poor, and a plurality of candidates for the original electronic file are found. With above-mentioned arrangement, the candidates for the original electronic file are further narrowed down by the search based on the object information, and the original electronic file can be specified. Thus, high-speed and high-precision specifying operation can be implemented.

[Application of Vectorized Process]

In the 12th embodiment, if an original electronic file or electronic file corresponding to a read document image cannot be specified, the vectorized process is performed for the entire read document image. In some cases, all objects in a read document image to be processed are not newly created, and some of them are diverted from another existing electronic file.

For example, several patterns of background objects (wall papers) are prepared in a word processing application, and one of them is generally selected and used. Such a background object is highly likely to be present in an existing electronic file in a file server and is also highly likely to be present as reusable vector data.

For this reason, as another example of the vectorized process in step S23129 of FIG. 23, an electronic file containing an object to be processed out of separate objects obtained in the block selection process may be searched for in the file server. If any electronic file is found, vector data may be obtained for each object from the found electronic file.

With this arrangement, the vectorized process need not be performed for the entire read document image. This makes it possible to perform the vectorized process at a higher speed and prevent degradation in image quality due to the vectorized process.

On the other hand, if an electronic file found in the file search process in step S23126 of FIG. 23 is a PDF file, the PDF file may have text codes having undergone character recognition as an additional file for a text object in the PDF file. If the additional file (text code file) is used to perform the vectorized process for the PDF file, the character recognition process to be performed as part of the process in step S23129 can be skipped, and the vectorized process can be performed at a higher speed.

The detailed arrangement of the data processing unit 115 will be explained with reference to FIG. 30.

Figure 30:
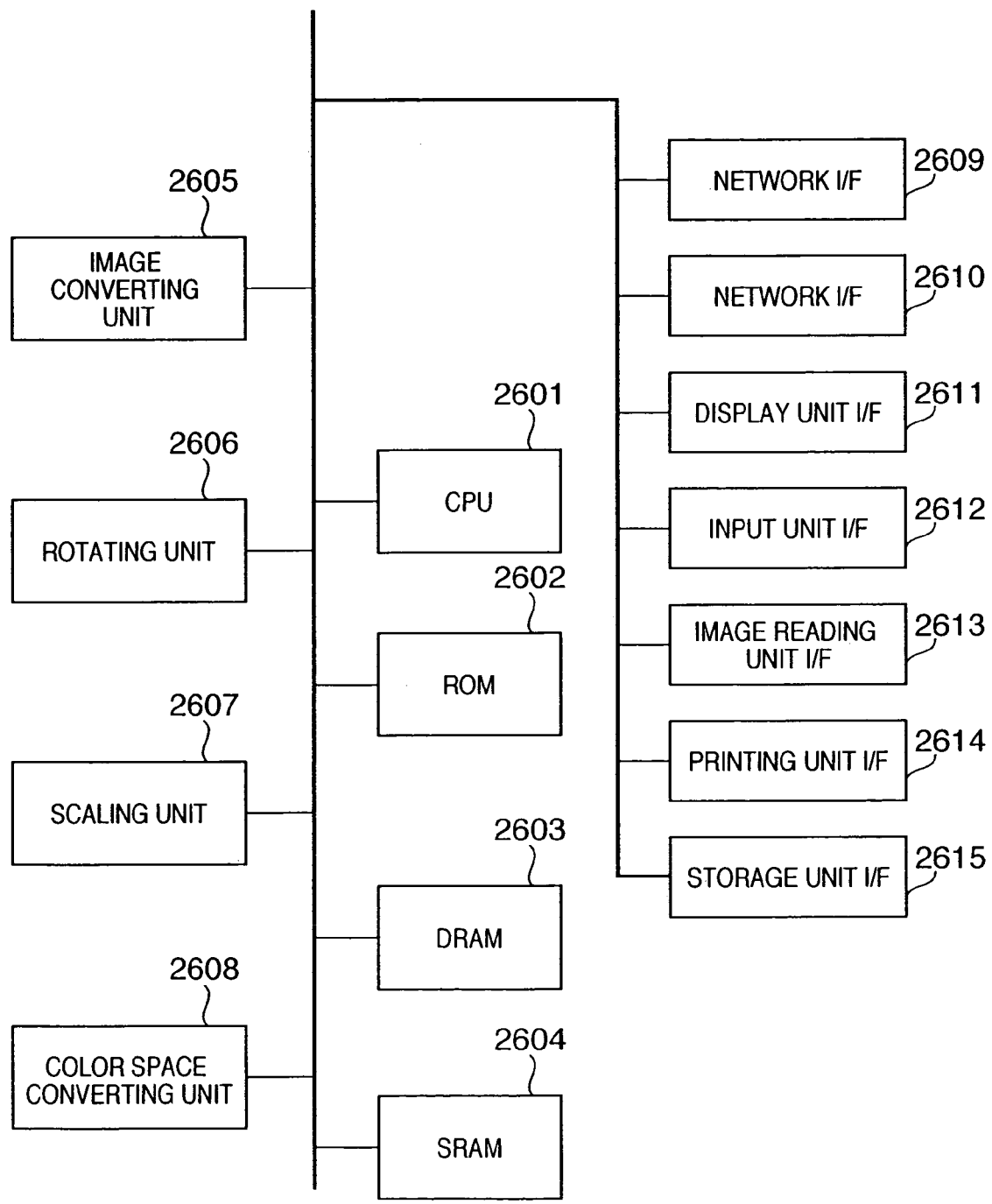
FIG. 30 is a block diagram showing the detailed arrangement of a data processing unit according to the 12th embodiment of the present invention.

FIG. 30 is a block diagram showing the detailed arrangement of the data processing unit according to the 12th embodiment of the present invention.

The data processing unit 115 comprises a CPU 2601, and operates in accordance with a program stored in a ROM 2602. Reference numeral 2603 denotes a DRAM used as a work memory necessary to execute a program and an image memory necessary to store images. Reference numeral 2604 denotes an SRAM which stores data to be backed up.

Reference numeral 2605 denotes an image converting unit which performs multilevel→binary conversion and binary→multilevel conversion. The image converting unit 2605 receives image data from the DRAM 2603 via a data bus 2616, and writes the converted image data again in the DRAM 2603.

Reference numeral 2606 denotes a rotating unit which rotates an image. Reference numeral 2607 denotes a scaling unit which changes the magnification of an image. Reference numeral 2608 denotes a color space converting unit which converts the color space of an image. Reference numerals 2609 and 2610 denote network I/Fs which are respectively connected to network I/Fs 114 and 118 (FIG. 2).

Reference numeral 2611 denotes a display unit I/F which is connected to the display unit 116 (FIG. 2). Reference numeral 2612 denotes an input unit I/F which is connected to the operation unit 113 (FIG. 2). Reference numeral 2613 denotes an image reading unit I/F which is connected to the image reading unit 110 (FIG. 2). Reference numeral 2614 denotes a printing unit I/F which is connected to the printing unit 112 (FIG. 2). Reference numeral 2615 denotes a storage unit I/F which is connected to the storage unit 111 (FIG. 2).

An image read by the image reading unit 110 is stored in the DRAM 2603 via the image reading unit I/F 2613. By using the image converting unit 2605, rotating unit 2606, scaling unit 2607, color space converting unit 2608, and CPU 2601, the image in the DRAM 2603 undergoes an image process complying with a processing mode designated from the operation unit 113. The processed image is transmitted from the network I/F 114 via the network I/F 2609 or printed by the printing unit 112 via the printing unit I/F 2614.

An example of an operation window formed by the operation unit 113 and display unit 116 will be explained with reference to FIG. 31.

In particular, the 12th embodiment will exemplify an operation window for managing operation of the MFP 100 for each department when a plurality of types of departments exist in a given organization.

In the following description, the management unit is each department in a given organization, but may be an arbitrary item which can be classified in the organization, such as each section in the organization, each business place, each branch office, each age group, each gender, and each duty position.

Figure 31:
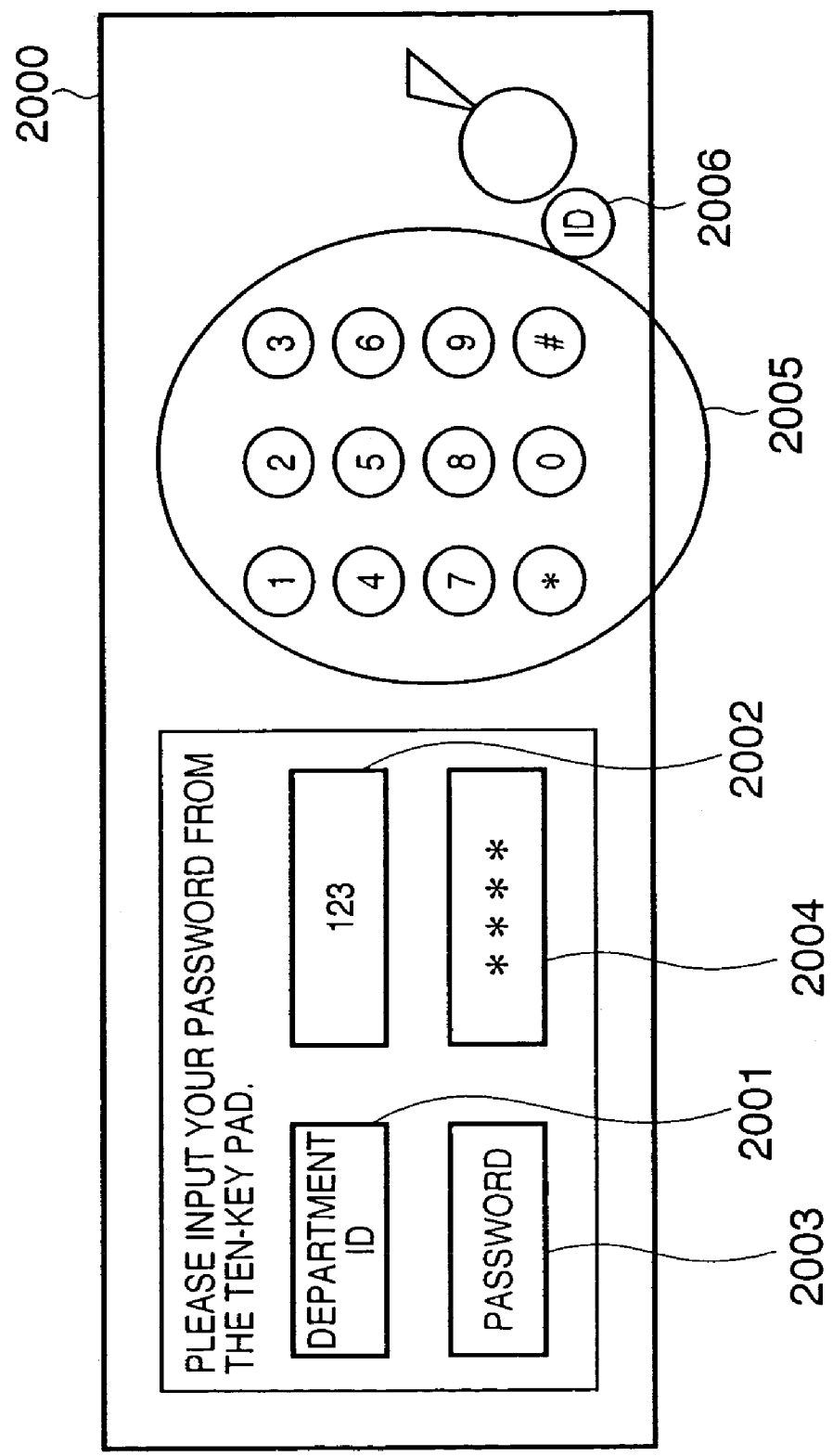
FIG. 31 is a view showing an example of an operation window according to the 12th embodiment of the present invention.

FIG. 31 is a view showing an example of the operation window according to the 12th embodiment of the present invention.

When a department ID button 2001 is touched on an operation window 2000, a department ID serving as department information for uniquely specifying a department can be input from a ten-key pad 2005. A department ID input from the ten-key pad 2005 is displayed in a department ID display region 2002.

When a password button 2003 is touched, a password set for a user in advance can be input from the ten-key pad 2005. A password input from the ten-key pad 2005 is displayed as "*"s by the number of inputs in a password display region 2004.

After the department ID and password are input, an ID key 2006 is touched, and the operation window shifts to one for using various functions (e.g., copying function and scan function) of the MFP.

In FIG. 31, the operation window 2000 can implement usage management of the MFP 100 for each department.

The usage management is not limited to the operation window 2000 in FIG. 31, and a control card (e.g., ID card) held by the user may be adopted together with an operation window.

An example of this operation window will be described with reference to FIG. 32.

Figure 32:
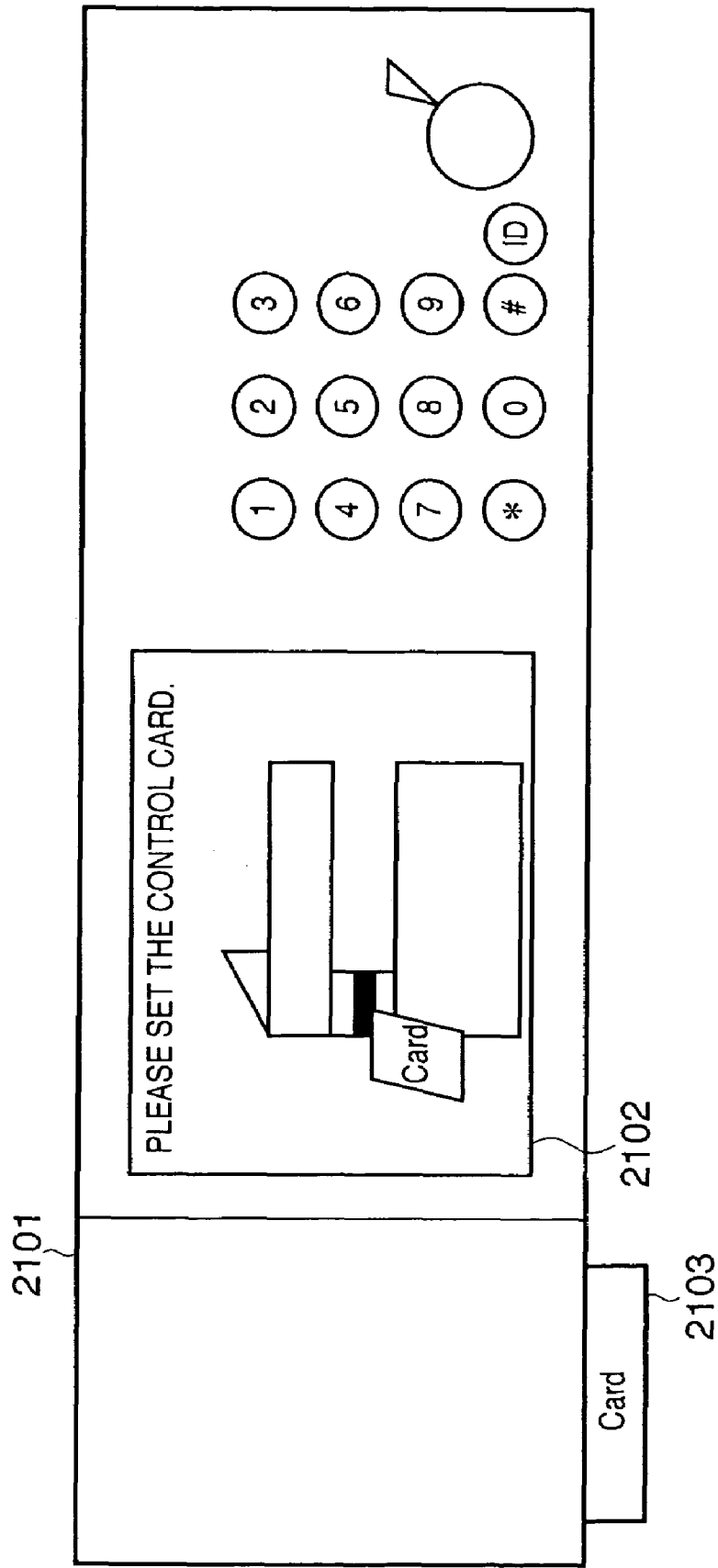
FIG. 32 is a view showing another example of the operation window according to the 12th embodiment of the present invention.

FIG. 32 is a view showing another example of the operation window according to the 12th embodiment of the present invention.

An operation window 2102 displays a message which prompts the user to set a control card. In response to this, the user inserts a control card 2103 into a card reader 2101. Based on card information obtained from the card reader 2101, the MFP 100 determines a department to which the user belongs. Based on the determined department, the operation window shifts to one for using various functions (e.g., copying function and scan function) of the MFP.

A management window for managing the usage of the MFP 100 for each department will be explained with reference to FIG. 33.

Figure 33:
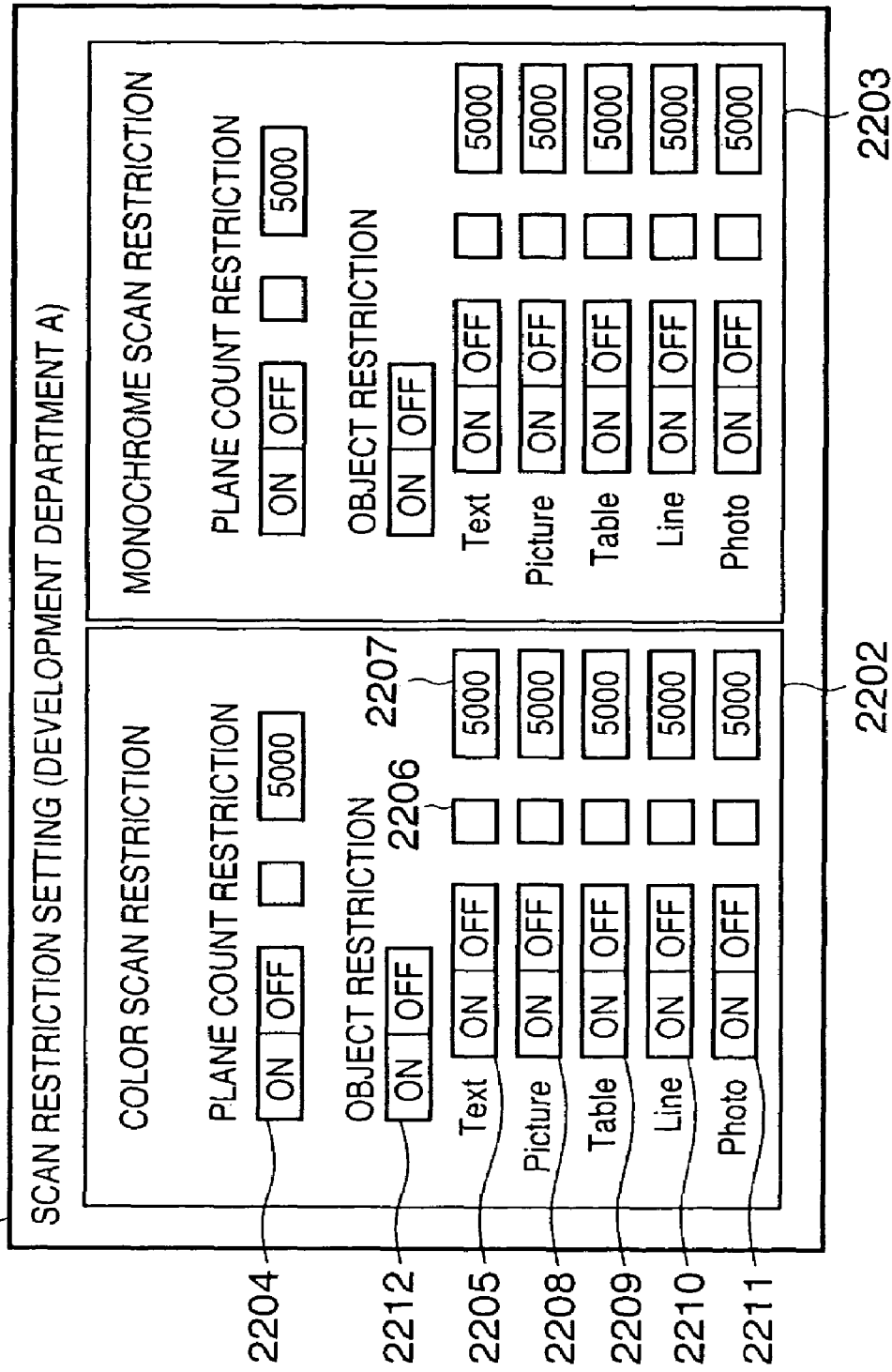
FIG. 33 is a view showing an example of a management window according to the 12th embodiment of the present invention.

FIG. 33 is a view showing an example of the management window according to the 12th embodiment of the present invention.

In FIG. 33, a window for setting restriction on the usage of the scan function will be described.

A management window 2201 is used to set restriction on the usage of the scan function by each department, e.g., "development department A". In the management window 2201, a setting region 2202 for setting restriction on the usage of color scan, and a setting region 2203 for setting restriction on the usage of monochrome scan are formed as windows for setting restriction on the usage of the scan function.

Hence, the management window 2201 makes it possible to manage the usage of the scan function independently between a color document and a monochrome document.

In the example of FIG. 33, color scan and monochrome scan have common setting contents, and setting of restriction on the usage of the color scan function will be explained.

There are two methods of setting restriction on the usage of the color scan function: restriction on the usage of each document (to be referred to as plane count restriction hereinafter) and restriction on the usage of each object type in a document that can be generated by the scan function (to be referred to as object count restriction hereinafter).

In a plane count restriction setting region 2204, execution of plane count restriction can be set ON/OFF. In an object count setting region 2212, execution of object restriction can be set ON/OFF.

Plane count restriction and object count restriction can be simultaneously set ON, but in this case, the usage of the color scan function is inhibited when either count reaches its upper limit value.

When object count restriction is set ON in the object count setting region 2212, execution of restriction on each object type can be set ON/OFF. Whether to execute restriction on each object type is set ON/OFF via a text count setting region 2205, picture count setting region 2208, table count setting region 2209, line count setting region 2210, and photo count setting region 2211.

To restrict the usage of text objects, the text count setting region 2205 is set ON, a button 2206 is touched, and a desired numerical value can be input to an upper limit value input region 2207 with the ten-key pad. In the example of FIG. 33, "5,000" is input to the upper limit value input region 2207, and in this case, up to 5,000 text objects can be color-scanned.

Similarly, arbitrary numerical values can be set as the usage limit values of picture, table, line, and photo objects.

The types of objects shown in FIG. 33 are merely an example, and usage limit values can also be set for other types of objects or sets of a plurality of types of objects.

A setting value in the management window of FIG. 33 is managed by, e.g., a setting value management table in the storage unit 111 (SRAM 2604).

An example of the setting value management table will be described with reference to FIG. 34.

FIG. 34 is a table showing an example of the setting value management table according to the 12th embodiment of the present invention.

A setting value management table 2301 is specific to each department, e.g., "development department A". The setting value management table 2301 manages the upper limit values of usage of the monochrome scan function and color scan function for each object type (text, picture, table, line, or photo), and the cumulative number (usage amount) of objects generated by actual scan operation. The setting value management table 2301 also holds ON/OFF information on execution of object count restriction.

The upper limit value of usage and ON/OFF information are set on the basis of setting values input via the management window in FIG. 33. The cumulative number of objects is set by the count value of a counter incorporated in the MFP. Such counters are formed for each department, each function used, and each type of object generated by each function.

A process in executing restriction on the usage of the function of the MFP 100 will be explained with reference to FIG. 35.

Figure 35:
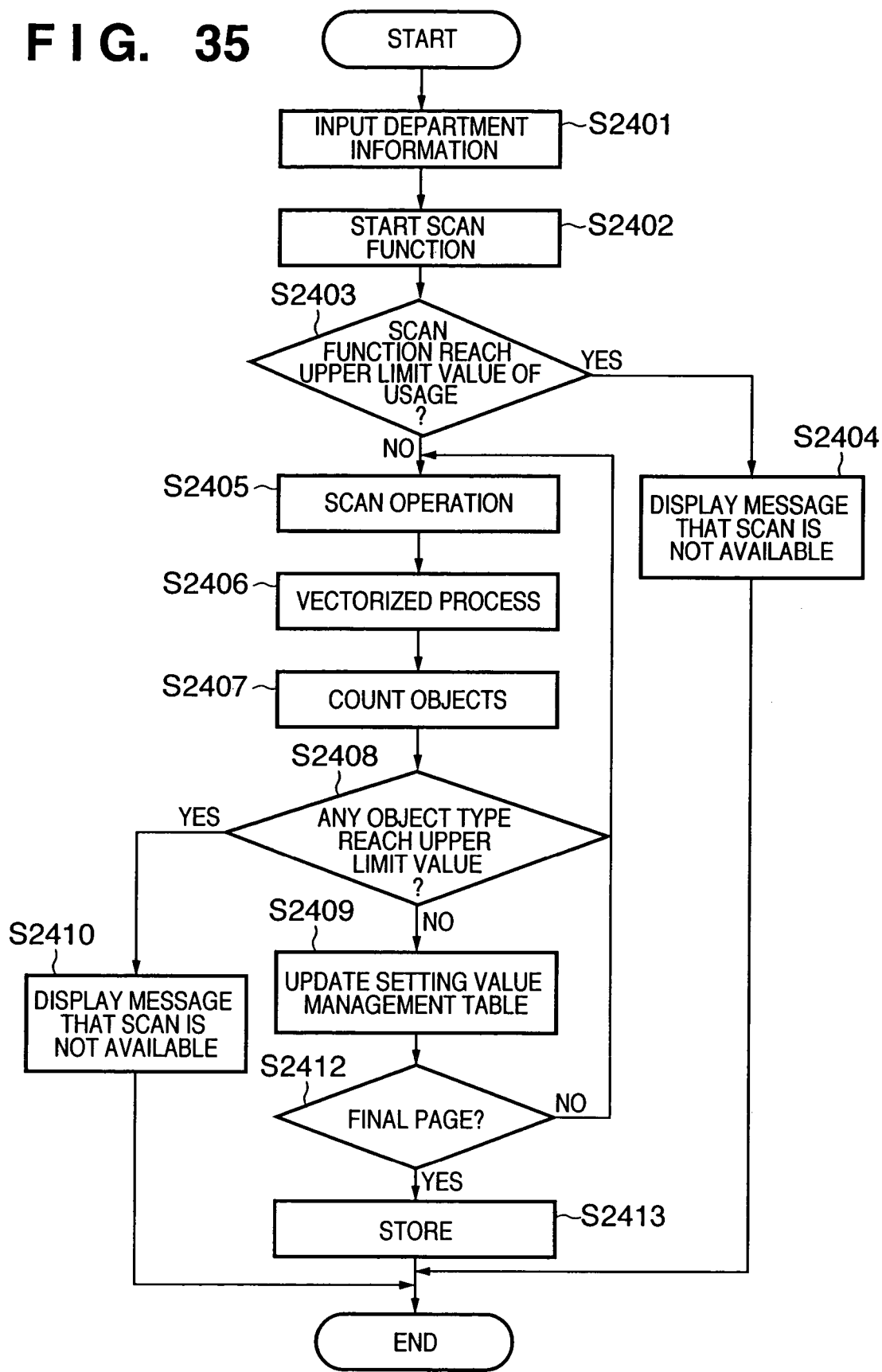
FIG. 35 is a flowchart showing a process in executing restriction on the usage of the image processing system according to the 12th embodiment of the present invention.

FIG. 35 is a flowchart showing the process in executing restriction on the usage of the image processing system according to the 12th embodiment of the present invention.

FIG. 35 shows a process when an object in a read document image is vectorized and saved by the scan function (to be referred to vector scan hereinafter).

In step S2401, department information of a department to which the user belongs is input via the operation window in FIG. 31 or 32.

In step S2402, the scan function starts. In step S2403, it is determined in correspondence with the input department information by referring to the setting value management table whether both the monochrome scan function and color scan function have reached their upper limit values of usage for each object type.

If these two scan functions have reached their upper limit values of usage (YES in step S2403), the flow advances to step S2404 to display on the display unit 116 a message that the scan function is not available, in order to inhibit further usage of the scan function. If these two scan functions have not reached their upper limit values of usage (NO in step S2403), the flow advances to step S2405 to execute scan operation of one document page.

In step S2406, the vectorized process is executed for the document image attained by scan operation. In step S2407, the number of objects of each type generated by the vectorized process is counted.

In step S2408, it is determined whether the cumulative number of counted objects of each type subjected to usage restriction has reached its upper limit value of usage. If the cumulative number of counted objects has reached the upper limit value (YES in step S2408), the flow advances to step S2410 to display on the display unit 116 a message that the scan function is not available, in order to inhibit further usage of the scan function.

When scan operation is done for a document of a plurality of pages, vector data containing objects obtained from a document image which has just been processed is stored in the storage unit 111. Vector data generated from a document image with which the cumulative number of objects exceeds the upper limit value of usage is discarded.

If the cumulative number of counted objects has not reached the upper limit value (NO in step S2408), the setting value management table is updated to the cumulative number of counted objects, and vector data containing objects obtained by the vectorized process is generated.

In step S2412, it is determined whether a document to be processed is the final page. If the document to be processed is not the final page (NO in step S2412), the flow returns to step S2405. If the document to be processed is the final page (YES in step S2412), generated vector data is stored in the storage unit 111.

As subsequent processes, the process in step S23130 of FIG. 23 may be executed, or a combination of processes in FIGS. 35 and 23 may be executed in accordance with the application purpose. Restriction on the usage of the scan function has been described with reference to FIG. 35, and the same restriction on usage can also be implemented for the remaining functions (printing function, transmitting function, and the like) of the MFP 100.

As described above, the 12th embodiment can implement finer, practical usage management of an apparatus by constructing an arrangement which restricts the usage of each function of the MFP 100 for each department and each object type.

13th Embodiment

In the 12th embodiment, restriction on the usage of each function of the MFP 100 is implemented for each department and each object type. A billing system which bills the user for the contents of usage of each function of the MFP 100 for each department and each object type can also be constructed using a setting value management table configured to implement restriction on usage.

To construct the billing system, for example, a billing management window is configured instead of the management window in FIG. 33 according to the 12th embodiment.

The billing management window will be explained with reference to FIG. 36.

FIG. 36 is a view showing an example of the billing management window according to the 13th embodiment of the present invention.

The billing management window in FIG. 36 has an input region necessary for billing, in addition to the arrangement of the management window in FIG. 33 according to the 12th embodiment.

Especially the billing management window provides a unit cost input region 2502 for billing the user for each object upon generation of the object, in order to set the upper limit of the total amount of consideration when objects are generated and to restrict the usage of objects.

To input a unit cost, a button 2501 is touched, and a desired numerical value can be input to the unit cost input region 2502 with the ten-key pad. In the example of FIG. 36, 0.100 is input in the unit cost input region 2502, and in this case, the billing amount per text object is ¥0.100.

Reference numeral 2503 denotes an upper limit-of-total amount input region for inputting the upper limit of the total amount serving as the limit value of usage. In this example, the upper limit of the total amount is ¥50,000.

To attain the same settings for the monochrome scan function and color scan function, a communization button prepared for each object type is designated to make setting values in the setting region of the monochrome scan function equal to those in the setting region of the color scan function. For example, by designating a communization button 2504 for text objects, the unit cost of text objects is set equal between the monochrome scan function and the color scan function.

When the communization button is designated, no input can be permitted in a unit cost input region for an object type corresponding to the designated communization button in the setting region of the monochrome scan function.

Setting values in the billing management window are managed by a billing setting value management table corresponding to the setting value management table of FIG. 34 according to the 12th embodiment. In this case, the unit cost of each object type, the cumulative billing amount, and the upper limit of the total amount are managed as setting values in addition to setting values managed by the setting value management table of FIG. 33.

A concrete example when the billing setting value management table is used will be explained.

Assume that 1,000 text objects, 100 graphic objects, 200 table objects, 2,000 line objects, and 300 photo objects are generated by the color scan function, and the contents of the billing management window in FIG. 36 are managed by the billing setting value management table. At this time, the total billing amount is (1,000×¥0.100)+(100×¥0.300)+(200×¥0.200)+(2,000×¥0.100)+(300×¥1.00)=¥670

When the sum of ¥670 and the cumulative billing amount managed by the billing setting value management table does not reach the upper limit "¥50,000" of the total amount, vector data containing generated objects is stored in the storage unit 111.

The process of the 13th embodiment can be implemented by executing a comparison between the cumulative billing amount and the upper limit of the total amount in determinations of steps S2403 and S2408 in the process of FIG. 35 according to the 12th embodiment.

As described above, the 13th embodiment can construct a billing system which bills the user for the contents of usage of the apparatus for each department and each object type, in accordance with the arrangement of the 12th embodiment.

The embodiments have been described in detail, but the present invention can include an embodiment of a system, apparatus, method, program, storage medium, or the like. More specifically, the present invention may be applied to a system made up of a plurality of devices, or an apparatus formed from one device.

14th Embodiment

The first to 13th embodiments can be arbitrarily combined and implemented depending on the application purpose.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Applications No. 2004-173003, 2004-173004 and 2004-173006 filed on Jun. 10, 2004, the entire contents of which are hereby incorporated by reference herein.

What is claimed is:

1. An image processing apparatus which executes, on the basis of a process performed for an image, a process associated with billing of the process performed on the image, comprising:
input means for inputting raster image data;
dividing means for dividing the raster image data input by said input means into objects of respective attributes;
display means for displaying division results of said dividing means and charge information representing a consideration accrued from a vectorized process for the division results;
instructing means for instructing whether to execute the vectorized process for the division results displayed on said display means;
executing means for executing, on the basis of an instruction content of said instructing means, the vectorized process of converting the raster image data into vector data;
setting means for setting a priority of attributes of objects divided by said dividing mean; and
adjustment means for automatically adjusting the order of the objects to be vectorized by said vectorized process on the basis of the setting by said setting means.

2. The apparatus according to claim 1, wherein said input means inputs as the raster image data an image read by an image reading unit which reads a document.

3. The apparatus according to claim 1, wherein said display means displays total charge information representing a consideration accrued from the vectorized process for all objects in the raster image data that are obtained as the division results, and
object-specific charge information representing a consideration accrued from the vectorized process for objects of each attribute in the raster image data.

4. The apparatus according to claim 1, further comprising calculating means for calculating the charge information,
said calculating means calculating the charge information on the basis of a unit charge set for each attribute type of objects in the raster image data that are obtained as the division results.

5. The apparatus according to claim 1, further comprising calculating means for calculating the charge information,
said calculating means calculating the charge information on the basis of a unit charge set on the basis of an area of objects in the raster image data that are obtained as the division results.

6. The apparatus according to claim 1, further comprising calculating means for calculating the charge information,
in a case in which the raster image data is not divided into objects by said dividing means, said calculating means calculating the charge information on the basis of a unit charge set for the case.

7. The apparatus according to claim 1, wherein when the charge information exceeds a predetermined value, said display means displays warning information representing that the charge information exceeds the predetermined value.

8. The apparatus according to claim 1, wherein said instructing means can instruct whether to execute the vectorized process for each attribute of objects which are obtained as the division results displayed by said display means.

9. The apparatus according to claim 8, wherein said display means updates the charge information on the basis of the instruction content of said instructing means.

10. The apparatus according to claim 1, wherein said vectorized process vectorizes the raster image data into objects so as not to exceed a predetermined number of objects.

11. A method of controlling an image processing apparatus which executes, on the basis of a process performed for an image, a process associated with billing of the process performed for the image, comprising:
an input step of inputting raster image data;
a dividing step of dividing the raster image data input in the input step into objects of respective attributes;
a display step of displaying, on a display unit, division results of the dividing step and charge information representing a consideration accrued from a vectorized process for the division results;
an instructing step of instructing whether to execute the vectorized process for the division results displayed on the display unit in the display step;
an executing step of executing, on the basis of an instruction content of the instructing step, the vectorized process of converting the raster image data into vector data;
a setting step of setting a priority of attributes of objects divided by said dividing step: and
an adjustment step of automatically adjusting the order of the objects to be vectorized by said vectorized process on the basis of the setting by said setting step.

12. A computer readable storage medium on which is stored a computer executable program for implementing control of an image processing apparatus which executes, on the basis of a process performed for an image, a process associated with billing of the process performed for the image, comprising:
a program code for an input step of inputting raster image data;
a program code for a dividing step of dividing the raster image data input in the input step into objects of respective attributes;
a program code for a display step of displaying, on a display unit, division results of the dividing step and charge information representing a consideration accrued from a vectorized process for the division results;
a program code for an instructing step of instructing whether to execute the vectorized process for the division results displayed on the display unit in the display step;

a program code for an executing step of executing, on the basis of an instruction content of the instructing step, the vectorized process of convening the raster image data into vector data;

a program code for a setting step of setting a priority of attributes of objects divided by said dividing step; and a program code for an adjustment step of automatically adjusting the order of the objects to be vectorized by said vectorized process on the basis of the setting by said setting step.

* * * * *